(12) United States Patent
Tavares Coutinho et al.

(10) Patent No.: US 10,812,996 B2
(45) Date of Patent: Oct. 20, 2020

(54) METHODS AND SYSTEMS FOR COMMUNICATION AMONG NODES FOR THE INTERNET OF THINGS, INCLUDING AUTONOMOUS VEHICLES, FOR OPTIMIZING OPERATIONS OF THE NODES

(71) Applicant: Veniam, Inc., Mountain View, CA (US)

(72) Inventors: Nuno Alexandre Tavares Coutinho, Oporto (PT); Ricardo Jorge Magalhães de Matos, Oporto (PT); João Francisco Cordeiro de Oliveira Barros, Mountain View, CA (US)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 16/521,096

(22) Filed: Jul. 24, 2019

(65) Prior Publication Data

US 2019/0349794 A1   Nov. 14, 2019

Related U.S. Application Data

(63) Continuation of application No. 15/923,388, filed on Mar. 16, 2018, now Pat. No. 10,405,215.

(60) Provisional application No. 62/525,247, filed on Jun. 27, 2017.

(51) Int. Cl.
| | |
|---|---|
| *H04W 24/04* | (2009.01) |
| *H04W 64/00* | (2009.01) |
| *H04L 29/08* | (2006.01) |
| *H04W 48/20* | (2009.01) |
| *H04W 84/18* | (2009.01) |
| *H04W 24/08* | (2009.01) |

(52) U.S. Cl.
CPC ............ *H04W 24/04* (2013.01); *H04L 67/10* (2013.01); *H04L 67/12* (2013.01); *H04L 67/18* (2013.01); *H04L 67/32* (2013.01); *H04W 48/20* (2013.01); *H04W 64/003* (2013.01); *H04W 24/08* (2013.01); *H04W 84/18* (2013.01)

(58) Field of Classification Search
CPC ..... H04W 24/04; H04W 24/08; H04W 48/20; H04W 84/18; H04L 67/10; H04L 67/12; H04L 67/18; H04L 67/32
USPC .................................................. 370/328, 329
See application file for complete search history.

(56) References Cited

U.S. PATENT DOCUMENTS

| | | | | |
|---|---|---|---|---|
| 7,248,841 B2* | 7/2007 | Agee | ..................... | H04B 7/0417 455/101 |
| 8,457,546 B2* | 6/2013 | Mahajan | ............... | H04W 40/02 370/315 |
| 9,154,900 B1* | 10/2015 | Addepalli | ............. | H04W 28/06 |
| 9,641,391 B2* | 5/2017 | Barros | ............... | H04L 41/0803 |
| 2007/0050248 A1* | 3/2007 | Huang | ............... | G06Q 30/0265 705/14.62 |

(Continued)

*Primary Examiner* — Afsar M Qureshi
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide autonomous vehicle network architectures, systems, and methods for supporting a dynamically configurable network of autonomous vehicles comprising a complex array of both static and moving communication nodes. In particular, systems and methods for operating self-organized fleets of autonomous vehicles.

20 Claims, 14 Drawing Sheets

(56) References Cited

U.S. PATENT DOCUMENTS

| | | | |
|---|---|---|---|
| 2011/0111772 A1* | 5/2011 | Tysowski | G01S 19/48 |
| | | | 455/456.3 |
| 2017/0086011 A1* | 3/2017 | Neves | H04B 1/3822 |
| 2018/0053215 A1* | 2/2018 | e Costa | G06Q 30/0266 |
| 2018/0220283 A1* | 8/2018 | Condeixa | H04L 67/12 |
| 2018/0253963 A1* | 9/2018 | Coelho de Azevedo | |
| | | | G08G 1/012 |
| 2019/0090174 A1 | 3/2019 | Rocci et al. | |

* cited by examiner

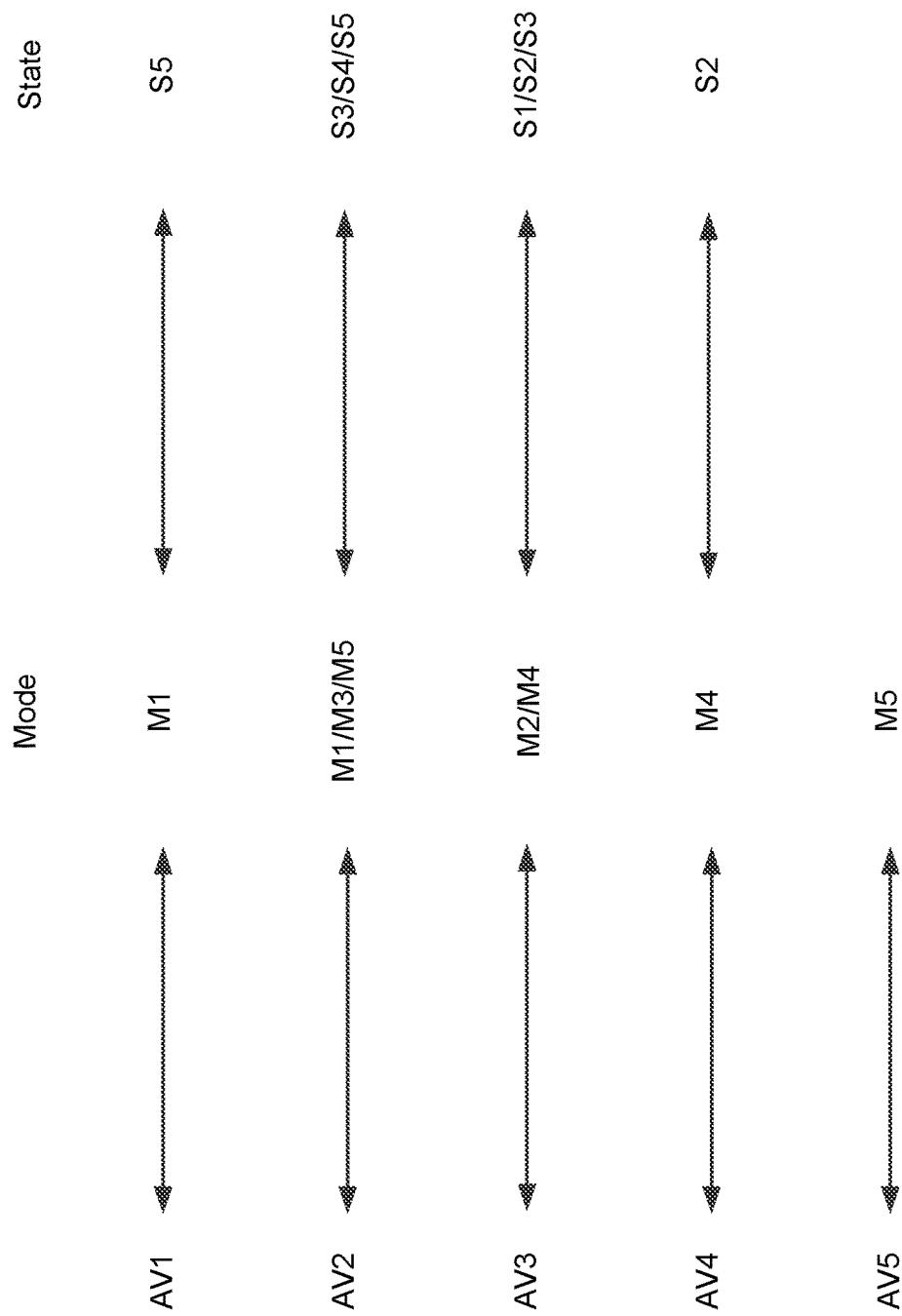

METHODS AND SYSTEMS FOR COMMUNICATION AMONG NODES FOR THE INTERNET OF THINGS, INCLUDING AUTONOMOUS VEHICLES, FOR OPTIMIZING OPERATIONS OF THE NODES

CROSS-REFERENCE TO RELATED APPLICATIONS/INCORPORATION BY REFERENCE

This patent application is a continuation of U.S. patent application Ser. No. 15/923,388, filed on Mar. 16, 2018, now U.S. Pat. No. 10,405,215 B2, issued on Sep. 3, 2019 which makes reference to, claims priority to, and claims benefit from U.S. Provisional Patent Application Ser. No. 62/525,247, filed on Jun. 27, 2017, and titled "Self-Organized Fleets Of Autonomous Vehicles To Optimize Future Mobility And City Services," which is hereby incorporated herein by reference in its entirety. The present application is related to: U.S. patent application Ser. No. 15/133,756, filed Apr. 20, 2016, and titled "Communication Network of Moving Things;" U.S. patent application Ser. No. 15/132,867, filed Apr. 19, 2016, and titled "Integrated Communication Network for a Network of Moving things;" U.S. patent application Ser. No. 15/138,370, filed on Apr. 26, 2016, and titled, "Systems and Methods for Remote Configuration Update and Distribution in a Network of Moving Things;" U.S. patent application Ser. No. 15/157,887, filed on May 18, 2016, and titled "Systems and Methods for Remote Software Update and Distribution in a Network of Moving Things;" U.S. patent application Ser. No. 15/228,613, filed Aug. 4, 2016, and titled "Systems and Methods for Environmental Management in a Network of Moving Things;" U.S. patent application Ser. No. 15/213,269, filed Jul. 18, 2016, and titled "Systems and Methods for Collecting Sensor Data in a Network of Moving Things;" U.S. patent application Ser. No. 15/215,905, filed on Aug. 4, 2016, and titled "Systems and Methods for Environmental Management in a Network of Moving Things;" U.S. patent application Ser. No. 15/245,992, filed Aug. 24, 2016, and titled "Systems and Methods for Shipping Management in a Network of Moving Things;" U.S. patent application Ser. No. 15/337,856, filed Oct. 28, 2016, and titled "Systems and Methods for Optimizing Data Gathering in a Network of Moving Things;" U.S. patent application Ser. No. 15/351,811, filed Nov. 15, 2016, and titled "Systems and Methods to Extrapolate High-Value Data from a Network of Moving Things;" U.S. patent application Ser. No. 15/353,966, filed Nov. 17, 2016, and titled "Systems and Methods for Delay Tolerant Networking in a Network of Moving Things, for Example Including a Network of Autonomous Vehicles;" U.S. patent application Ser. No. 15/414,978, filed on Jan. 25, 2017, and titled "Systems and Methods for Managing Digital Advertising Campaigns in a Network of Moving Things;" U.S. patent application Ser. No. 15/451,696, filed Mar. 7, 2017, and titled "Systems and Methods for Managing Mobility in a Network of Moving Things;" U.S. patent application Ser. No. 15/428,085, filed on Feb. 8, 2017, and titled "Systems and Methods for Managing Vehicle OBD Data in a Network of Moving Things, for Example Including Autonomous Vehicle Data;" U.S. Provisional Patent Application Ser. No. 62/336,891, filed May 16, 2016, and titled "Systems and Methods for Vehicular Positioning Based on Message Round-Trip Times in a Network of Moving Things;" U.S. Provisional Patent Application Ser. No. 62/350,814, filed Jun. 16, 2016, and titled "System and Methods for Managing Contains in a Network of Moving Things;" U.S. Provisional Patent Application Ser. No. 62/360,592, filed Jul. 11, 2016, and titled "Systems and Methods for Vehicular Positioning Based on Wireless Fingerprinting Data in a Network of Moving Things;" U.S. Provisional Patent Application Ser. No. 62/376,937, filed on Aug. 19, 2016, and titled "Systems and Methods to Improve Multimedia Content Distribution in a Network of Moving things;" U.S. Provisional Patent Application Ser. No. 62/376,955, filed Aug. 19, 2016, and titled "Systems and Methods for Reliable Software Update in a Network of Moving Things;" U.S. Provisional Patent Application Ser. No. 62/377,350, filed Aug. 19, 2016, and titled "Systems and Methods for Flexible Software Update in a Network of Moving Things;" U.S. Provisional Patent Application Ser. No. 62/378,269, filed Aug. 23, 2016, and titled "Systems and Methods for Flexible Software Update in a Network of Moving Things;" U.S. Provisional Patent Application Ser. No. 62/415,196, filed Oct. 31, 2016, and titled "Systems and Method for Achieving Action Consensus Among a Set of Nodes in a Network of Moving Things;" U.S. Provisional Patent Application Ser. No. 62/415,268, filed Oct. 31, 2016, and titled "Systems and Methods to Deploy and Control a Node in a Network of Moving Things;".S. Provisional Patent Application Ser. No. 62/417,705, filed Nov. 4, 2016, and titled "Systems and Methods for the User-Centric Calculation of the Service Quality of a Transportation Fleet in a Network of Moving Things;" U.S. Provisional Patent Application Ser. No. 62/429,410, filed on Dec. 2, 2016, and titled "Systems and Methods for Improving Content Distribution for Fleets of Vehicles, Including for Example Autonomous Vehicles, By Using Smart Supply Stations;" and U.S. Provisional Patent Application Ser. No. 62/449,394, filed Jan. 23, 2017, and titled "Systems and Methods for Utilizing Mobile Access Points as Fixed Access Points in a Network of Moving Things, for Example Including Autonomous Vehicles;" the entire contents of each of which is hereby incorporated herein by reference.

BACKGROUND

Current communication networks are unable to adequately support communication environments involving mobile and static nodes. As a non-limiting example, current communication networks are unable to adequately support communication among and with autonomous vehicles of a network of autonomous vehicles. Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 7B is a table illustrating example Mode and State transitions of the AVs of FIG. 7A, in accordance with various aspects of the present disclosure.

SUMMARY

Figure 1:
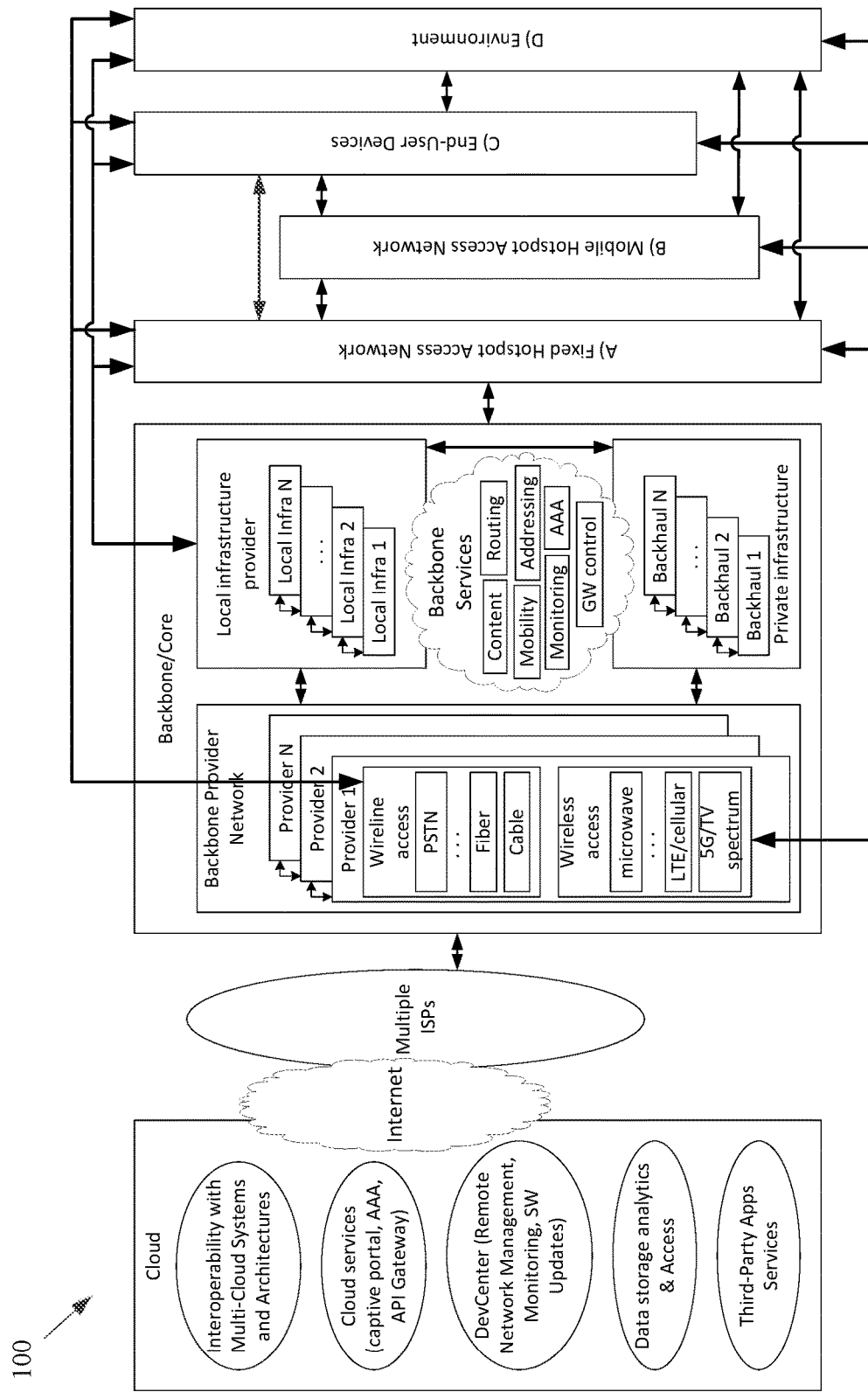
FIG. 1 shows a block diagram of a communication network, in accordance with various aspects of this disclosure.

Various aspects of this disclosure provide systems and methods for supporting a network of autonomous vehicles. As a non-limiting example, various aspects of this disclosure provide systems and methods for supporting a dynamically configurable network of autonomous vehicles comprising a complex array of both static and moving communication nodes (e.g., the Internet of moving things, autonomous vehicle networks, etc.). For example, a network of autonomous vehicles implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

In accordance with various aspects of the present disclosure, an affordable multi-network Mobile Access Point (or Mobile AP or MAP) is presented. Note that the Mobile AP may also be referred to herein as an on-board unit (OBU), etc. The Mobile AP may, for example, comprise a plurality of networking interfaces (e.g., Wi-Fi, 802.11p, 4G, Bluetooth, UWB, etc.). The Mobile AP may, for example, be readily installed in or on private and/or public vehicles (e.g., individual user vehicles, vehicles of private fleets, vehicles of public fleets, autonomous vehicles, etc.). The Mobile AP may, for example, be installed in transportation fleets, waste management fleets, law enforcement fleets, emergency services, road maintenance fleets, taxi fleets, aircraft fleets, etc. The Mobile AP may, for example, be installed in or on a vehicle or other structure with free mobility or relatively limited mobility. The Mobile AP may also, for example, be carried by a person or service animal, mounted to a bicycle, mounted to a moving machine in general, mounted to a container, etc.

The Mobile APs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the Mobile APs and also Fixed Access Points (or Fixed APs or FAPs) connected to the wired or tethered infrastructure (e.g., a local infrastructure, etc.). Note that Fixed APs may also be referred to herein as Road Side Units (RSUs).

In an example implementation, the Mobile APs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the Mobile APs using one or more relatively short-range protocols (e.g., Wi-Fi, Bluetooth, UWB, etc.). The Mobile APs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer Mobile APs are necessary to provide blanket coverage over a geographical area.

The Mobile AP may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the Mobile AP may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the Mobile AP may operate to provide in-vehicle Wi-Fi Internet access to users in and/or around the vehicle (e.g., a bus, train car, taxi cab, public works vehicle, etc.). The Mobile AP may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the Mobile AP may utilize the cellular network interface to provide connectivity in geographical areas that are not presently supported by a Fixed AP, may utilize the cellular network interface to provide a fail-over communication link, may utilize the cellular network interface for emergency communications, may utilize the cellular network interface to subscribe to local infrastructure access, etc. The Mobile AP may also utilize the cellular network interface to allow the deployment of solutions that are dependent on the cellular network operators.

A Mobile AP, in accordance with various aspects of the present disclosure, may for example comprise a smart connection manager that can select the best available wireless link(s) (e.g., Wi-Fi, 802.11p, cellular, vehicle mesh, etc.) with which to access the Internet. The Mobile AP may also, for example, provide geo-location capabilities (e.g., GPS, etc.), motion detection sensors to determine if the vehicle is in motion, and a power control subsystem (e.g., to ensure that the Mobile AP does not deplete the vehicle battery, etc.). The Mobile AP may, for example, comprise any or all of the sensors (e.g., environmental sensors, etc.) discussed herein.

The Mobile AP may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of a Mobile AP (or a distributed system thereof), etc.

For example, an example implementation may operate to turn each vehicle (e.g., both public and private taxis, buses, trucks, autonomous vehicles, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

In an example scenario in which public buses are moving along city routes and/or taxis are performing their private transportation services, the Mobile AP is able to collect large quantities of real-time data from the positioning systems (e.g., GPS, etc.), from accelerometer modules, etc. The Mobile AP may then, for example, communicate such data (e.g., raw data, processed data, etc.) to the Cloud, where the data may be processed, reported and viewed, for example to support such public or private bus and/or taxi operations, for example supporting efficient remote monitoring and scheduling of buses and taxis, respectively.

A Mobile AP may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or Mobile AP or OBU thereof) can collect sensor data from the sensor device and upload the collected data to a database in the Cloud. The appropriate action can then be taken. In an example waste management implementation, several waste management (or collection) trucks may be equipped with Mobile APs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

For example, in an example port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-Cloud systems and architectures. Another example component (e.g., a Cloud service component) may, for example, provide various Cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems or notes of the network 100. The Backbone/Core Infrastructure may, for example, comprise the ability to utilize and/or interface with different data storage/processing systems (e.g., MongoDB, MySql, Redis, etc.).

Figure 2:
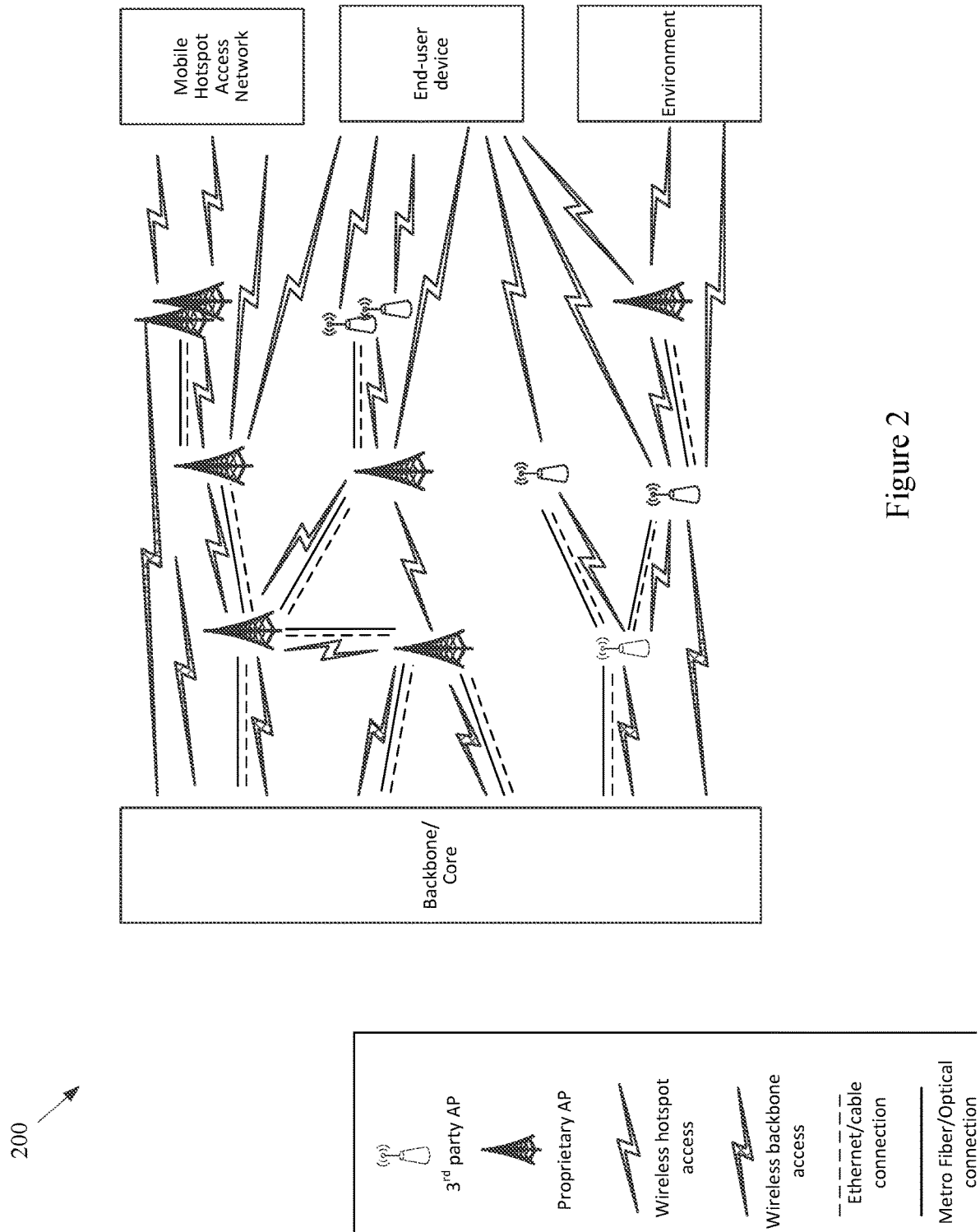
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down.

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., MAP-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.). Note that a plurality of Fixed APs may be utilized for fault-tolerance/fail-recovery purposes.

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
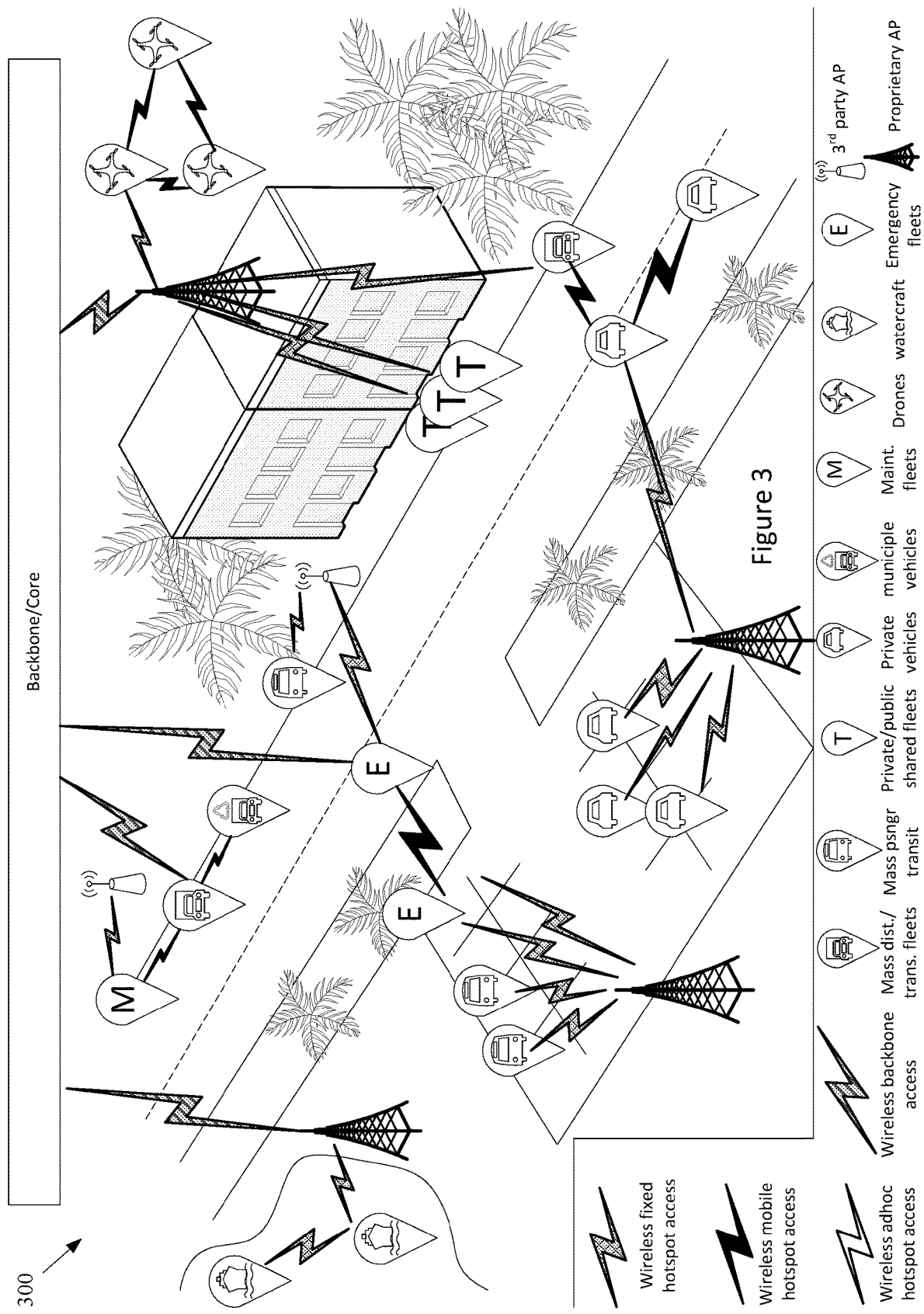
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU thereof) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Devices, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
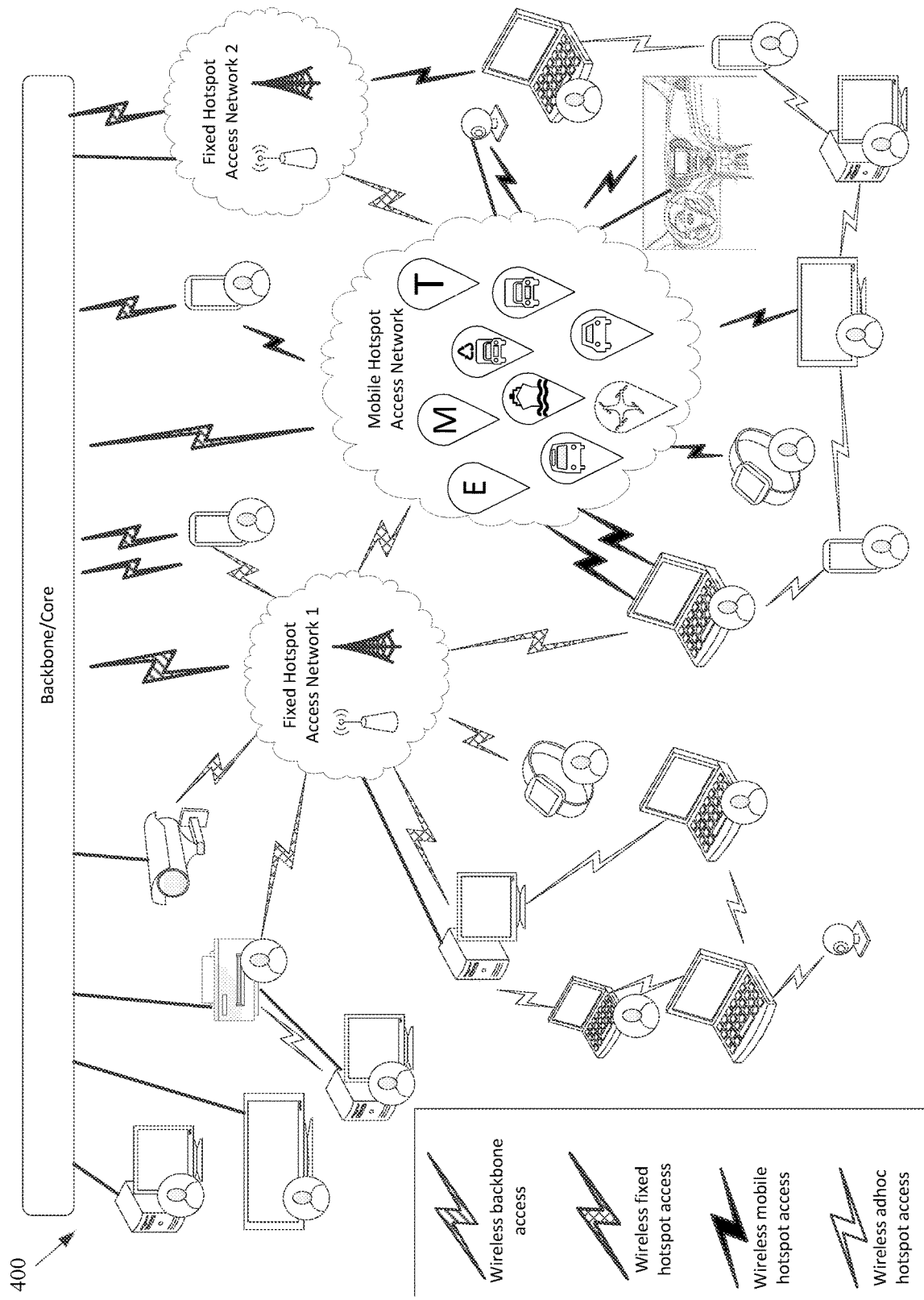
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

People have always communicated with one another, beginning with physical and oral communication, and progressing to forms of written communication conveyed using physical and wired or wireless electronic means. As human desires for mobility have grown, various vehicles have been developed, and electronic forms of communication have allowed individuals to maintain contact with one another while traveling using those vehicles. Support for various electronic forms of communication has become an integral part of the vehicles in use, to enable vehicle operation and communication by vehicle occupants. The various electronic forms of communication are now integrated into the infrastructure of our vehicles, and the advantages of electronically interconnecting systems and occupants of neighboring vehicles using forms of wireless communication are increasingly being realized, enabling safety and comfort improvements for their users.

The Connected Vehicle (CV) concept leverages the ability of vehicles to electronically communicate with one another, and with networks such as the Internet. CV technologies enable vehicle systems to provide useful context-aware information to a vehicle and to the vehicle operator (e.g., driver) or occupants, allowing the operator to make more informed, safer, energy-efficient, and better decisions. CV technologies also enable the vehicles to communicate terabytes of data between the physical world and Cloud-based systems. Such data may then feed the operational flows of, for example, transportation agencies, municipalities, and/or vehicle fleet owners, allowing such entities to enhance the knowledge they have about the environment and conditions in which their vehicles operate, and to benefit from having historical data and actionable insights to better plan, allocate, and manage their operations and logistics, making them smarter, safer, cost-effective, and productive.

However, a CV cannot make any choices for the operator, and cannot navigate and control the vehicle independently. Such actions are only possible in vehicles referred to herein as Autonomous Vehicles (AVs), which are computer-navigated vehicles that include autonomous functionalities including, by way of example and not limitation, the ability to self-park the vehicle, the ability to control and navigate the vehicle (e.g., start, stop, steer, etc.), and automatic collision avoidance features. At first glance, AVs do not need CV technologies to operate, since such vehicles are able to independently navigate the road network. Nevertheless, CV technologies enable the communication of real-time information about, for example, vehicle traffic, environmental conditions, unexpected events, and all kinds of context information that characterizes the roads on which the AVs are travelling. With such information, AVs are equipped to make optimized decisions in-advance of encountering situations such as, for example, congested travel routes, accidents or other obstacles along the road, etc. Also, CV technologies enable AVs to maintain updated software/firmware and any data sets relied upon by the AV (e.g., road maps).

The self-driving capability of AVs may facilitate and foster the use of shared vehicles, enabling rental services of public vehicles (e.g., fleets of taxis or buses) to substitute for personal vehicle ownership. Shared AVs may work better in dense urban areas, but there may also be residential/household AVs serving multiple clients in the same geographic region. The full-potential of the shared AV concept may, for example, result from combining the power of allowing the same vehicle to be used by multiple individuals (referred to herein as "vehicle sharing") that may result in reduced parking costs, and from optimizing each vehicle trip to serve the purposes of multiple passengers (referred to herein as "ride sharing") that may reduce road congestion. The use of shared AVs may increase the capacity utilization rate of vehicles and may result in additional vehicle travel, which may include vehicle travel involved in the return to the origin of a trip, particularly in situations involving low-density suburban and rural areas.

Despite all the aforementioned benefits, the use of shared AVs without personal ownership is likely to involve more frequent cleaning and repairs, and may have more sophisticated construction and electronic surveillance requirements to minimize vandalism risks. These aspects may reduce the comfort and privacy of passengers. Moreover, many private individuals that drive very frequently may continue to prefer to have their own vehicles, in order to show their own personal style, guide tourists, assist passengers to safely reach their destinations, carry their own luggage, etc.

In a future of autonomous and shared vehicles, the potential for much higher vehicle utilization may be seen as an opportunity for electric vehicles (EVs) to take the market by storm, which will increase the use of renewable and clean energy sources and reduce air pollution and $CO_2$ emissions. Massive market penetration of EVs may be made possible with the deployment of a scalable and connected infrastructure to, for example, enable the monitoring of charging status of EV batteries, allow vehicle manufacturers to remotely monitor the deployment of new battery technologies, support automated reservation and billing at charging stations, and permit remote control of charging schedules. Based on those connectivity and technological needs, and looking to the demands of AVs, one may conclude that a connected vehicle infrastructure that enables the shared AV concept is the strongest and ideal candidate to also empower the EV concept.

When one considers that the fleets of public vehicles we have today may operate as Fleets of Autonomous Vehicles that are Electric and Shared (FAVES), we may then consider the potential impact such FAVES may have on, for example, the planning, design, and user behavior of cities and roads; user urban travel and mobility; the transformation of people's lives; employment; and automotive industry planning and production.

The concept of FAVES, in accordance with the various aspects disclosed herein, offer a number of benefits. Such benefits include, for example, smart transportation that coordinates operations and rides to reduce the number of vehicles and avoid congestion on the roads and competition for parking spaces, providing for high-quality and highly efficient transportation and improved user mobility. The use of FAVES according to the present disclosure enables improvements in city infrastructure planning, since cities may change the way the city provides access, enabling the re-design, elimination, and/or reduction in the capacity of garages, parking lots, and roads. The use of FAVES as described herein allows an improved urban quality of life, where cities may be differentiated in terms of the mobility services they support, making the urban living more attractive. Such FAVES provide increased mobility and may provide access to mobility services in empty backhauls, and in rural, less-developed areas. The use of such FAVES allows users to experience enjoyable and convenient travel, where vehicle occupants are able to rest and/or work while traveling, increasing their productivity and reducing their stress levels, and where non-drivers have more convenient and affordable travel options that avoid the costs associated with travel that involves paid drivers (e.g., conventional taxis and buses). FAVES as described herein provide for safer travel, because such FAVES may decrease common vehicular travel risks, thereby avoiding the costs of vehicle accidents and reducing insurance premiums. In addition, the availability of FAVES enables individuals to realize personal vehicle maintenance savings through the use of vehicle rental services as a substitute for personal vehicle ownership, which can eliminate maintenance of personal vehicles and can result in various end-user savings. The use of FAVES in accordance with the present disclosure may cause a shift in vehicle manufacture, as manufacturers move their focus from the building of traditional vehicles to the activities of selling travel time well spent, by making modular, upgradable, and re-usable vehicles.

The increased deployment of AVs (e.g., and likewise, FAVES) may come with a number of potential costs and/or risks, which are addressed by various aspects of the present disclosure. For example, the use of AVs may result in a reduction in employment of those individuals trained for the operation, production, and maintenance of traditional vehicles. The adoption of AVs may lead to a reduction in the need for drivers, as well as the demand for those individuals skilled in vehicle repair, which may be due to a reduction in vehicle accidents enabled by aspects described herein. Such reductions in work force may enable the displaced workers to move to the types of work where they are needed including, for example, the design and manufacturer of AVs. The use of AVs may also come with additional risks such as, for example, system failures, may be less safe under certain conditions, and may encourage road users to take additional risks. Systems in accordance with various aspects of the present disclosure address the handling of such system failures and amelioration of the potential risks. Aspects of the present disclosure help the operator of AVs (e.g., and FAVES as well) to avoid some of the costs of additional equipment (e.g., sensors, computers and controls), services, and maintenance, and possibly roadway infrastructure, that may be involved in meeting the manufacturing, installation, repair, testing, and maintenance standards for AVs, by minimizing the risks of system failures that could be fatal to both vehicle occupants and other users of the roads on which the AVs travel. Some aspects of systems according to the present disclosure also address security/privacy risks such as, for example, the possible use of AVs for criminal/terrorist activities (e.g., bomb delivery) and the vulnerability of such systems to information abuse (e.g., GPS tracking/data sharing may raise privacy concerns).

Although the traditional vehicle concept is well and widely understood by most of society, the special requirements and capabilities of autonomous vehicles, especially those autonomous vehicles that are electric and shared (i.e., the FAVES concept), will change the automotive industry.

In accordance with aspects of the present disclosure, vehicles that are autonomous, shared, and electrically powered are not simply a means to carry people or goods from point A to point B, but rather become a powerful element able to perform different context-aware and mobility actions, fueled by the interaction with the overall automotive ecosystem. This new paradigm allows a FAVES, as described herein, to play an important role in the quality of life in urban areas, offering benefits to the traveler, the environment, transit providers, manufacturers, and other entities.

A system in accordance with various aspects of the present disclosure manages the collaborative actions and decisions taken by the vehicles of a FAVES. Such a system supports operation of a FAVES using a Mobility-as-a-Service (MaaS) paradigm, offering mobility solutions to both travelers and goods, based on travel needs. The system supporting the application of the MaaS paradigm to the management of a FAVES may take into consideration various factors including, for example, the value of passenger time, ridership habits, road occupancy, infrastructure status, social/environmental consequences of travel, and parking opportunities, to name just a few of those factors. A system in accordance with the present disclosure helps end-users to avoid traditional issues related to vehicle depreciation, financing costs, insurance, vehicle maintenance, taxes, etc., that are part of conventional vehicle ownership and usage.

A system in accordance with aspects of the present disclosure improves upon components used to support a successful MaaS strategy of the mobility market of the future. Such a system may support a set of challenging services and strategies used when operating a FAVES according to a MaaS paradigm, and works to, for example, reduce city congestion, reduce vehicle emissions, decrease costs to the end-user, improve utilization of transit providers, and enable the collaboration of different fleets of vehicles. Below, we provide additional details on the operation and control of a system supporting to encourage deployment of AVs (e.g., a FAVES) under a MaaS paradigm.

A system in accordance with aspects of the present disclosure may support combining transportation services from different public and private transportation providers, whether applied for movement of people and/or goods. Such a system may provide support for new mobility and on-demand service providers focused on ride-sharing, car-sharing, and/or bike-sharing.

A system according to various aspects of the present disclosure may support methods of managing (e.g., deployment/maximization) the capacity of roads such as, for example, managing deployment of autonomous vehicles in what may be referred to herein as "platooning," the use of narrower roadway lanes, reducing vehicle stops at intersections, and the use of improved road striping and road signage that aid recognition of the roadway by autonomous vehicles, thus decreasing road congestion/costs while increasing the efficiency and utilization of transit providers that contribute to the overall transit network in a region.

A system according to the present disclosure may support the creation and management of AV trips, which may, for example, be done through multiple modes. The system may provide for converging bookings and payments that may be managed collectively, under the same system platform, in which end-users may pay using a single account. In accordance with aspects of the present disclosure, the system may support different subscription methods such as, for example, "pay-per-trip," and the use of a monthly fee that provides for a certain travel distance and/or a fee structure that supports unlimited travel by end-users. The system may provide for system and end-user tracking of AV usage, and that includes functionality that provides for the handling of various end-user incentives and/or tax exemptions based on the reductions of overall emissions resulting from the use of AVs for end-user travel. A system in accordance with various aspects of the present disclosure may provide operator tools that permit the definition of various parameters relating to parking facilities such as, by way of example and not limitation, system parameters concerning the cost of parking and/or public transit demands, which may be used by the system in determining actions (e.g., parking, charging, traveling) that AVs should take when waiting without passengers. A system according to the present disclosure may include functionality that encourages and supports the furtherance of AV deployment such as, for example, tools and reporting functionality that support vehicle and system certification policies, licensing rules, and autonomous vehicle following distance requirements.

A FAVES in a network providing MaaS will transform the opportunities that are available to those wishing to travel, by enabling people to have door-to-door transfer via self-navigating vehicles to preferred destinations, at a speed of travel normally available using private vehicle travel, and at a cost-per-mile comparable to that of a subway ticket, or at a significantly lower cost than current taxi and ridesharing prices.

Operating a FAVES to provide MaaS involves use of a system that supports a service-driven and market-oriented stack that embodies the know-how, market needs, and requirements of different actors including, for example, end-users; institutions; vehicle and infrastructure equipment manufacturers; legal, regulatory, government, and safety organizations; and/or other agencies. A system in accordance with the present disclosure enables those actors to join forces and act together to build and manage a scalable, high-performance, robust, and safe ecosystem in which AVs are the central point to provide high-value services able to optimize network capacity, reduce congestion on roads, make a passenger's journey stress free, positively impact community and socio-economic growth, increase safety, and improve fleet operations. Additional details of the functionality of a system supporting the use of a FAVES in providing MaaS are discussed below.

A system in accordance with aspects of the present disclosure may support functionality for management of the infrastructure with which AVs will operate or interact such as, for example, roads, parking places/spaces, cities, etc., and may be designed, developed, and optimized to cope with the specific requirements of AVs. There is a strong public, business, and government interest in, for example, reducing congestion and pollution along roads and highways, and in decreasing the time spent entering and leaving parking facilities. A system in accordance with aspects of the present disclosure may support the design and implementation of such infrastructure elements from the beginning, including providing support for the inclusion of the latest innovations in roadway striping, signage, and traffic control lights/signs, thus providing support for the best physical substrate to support AV operation.

To enable the management of installation and maintenance of infrastructure elements that support AV operation, systems in accordance with the present disclosure support system interfaces for interactions involving municipal authorities, transit and transportation providers, and/or governmental and legal agencies, that can explore and implement policies, managed via system parameters, that will further AV deployment, such as certification policies, licensing rules, and following distance standards.

A system in accordance with aspects of the present disclosure may provide support for private sector companies such as, for example, Tesla, Google, Uber, etc. that may control the deployment of AVs and many of the technologies that those AVs use. Those companies are building many of the AVs now being explored. A system supporting a FAVES as described herein will enable such private sector companies to respond to market forces including, for example, being involved in the deployment and management of AV software for FAVES. Such software may include, for example, functionality related to automated controls (e.g., steering, braking, signals, etc.), self-parking, auto-collision avoidance features, self-vehicle control, etc. Such a system may provide support for in-vehicle services that leverage on AV functionalities.

A system in accordance with aspects of the present disclosure may provide support for traditional vehicle OEMs, as they transition to support the MaaS paradigm. Such traditional vehicle OEMs may continue to find ways to sell vehicles to end-users, but may also turn the concept of "building traditional vehicles to sell directly to the end-user" into selling vehicles to service providers, or vehicles as a service, focusing on, for example, "Miles" or "Amount of time well spent" rather than on "Number of vehicles sold." A system in accordance with aspects of the present invention may provide support for the transition of such OEMs from traditional vehicle sale to end-users, providing support for management, maintenance, rotation, and usage tracking of AVs of a FAVES, as the AVs pass from the OEMs, to the service providers, and into full service with end-users.

It is expected that traditional vehicle OEMs may begin a move into the AV market by deploying modular, upgradable, and re-usable AV hardware to enable the provision of services on top of them. Things such as, for example, display screens used to provide infotainment services for the occupants; diverse types of and/or redundant sensors (e.g., optical, infrared, radar, ultrasonic, and laser) capable of operating in a variety of conditions (e.g., rain, snow, unpaved roads, tunnels, etc.); high-functionality, in-vehicle cameras and computers, as well as sophisticated vehicle and occupant monitoring and electronic surveillance systems, to minimize the effects of system failures and risks due to vandalism, while increasing system physical and data security. A system according to various aspects of the present disclosure provides support for deployment/installation, tracking, maintenance, and upgrade of such AV hardware.

The operation of most AV services and functionalities will involve communication and/or operation with an environment that surrounds each AV, and with the Internet. Thus, the software and hardware functionality of the AV and the operation of a system in accordance with the present disclosure may depend heavily on leveraging secure, high-bandwidth, low-latency, reliable communication technologies and protocols, as well as data management services able to optimize AV operations. An example of a suitable network capable of supporting AVs of a FAVES according to the present disclosure may be found, for example, in U.S. patent application Ser. No. 15/133,756, filed Apr. 20, 2016, and titled "Communication Network of Moving Things; U.S. patent application Ser. No. 15/132,867, filed Apr. 19, 2016, and titled "Integrated Communication Network for a Network of Moving things;" and U.S. patent application Ser. No. 15/451,696, filed Mar. 7, 2017, and titled "Systems and Methods for Managing Mobility in a Network of Moving Things; the entirety of each of which is hereby incorporated herein by reference".

In this manner, AVs of a FAVES may be equipped with the connectivity solutions to enable them to perform functions such as, for example, the actions of inter-AV coordination and functionality that enables AVs of a FAVES to reach a consensus among multiple vehicles using vehicle-to-vehicle (V2V) communications; the acquisition, sharing, and offloading of data, events, and other digital content locally and/or via the Internet; the use of long-range communication systems (e.g., cellular) to gain access to road and highway maps, AV system software upgrades, road condition reports, and emergency messages; and the establishment of connectivity fallback in case of any emergency, etc.

On top of the networking infrastructure that connects AVs, described herein, there are services that a system according to the present disclosure may provide to help ensure the most suitable functionality, behavior, and monitoring of the AV network takes place. A system in accordance with the present disclosure may, for example, provide functionality that supports AV maintenance; electronic map updates; vehicle insurance-related tracking of AV movement and events that occur during operation of the AV; operator and end-user interfaces; and management of one or more FAVES that are independent, coordinated, and/or cooperative.

The services supported by a system according to aspects of the present disclosure may be targeted for different types of markets, and may include, for example, the testing, maintenance and repair of AV components such as sensors and controls; services related to ultra-precise navigation tools including, for example, those related to one or more Global Navigation Satellite Systems (GNS) (e.g., Global Positioning System (GPS)) and 2D/3D map information; and services related to the management, storage, and securitization of video feeds that can be important for insurance purposes. Additional services supported by a system according to the present disclosure may include, for example, application programming interfaces (APIs) that enable access to data, events, and other digital contents having possible impact on the operations and logistics of fleets, as well as on advertising campaigns of different agencies and retailers; and APIs to remotely manage and control the operations and software of AVs, which may be important for fleet managers.

A system according to aspects of the present disclosure may provide support for management of various aspects of human factors involved in the interaction of AVs with end-users or consumers, as well as the impact of those factors on the requirements of services that leverage on the AV ecosystem, which may be a part of any AV deployment. Those services may, for example, be related to environmental or refuse management in cities, the management of Wi-Fi offload for end-users/consumers, road pricing and fees for vehicular travel within cities or states, and/or APIs for system developers.

A system in accordance with aspects of the present disclosure may take into consideration the influence of human behaviors on the delivery of services. The system may be configured to take into account the use-cases, scenarios, and socio-economic impact resulting from the interaction of AVs and the system described herein with people and communities, as well as vulnerable users. In this way, the system according to aspects of the present disclosure may be arranged so that the overall ecosystem provided and orchestrated around AVs may be tailored to meet the needs/desires of different end-users and operators.

A system in accordance with various aspects of the present disclosure may provide support for a set of "technology pillars" that may be used operate and manage one or more AVs in a way that enables the AVs to deliver valuable products or services for multiple markets. An example set of such "technology pillars" are related to, for example, "connected" technologies (e.g., wireless communication network technologies for a network of moving things); the inclusion of advanced and sophisticated hardware/software systems that increase the security and safety of both AV occupants and other users of the roads/highways; and functionality that is configured to handle the huge volumes of data that come with the operation of large numbers of AVs, consistent with enabling existing operating models and services of Intelligent Transport System (ITS) companies to fully benefit from such data. The example set of "technology pillars" supported by a system according to aspects of the present disclosure may also include functionality that enables groups of AVs to autonomously make collaborative decisions among the AVs of the group; and functionality that supports using the MaaS concept to operate and manage AVs in an integrated way. Additional details about the above-listed "technology pillars" that may be supported by a system as described herein, are provided below.

Wireless digital connectivity may be a part of many AV use-cases and scenarios, and may be of significant importance to AV passengers for use in accessing the Internet, to AV manufacturers for performing remote diagnosis and over-the-air software/firmware/configuration/data (e.g., map) updates, to advertising agencies and retailers for use in updating AV media content, to AV software companies and developers to test new functionality of AVs, and to service providers for acquisition of data related to their services. Various example systems and methods that provide media information (e.g., multi-media, music, advertising, etc.) may be found in U.S. Provisional Patent Application Ser. No. 62/376,937, filed on Aug. 19, 2016, and titled "Systems and Methods to Improve Multimedia Content Distribution in a Network of Moving things;" U.S. patent application Ser. No. 15/414,978, filed on Jan. 25, 2017, and titled "Systems and Methods for Managing Digital Advertising Campaigns in a Network of Moving Things;" and U.S. Provisional Patent Application Ser. No. 62/429,410, filed on Dec. 2, 2016, and titled "Systems and Methods for Improving Content Distribution for Fleets of Vehicles, Including for Example Autonomous Vehicles, By Using Smart Supply Stations;" the entire contents of each of which are hereby incorporated herein by reference.

Due to the different connectivity needs of the various use-cases and scenarios in which AVs will operate, a system in accordance with various aspects of the present disclosure may provide smart and intelligent connectivity tools, to help operators and end-users make sure that the type, scope, and capacity of the wireless connectivity made available to each AV is tailored to the context and requirements of each individual scenario, while optimizing the functionality of the AV and the services provided by the AV, as a whole.

A system in accordance with the present disclosure may provide support for the configuration and management of, for example, heterogeneous and high-capacity connectivity over different networks; context-aware access to connectivity and mobility; the aggregation of bandwidth through different technologies; a gateway for Internet access, connectivity fallback, and networking offload; the evolution of V2V, V2I, and V2X communication architecture and equipment; and smart management of radio frequency (RF) spectrum occupancy.

A system in accordance with the present disclosure may provide support for deployment of AVs on a large scale and at a fleet level, and will include functionality that AVs may need to securely communicate and cooperate with one another to reach agreement regarding local actions to be performed by AVs on a road or highway. AVs may often need to make decisions carrying significant risk that are coordinated with other AVs, without the need to communicate with centrally located systems and networking points that may impose additional and unacceptable delays and overhead upon such decisions. A system in accordance with aspects of the present disclosure enables an AV to quickly initiate secure and trusted vehicle-to-vehicle (V2V), vehicle-to-infrastructure (V2I), and/or vehicle to anything (V2X) communications with neighbor AV and infrastructure elements. Such a system may, for example, provide for deployment of context-aware protocols or "security-as-a-service" packages based on the level of security required for any AV application and/or service; and ensure that security logs of AVs are stored and communicated to the system or other elements in a delay-tolerant fashion for backup, backtracking, and fault detection. The system may, for example, provide support and configuration systems that enable quick and trusted consensus among AVs; that enable secure interoperability between AVs from different fleets; and that provide and distribute Authentication, Authorization, and Accounting (AAA) functions.

A system in accordance with various aspects of the present disclosure will provide support for the functionality of AVs referred to herein as Advanced Driving Assistance Systems (ADAS), which the independent and self-driving capabilities of AVs including, for example, recognition of roads and highways; classification of obstacles on roads and highways; automatic collision avoidance features; alerts regarding hazardous road conditions; to name only a few. In order to minimize the risks of failure of such AV systems, a system according to the present disclosure leverages the connectivity among AVs, thus enabling AVs to immediately share knowledge with one another and with the Cloud, thus increasing the overall safety of autonomous driving and navigation on the roads and highways.

To support the use and management of ADAS in AVs, a system as described herein may provide functionality that enables, configures, and/or manages collective learning (or nearby teaching), by sharing/forwarding local information in context (e.g., broadcasting of warnings/announcements/ streamed information); and that identifies priorities and/or forms clusters among AVs at intersections, in case of accidents, when required to follow a particular AV or form a line of AVs (e.g., "platooning"), and when emergency vehicles or a platoon of vehicles are on the road, etc. A system as described herein may provide functionality that ensures that critical driving applications such as, by way of example and not limitation, "see-through," "blind spot" monitoring, lane/ trajectory change assistance, the following of specific vehicles, a requirement to maintain a minimum inter-vehicle distance, overtaking maneuvers, collision warnings, etc., are provided with or gather look-ahead and predictive context information.

A system in accordance with various aspects of the present disclosure may provide functionality that supports instances where an emergency or catastrophe response is needed. Such a system may provide functionality and/or information that enables each AV to, for example, detect when an emergency vehicle is approaching the AV (e.g., via mesh networking); trigger/disseminate an emergency mode activation across the network connecting one or more AVs; allow AVs to detect that an emergency mode has been/ should be activated; provide appropriate configuration and/ or information for each AV to act as a mobile gateway to the Internet; allow real-time, data-driven dispatching of emergency vehicles/first responders; define how the AV infrastructure is to behave/operate in case of an emergency; and to permit others (e.g., a system operator, law enforcement, vehicle manufacturer) to remotely control AVs in case of emergency (fallback).

AVs are not expected to be able to function without having access to data, and will benefit from a data-driven communication infrastructure. Such data will be provided across the population of AVs, and will be tailored to the context or service in question. AVs will benefit from actionable data that is available on-time and at a per-vehicle level, with a resolution, granularity, and/or frequency that is tailored to the context or service in question, and that enable the AV to use such data to provide added-value to different applications. A system in accordance with various aspects of the present disclosure will provide dynamic, personalized, and flexible data management mechanisms that may, for example, aggregate contextualized data from multiple sources and sensors, where such data is tailored for different types of services and applications; enable the collection and fusion of different types of data, while enabling customized data filtering, at a vehicle or Cloud level; and provide APIs to enable customized configuration of data sensing mechanisms (e.g., sampling rates, resolution, frequency). Such a system may provide functionality and controls, for example, to enable data distribution for environmental awareness (e.g., context-aware look-ahead), including the deployment of the policies/thresholds that define whether or not to use the data; and deploy mechanisms for data prioritization (e.g., real-time (RT) or delay-tolerant network (DTN) and in what order), as well as policies for data ordering, caching, and/or dropping. The system may also provide the functionality and controls, for example, to perform accounting of the levels of data usage (e.g., based on Bitcoin or credits to use; to allow different stakeholders, parties, fleets, and/or AVs to subscribe to different types, levels, and amount of data through well-defined APIs; and to integrate data from different stakeholders, parties, fleets, and/or AVs through APIs, while fostering data sharing through specific incentives/policies.

A system in accordance with various aspects of the present disclosure provides functionality for collecting and analyzing data to produce analytics that may be used for the operation, control, and management of AVs that, for example, may have self-driven and autonomous functionalities and services. Such AVs may have requirements and needs in terms of communication latency and bandwidth and may, for example, have a need to frequently perform data analytics and to quickly generate knowledge at or near the source of the data. A system as described herein may provide support to such AVs, which may employ local resources that might not be continuously connected to the Internet. A system in accordance with the present disclosure anticipates the operation, control, and management of AVs, as such autonomous vehicles become increasingly more intelligent than vehicles of today, in order to allow the functionalities and services of advanced AVs to behave and/or act as expected and in a reliable fashion. Such a system may be configured to continue to scale and expand the functionality and capabilities, as AVs are endowed with ever increasing computational, storage, and processing resources that allow such AVs to run applications that leverage on resource intensive algorithms such as, for example, object detection and classification, map localization, path planning, video streaming, etc. In addition, a system as described herein supports the operation, control, and management of AVs able to infer further knowledge through sophisticated machine learning or artificial intelligence techniques.

As the focus on the power of big data and analytics increases, a system according to various aspects of the present disclosure may be used to quantify, generate, and aggregate the type and amount of resources, data, and knowledge involved, and may be tailored to feed different services, locally or at the Cloud. Such a system may, for example, provide and/or produce sufficient data/knowledge and derive thresholds/policies to detect and enable just-in-time optimizations of services that may be done locally (e.g., at the edge), or adjust for their integration with fallback to the Cloud. A system in accordance with various aspects of the present disclosure may enable network optimizations through the use of collaborative and continuous shared learning that may be done locally (e.g., to relevant vehicles), or at the Cloud for general learning. Such systems may enable, for example, the detection of anomalies and exceptions in algorithms in use at AVs, and may, for example, send information about them to Cloud, perform corrections or adjustments to the algorithms, and/or send such corrections or adjustment back to AVs. A system in accordance with the present disclosure may log, aggregate and analyze data network connectivity, AV mobility, and data traces of AVs, and may derive patterns of road/highway usage, AV trips, the locations of end-users, and various demands upon the AVs and the system. A system as described herein may also operate to increase AV location accuracy by, for example, correlating GNSS/GPS data of different AVs and integrating such data into value-added maps of expected AV routes, destinations, and origins.

A system in accordance with aspects of the present disclosure provides the functionality that may be needed to support various managed services and applications. Such a system may enable different companies whose goals are to make the cities and fleets smarter, to optimize the operation of a data-driven communication infrastructure and the AVs that it serves by communicatively coupling the AVs to one another and to the Cloud, while making it possible for MaaS providers to get the connectivity and data that they need. In this way, a system as described herein makes it possible for operators of FAVES to, for example, better define AV trips, optimize the operation of FAVES in real-time, enable new forms of AV sharing to ease congestion and lower transportation costs for riders, and provide urban, road, transportation, and fleet planning departments with unprecedented data used to drive their decisions regarding FAVES planning, operation, and maintenance.

In order to help improve management of services and applications, a system according to aspects of the present disclosure may, for example, enable customers, clients, and/or developers to access and deploy services in the same shared AV infrastructure through Software Defined Networking (SDN)/Network Function Virtualization (NFV) functions; and to deploy private, secure, transparent, and portable APIs to access the High-Definition (HD) data (a.k.a., data with high-granularity) and services that may be available at a vehicle and/or Cloud level. A system as described herein may, for example, feed various services with data, events, video streaming and contents, detailed reports, and analysis, and alerts of their usage, health, and diagnostics, making providers, customers, and/or clients more aware of their services. Such a system may enable secure, contextualized, customized, and predictive announcements, advertisements, broadcasting and management of relevant data, events, video streaming and contents to feed such services. A system according to aspects of the present disclosure may determine and prioritize the data that will be relevant for each single service, AV, operator, customer, and/or client based on their needs and requirements; and may make the operation of service "over-the-air" update mechanisms more modular, flexible, reliable, and accountable, while enabling the deployment of management, monitoring, and configuration functions as managed services.

AVs may perform large numbers of real-time, resource-intensive, and critical actions while on-the-move, and most of these actions may be decided and performed locally, without interacting with functionality in the Cloud, because Cloud-based systems might only be accessible through high-latency and/or low-throughput communication links, and/or might not have all the data available that may be used in making accurate and synchronized decisions. A system according to the present disclosure may provide the support needed to enable AVs endowed with such decision-making capabilities to collaborate with one or more nearby AVs and/or with other devices at the edge of the network, which may be locally available. By enabling the operation of distributed, collaborative, and coordinated decision makers, a system according to the present disclosure may enable AVs to leverage information and computing resources of their neighbor devices to carry out substantial amounts of data storage, communication, configuration, measurement, and management functions. This may occur, for example, when the AVs do not have sufficient resources available. In some situations, an AV may, for example, contact resources in the Cloud for increased redundancy or fallback. In this context, a system in accordance with aspects of the present disclosure may provide mechanisms that enable AVs to, for example, provide open and secure APIs to allow AVs from different fleets/owners to announce, advertise, discover and start collaborating with each other in an ad-hoc or peer-to-peer (P2P) fashion, in order to resolve together any coordinated decision that affects the behavior of any data/control/service function. Such a system may enable an AV to, for example, detect whether any decision or management function may be done locally or should be done at the Cloud level, by considering the scope/locality of the function, and a required level of redundancy/fallback. A system as described herein may allow for different levels of interoperability that may include, for example, operability between vehicles, operability from a vehicle to the Cloud (e.g., map information, video streaming, etc.), and operability from the Cloud to a vehicle (e.g., map information, OS updates, etc.) based on, for example, the various communication technologies available (e.g., V2V, V2I, cellular, etc.), the origin of the data (e.g., vehicle, end-user device, sensor, network), and/or the location of data consumers. A system according to the present disclosure may, for example, provide mechanisms to enable distributed negotiations and consensus in the network of AVs, by providing a means for other devices to request needs and to enable AV election and/or enforce AV prioritization when required to perform any distributed action in the network.

When operating a FAVES for MaaS, multiple entities may interact and/or collaborate in order to support service-driven business models built on top of a shared communication and management infrastructure that communicatively couples the AVs. The entities may include, by way of example and not limitation, transit and transportation stakeholders, fleet operators, governmental and legal agencies, AV manufacturers, infrastructure owners, municipal authorities, service providers, and insurance companies. A system in accordance with aspects of the present disclosure may enable various AV-based business models, including functionality related to service pricing and taxation (e.g., data-driven assessment value), payment and charging, incentives, exemptions, cost sharing, travel planning/scheduling, parking space/slot management, road/highway management, delivery management, and weight management.

A system in accordance with various aspects of the present disclosure may provide functionality that helps to make the business models flexible, usable, and scalable, while maximizing the likelihood of using shared AVs. Such a system may operate to, for example, gather the RT and DTN data used to feed the MaaS business models; provide a set of standard open APIs for data access to aid in fostering competition; enable access to and accounting of data related to, for example, any forms of payment accepted for services rendered (e.g., new Bitcoin-based business models such as, pay per data, pay per use, etc.; and provide functionality that supports improvements to customer/client business models by analyzing the impact of data, mobility and connectivity patterns and trends. A system according to various aspects of the present disclosure may provide tools to, for example, determine the impact of the business models on the revenue/costs for any entity sharing the AV infrastructure.

A system according to various aspects of the present disclosure provides functionality that supports a variety of AV tasks and/or actions including, but not limited to, traveling, parking, and or charging. Such a system may, for example, provide functionality used to support travel associated with the pickup, transfer, and offload of passengers, goods, or data, in addition to the actions of traveling to a charging station or a parking slot/space. In addition, an AV travel action may take place to move an AV to a location at which it is needed to perform the above travel actions. A system as described herein may plan, schedule, and/or coordinate such travel actions. In addition, the system may plan, schedule, and/or coordinate a number of activities of the AV during the act of traveling including, for example, uploading and/or downloading data to/from the Cloud; acting as a mobile gateway to the Internet; acquiring and sensing relevant context information for local or general learning; detecting unexpected events and/or behaviors; locally broadcasting, announcing, advertising, and/or sharing media content; providing support for local and/or global services; and providing Internet access to occupants of the AV.

A system in accordance with aspects of the present disclosure may also support functionality related to periods of time when the AV is parked such as, for example, planning, scheduling, and/or coordinating the uploading and/or downloading by the AV of data to/from the Cloud; providing a stable and reliable gateway to the Internet for end-users in the vicinity of the AV; and providing new or additional connectivity of a wireless access infrastructure.

The network-based and transportation-related tasks or actions that may be performed by AVs such as, for example, travelling, parking, gathering data, enabling communications, providing support for services, and providing transportation of people and/or goods each occur within a context. A system in accordance with the present disclosure may use information about context as input to algorithms, functions, and/or policies that may determine whether or not the AV is to, by way of example and not limitation, provide wireless connectivity to vehicle occupants; store or advertise data; travel over a particular route; remain stopped at a certain location; proceed to a charging station or parking place; and/or act as an urban sensor or data courier. It is clear that the example actions listed above are not only related to providing wireless connectivity, but that such actions also affect the AV ecosystem. Additional details are provided below regarding various sets of context information that may affect the AV behavior and/or functionalities.

Various examples of the AV (or components thereof) operating as a data collector and/or courier may, for example, be found in U.S. patent application Ser. No. 15/213,269, filed Jul. 18, 2016, and titled "Systems and Methods for Collecting Sensor Data in a Network of Moving Things;" U.S. patent application Ser. No. 15/228,613, filed Aug. 4, 2016, and titled "Systems and Methods for Environmental Management in a Network of Moving Things;" U.S. patent application Ser. No. 15/245,992, filed Aug. 24, 2016, and titled "Systems and Methods for Shipping Management in a Network of Moving Things;" U.S. patent application Ser. No. 15/337,856, filed Oct. 28, 2016, and titled "Systems and Methods for Optimizing Data Gathering in a Network of Moving Things;" U.S. patent application Ser. No. 15/428,085, filed on Feb. 8, 2017, and titled "Systems and Methods for Managing Vehicle OBD Data in a Network of Moving Things, for Example Including Autonomous Vehicle Data;" U.S. Provisional Patent Application Ser. No. 62/350,814, filed Jun. 16, 2016, and titled "System and Methods for Managing Contains in a Network of Moving Things;" the entire contents of each of which is hereby incorporated herein by reference for all purposes.

Various example aspects of vehicle positioning or route or travel control, vehicle tracking, vehicle monitoring, etc., may, for example, be found in U.S. patent application Ser. No. 15/215,905, filed on Aug. 4, 2016, and titled "Systems and Methods for Environmental Management in a Network of Moving Things;" U.S. Provisional Patent Application Ser. No. 62/415,196, filed Oct. 31, 2016, and titled "Systems and Method for Achieving Action Consensus Among a Set of Nodes in a Network of Moving Things;" U.S. Provisional Patent Application Ser. No. 62/336,891, filed May 16, 2016, and titled "Systems and Methods for Vehicular Positioning Based on Message Round-Trip Times in a Network of Moving Things;" U.S. Provisional Patent Application Ser. No. 62/377,350, filed Aug. 19, 2016, and titled "Systems and Methods for Flexible Software Update in a Network of Moving Things;" U.S. Provisional Patent Application Ser. No. 62/360,592, filed Jul. 11, 2016, and titled "Systems and Methods for Vehicular Positioning Based on Wireless Fingerprinting Data in a Network of Moving Things;" U.S. Provisional Patent Application Ser. No. 62/415,268, filed Oct. 31, 2016, and titled "Systems and Methods to Deploy and Control a Node in a Network of Moving Things;" U.S. patent application Ser. No. 15/351,811, filed Nov. 15, 2016, and titled "Systems and Methods to Extrapolate High-Value Data from a Network of Moving Things;" and U.S. Provisional Patent Application Ser. No. 62/417,705, filed Nov. 4, 2016, and titled "Systems and Methods for the User-Centric Calculation of the Service Quality of a Transportation Fleet in a Network of Moving Things;" the entire contents of each of which is hereby incorporated herein by reference.

A system according to aspects of the present disclosure may gather and/or employ a variety of characteristics or parameters for each of a number of different types of AV contexts. For example, such a system may include functionality that supports entry, collection, and/or use of various characteristics or parameters of a geographic region such as, for example, a city, county, state, province, and/or country. In the context of a geographic region, characteristics such as, for example, the density of available access points (APs) may be stored and used in selecting the routes of AVs, thus providing high-quality and low-cost connectivity for Internet access and upload/download data to/from the Cloud. A system as described herein may employ information about the physical/geographic location(s) of various possible sources of end-user demands that may be placed upon AVs of a FAVES, to optimize the trips of AVs, and/or the number of AVs to be made available at specific geographic locations in order to meet end-user demand for wireless service or transportation at the locations of groups of end-users (e.g., where crowds are located), thus reducing the time that end-users wait for the service(s) provided by the AVs.

A system in accordance with various aspects of the present disclosure may use information about unexpected events in a particular geographic region (e.g., a city) such as, for example, road obstructions, vehicle and/or pedestrian accidents, and/or the closing of roads/highways to allow the system to feed such details to AV trip planning algorithms, as soon as possible. The population of a particular geographic region may also be taken into account by such a system, in that the algorithms used to schedule AVs for the particular geographic region should take into account the density and demographics of the potential end-users in that geographic region, and whether the geographic region is an urban, suburban, or rural area. For instance, the system may plan for an AV that is leaving a city at the end of the day, to wait for more people that will travel to the same region.

A system according to aspects of the present disclosure may, for example, include functionality that supports entry, collection, and/or use of various characteristics or parameters of a network of various types and sizes of roads (e.g., streets, highways, tollways, and the like). For road pricing purposes, such a system may take the type of road (e.g., a municipal road or highway, a one-lane or a two-lane road, whether a toll is charged on the road/highway, whether the road is urban or rural, etc.) into account when planning AV routes, scheduling trips, etc. Such a system may, for example, support the entry, collection, and/or use of various characteristics or parameters related to road congestion and usage. For example, if an end-user chooses to make a trip over a congested road, the end-user may be required to pay a fee based on the levels of congestion of the road on which they choose to travel. A system in accordance with the present disclosure may, for example, operate with a goal of balancing trips over the available roads. In a similar way, a system in accordance with the present disclosure may make it possible for end-users to pay more for travel over a less congested road/route, if such a road/route is available. A system described herein may use information about the density of AVs traveling various roads, may detect that the number of AVs traveling over a specific road is increasing, and may use such information to predict, in advance, which roads should be used to perform trips.

A system according to aspects of the present disclosure may also support the entry, collection, and/or use of various characteristics or parameters related to road conditions. Such a system may monitor obstacles or other problems on the roads used by AVs. The system may be able to predict such obstacles (e.g., based on historical information on road obstructions/issues of the roads of interest), and may advertise such information to AVs and/or system located in the Cloud, in advance, to aid in quickly finding alternate routes for AVs. For road pricing purposes, trips over roads that are in poor condition or that impede travel may be considered to be relatively more expensive, as further travel on such roads makes those roads worse, and may cause additional wear and tear on the AVs in use.

A system according to aspects of the present disclosure may also support the entry, collection, and/or use of various characteristics or parameters related to vehicle parking. Such a system may use such information to direct AVs that are waiting for riders to, for example, move to a traditional parking space/slot, or to continue moving about to find additional riders. Also, the system may use demand information in terms of end-users, connectivity, and data to feed algorithms that decide whether AVs will stay parked to, for example, increase coverage or act a reliable gateway for Internet, or to travel when carrying people or goods. Example details of various systems and methods for performing such operation may, for example, be found in U.S. Provisional Patent Application Ser. No. 62/449,394, filed Jan. 23, 2017, and titled "Systems and Methods for Utilizing Mobile Access Points as Fixed Access Points in a Network of Moving Things, for Example Including Autonomous Vehicles," the entire contents of which is hereby incorporated herein by reference for all purposes.

When an AV has more than one parking place available near a trip destination, characteristics or parameters related to the cost, size, and congestion of those parking places may be evaluated by a system of the present disclosure, to aid in the selection the best parking place at the current time. In addition, when an AV is nearing the destination of the current trip and parking places are available along the trip route, a system such as that described herein may use characteristics or parameters such as, for example, those indicative of road congestion and parking place availability to decide whether to park or to continue traveling, right up to the point of arrival at the trip destination.

A system according to aspects of the present disclosure may also support the entry, collection, and/or use of various characteristics or parameters related to the charging of AV batteries. For example, when the level of charge of the batteries of an AV drops below a certain threshold, a system according to the present disclosure may evaluate the level of charge and the occupancy of nearby charging station(s) to aid the AV in determining whether the AV should stay parked (e.g., acting as a reliable gateway for the Internet) rather than continuing to travel and thereby consume the remaining battery power, or that the AV should share some actions (e.g., carrying end-users or goods) with nearby AVs. Information about the limited electric budget that the AVs may have to perform their operations may be evaluated by such a system. In addition, a system according to the present disclosure may evaluate characteristics and parameters representative of the occupancy/congestion and size/charging capacity of the charging stations currently available, in order to reduce the time that AVs spend charging.

Although the present disclosure frequently describes AVs that employ electricity for propulsion, some AVs may, for example, use other sources of energy. For AV pricing purposes, a system in accordance with aspects of the present disclosure may use characteristics and parameters entered and/or collected by the system to evaluate the fees charged end-users based on the source of energy (e.g., type of fuel) used to operate the AV so that, for example, pricing of end-user fees for use of AVs may be adjusted according to costs of operation, operator and/or governmental policies (e.g., higher usage fees for AVs powered by less-efficient and non-renewable sources of energy).

A system according to aspects of the present disclosure may also support the entry, collection, and/or use of various characteristics or parameters related to fleets of AVs, where the fleets may be of different types of AVs and/or have different owners/operators. For example, there may be different types of public or private fleets of AVs, and each of those fleets may, for example, be operated by a different entity, may run different services, and/or may perform heavy or light operations. A system in accordance with the present disclosure may take into account such information in an AV selection function as, for example, one or more end-user preferences.

A system according to aspects of the present disclosure may, for example, enable balancing the trips requested of a fleet, or the services running on the AVs of a fleet, among all of the AVs of the fleet. Such a system may provide the functionality to permit assignment of priorities to each of the applications running on an AV, to enable management of the limited network resources and/or data capacity of the AV.

Such a system may also provide functionality that enables selection of an AV from a public fleet. Such functionality may be configured to support end-user preferences such as, for example, an end-user preference for an AV having routes that run more frequently, in order to minimize end-user delays, or an end-user preference for an AV that offers a larger number of infotainment services, for end-user convenience and enjoyment.

A system according to aspects of the present disclosure may also support the entry, collection, and/or use of various characteristics or parameters related to features of the AV itself. For example, such a system may be configured with functionality that enables end-users, operators, maintenance personnel, and/or any other authorized individuals or entities to determine the current weight and available space of an AV, to enable one to check, for example, whether an AV has available capacity for additional riders or additional goods. Such information about current weight or available space for riders or goods may be available in real-time to enable, for example, operators to be apprised of situations in which items have been left on an AV (e.g., bags/babies/bombs), by verifying that the weight of the AV before the boarding of a passenger and the weight of the AV after the passenger disembarks, is the same. In addition, a system according to the present disclosure may use such functionality to avoid operating AVs as "zombie cars," that is, AVs that are traveling without passengers, goods, or a purpose for traveling.

A system in accordance with the present disclosure may also support the entry, collection, and/or use of characteristics and/or parameters related to taxes and priority of operations regarding AV activities. Such a system may provide particular functionality supporting AV operation that, for example, is to be exempt from taxes, and/or to give priority to AVs that are travelling due to an emergency (e.g., ambulances, fire service workers, police cars, etc.), those that perform special services (e.g., pharmacy AVs that transport medicines and/or medical supplies, AVs that transport the handicapped, etc.), or AV actions related to a response to a catastrophe. In a similar fashion, such a system may enable the application of particular taxes to the operation of AVs that are considered to be highly polluting vehicles, AVs that are part of a fleet that currently has too many vehicles on the road(s), or other aspects of operation.

A system according to aspects of the present disclosure may also support the entry, collection, and/or use of various characteristics or parameters related to the occupants of the AVs. For example, such a system may provide functionality that allows for the configuration of the cadence, speed, and/or type of advertisements displayed in/on the AV; the selection, operation, and/or the adjustment of applications and services running on AVs according to the age, mood, and/or preferences of the occupants of AVs. In addition, such a system may enable the location and availability of AVs to be targeted to the habits and routines of people working or living in different regions or areas served by the AVs. Further, a system as described herein may provide functionality that permits end-user fees for AV travel to take into consideration the urgency that occupants have to reach a specific place or to move from point A to B.

A system in accordance with aspects of the present disclosure may enable the end-users to choose, book, and pay for their AV trips through their preferred payment options or methods. Such a system may, for example, permit end-user subscription for AV services, using a unified end-user application, which may be configured to operate across different geographic regions (e.g., villages, towns, cities, provinces, regions, states, countries, etc.) and may support end-user access to multiple AVs and fleet operators. Such a system may be configurable to permit end-users to pay a designated fee for a certain number of travel credits or travel miles, or to perform a designated or unlimited number of trips during a particular period of time (e.g., a day, a month, etc.), but to also be able to pay per trip taken.

A system in accordance with the present disclosure may also provide functionality to collect and use the feedback of AV occupants. Such a system may permit operators of the system to review end-user AV trips and indications of the cost, duration, and convenience of end-user trips, and may derive indicators representative of satisfaction/reputation for each AV operator, to enable the operators of AVs to improve their operations and functionality.

A system according to aspects of the present disclosure may also support the entry, collection, and/or use of various characteristics or parameters related to the AV transportation services for goods. Such a system may, for example, enable those using such transportation services to designate delivery times/intervals of goods, and the system may, when determining fees and/or prices for such services, take such into consideration the designated delivery times/intervals for each delivery. In addition, such a system may enable the reservation of delivery slots that may be taken into account in the scheduling AVs trips. The system, in regard to scheduling of AVs trips, may also take into consideration the total amount of goods (and in some instances, riders) to be transported to the same location. A system in accordance with the present disclosure may, for example, schedule a trip to move goods to a specific location only when there is a sufficient (e.g., above a location threshold) amount of goods destined for the same or a nearby location.

A system according to various aspects of the present disclosure may support the entry, collection, and/or use of various characteristics or parameters related to AV trips. For example, such a system may enable end-users to combine or give preference to various modes of transportation (e.g., car, van, bus, train, etc.) when planning an AV trip to travel from point A to B. The system may permit end-users check cost and availability of the various modes of transportation, as well as choosing modes of transportation such as, for example, walking and cycling. Such a system may permit the end-user to set different goals, costs, optimizations, purposes, and/or priorities for each trip. For example, the end-user may choose to indicate that the trip is to move people, data, and/or luggage; to sense/acquire data; to go to a parking place or charging station, or other trip options. The system may permit the end-user to indicate a preference for trips having at most a certain number of stops (e.g., 0, 1, 2, 3, etc.) that will not affect their perceived quality of experience (QoE).

A system in accordance with aspects of the present disclosure may provide the functionality of a common platform for trip planning and payment. Such a system may, for example, permit end-users to share costs with other end-users, and permit the system operator to define, for example, what end-users will pay for each trip or for a set of miles per month. The system may, for example, be configured to provide incentives to end-users to not waste any miles/credits that may remain at the end of a month. Further, such a system may enable AVs to trade trips and costs, based on the amount of resources, data, end-users/occupants/riders, actions, states, and routes that the AVs share. The system may also permit trips by AVs to be prioritized, based on a purpose (e.g., transport people, transport goods, transport data, etc.) or according to a context such as, for example, a normal/regular trip, an urgent trip (e.g., delivering urgent personal, business, and/or government document/data/goods), and/or an emergency trip (e.g., carrying police, fire service, medical personnel/medicine/medical supplies, etc.). The system may provide incentives for end-users and/or suppliers to pick-up/drop-off a certain number of people and/or goods at the same origin/place/destination, at the same time, and may, for example, derive trip fees based on the distance travelled the end-user/goods.

A system according to aspects of the present disclosure may support the entry, collection, and/or use of various characteristics or parameters related to trip fees. Such a system may include functionality that determines trip fees based on location or speed of AVs and the routes that the AVs travel. AV behavior and/or actions may be taken in to account by the system, and the system may consider the expected distance and/or time to arrive at a certain location (e.g., charging station, parking place) in the calculation of trip fees. A system according to the present disclosure may, for example, use the time of day as a factor influencing the number of AVs traveling each road, and/or the number of AVs to be scheduled at a certain location.

A system according to aspects of the present disclosure may also support the entry, collection, and/or use of various characteristics or parameters related to a data network used by the AV. Such a system may enable an operator/client to map various services and/or applications running on AVs to the different communication technologies (e.g., Dedicated Short Range Communications (DSRC) (e.g., IEEE 802.11p), Wi-Fi (e.g., IEEE 802.11a/b/g/n/ac/ad), cellular (e.g., 4G (LTE), 5G, etc.) or network configurations available. The system may provide functionality that permits such mapping to take into account types of access points (APs), support of mobility by the communication technology, a level of security supported/provided by a communication technology, agreements, etc.).

A system according to aspects of the present disclosure may enable any kind of decision, action, or communication performed within an AV to be evaluated based on the scope/locality of the decision, action, or communication. For example, a system such as described herein may, for example, enable decisions, actions, and/or communications that involve only the AV; that affect other AVs that are nearby an given AV; and/or that affect an entire fleet of AVs through, for example, services of or communication via the Cloud. Such a system may, for each kind of decision, action, and/or communication performed within a supported AV, take into account the level of redundancy or reliability that is required, and/or the level of interoperability that is involved including, for example, between vehicles (i.e., V2V); from a vehicle to the Cloud (i.e., V2I), e.g., mapping info or maps, video streaming, etc.; and from the Cloud to a vehicle (i.e., I2V), e.g., maps or mapping information, operating system (OS) updates, etc.).

A system according to various aspects of the present disclosure may support the entry, collection, and/or use of various characteristics or parameters related to various levels of network congestion. Such congestion may, for example, be in the form of messages or other data transported over a wireless or wired network. Such a system may support the entry, collection, and/or use of various characteristics or parameters related to network congestion such as, for example, the number of AVs on roads; the amount of data now flowing or that has been transported in the past, to/from the Cloud; the number of messages/sessions/communications occurring within a geographic region or area (e.g., village, town, city, county, province, state, etc.) or at a specific geographic location; bandwidth requests from different AVs; and trip requests from different end-users, clients, etc. A system in accordance with various aspects of the present disclosure may take such characteristics or parameters into account when determining/planning/scheduling what actions an AV may perform or which road an AV may travel.

A system according to aspects of the present disclosure may also support the entry, collection, and/or use of various characteristics or parameters related to the data being communicated and/or transported. For example, such a system may classify and/or prioritize the type of data to be sensed, transmitted, dropped, and/or shared (e.g., media content, sensor data, advertisements, notifications, end-user data, etc.) based on the requirements or needs of the various stakeholders, fleets, AVs, and/or parties (e.g., operators, clients, end-users).

A system according to the present disclosure may include functionality that enables the entire AV ecosystem take into account the origin of data being communicated and/or physically transported, both in terms of the entity that owns or publishes such data (e.g., a vehicle, end-user, sensor, network, etc.), the location of consumers of such data (e.g., fleet operators, telecommunications companies, insurance companies, vehicle occupants/riders/end-users, etc.), and the applications and/or services that request such data.

A system according to the present disclosure may, for example, provide APIs to permit an end-user and/or client to subscribe to various types of data services and/or an amount of data transported by a subscription service; to assign credits to end-users and/or clients to enable such to use a particular communication service or communicate a certain amount of data involved in performing a particular action;

and/or to monitor and track (e.g., perform accounting on) the amount of data usage of an application, an end-user, and/or a client.

Such a system may take into account the urgency of the data, which may be used by the system to influence decisions such as, for example, whether a particular piece of data is to be sent in real-time, or may be communicated using delay-tolerant networking, and whether such data is to be given priority over other types of data. Such a system may enable the entry, collection, and/or use of various policies regarding, for example, the ordering of data, the caching/storage of data, and/or the dropping of data by AVs or other elements. Example system and method aspects related to such delay-tolerant networking may be found in U.S. patent application Ser. No. 15/353,966, filed Nov. 17, 2016, and titled "Systems and Methods for Delay Tolerant Networking in a Network of Moving Things, for Example Including a Network of Autonomous Vehicles," the entire contents of which is hereby incorporated herein by reference for all purposes.

A system according to various aspects of the present disclosure may support the entry, collection, and/or use of various characteristics or parameters related to services provided by AVs. Such a system may include the functionality to enable AVs to give priority to specific types of services such as, for example, those services related to safety including, for example, police/law enforcement, fire service, medical/ambulance services (i.e., "first responders"). A system according to the present disclosure may take into account the preferences and/or needs of those requesting a specific service, or the context or environment in which that service is to be applied. A system as described herein may, for example, enable configuration of AVs and data network elements appropriately for each service to be provided, taking into consideration an amount of data used by a given service, the amount of processing power that may be involved in running complex functions or algorithms associated with provision of a given service, and/or whether high-bandwidth/low-latency links are required by a given service to be provided either in centralized or in a distributed way, either at a vehicle (e.g., AV) or a Cloud level.

A system in accordance with various aspects of the present disclosure may be configured to optimize the operation of a network of autonomous vehicles including, for example, minimizing the amount of time spent by an AV looking for parking places or charging stations; minimizing the amount of time spent waiting for a nearby parking place or a charging station; and/or minimizing the number of AVs per road segment or overall road congestion by AVs. Such a system may also optimize the operation of a network of AVs by, for example, maximizing the amount of time that an AV is travelling without being empty; and/or minimizing the amount of time spent transferring a payload (e.g., a person, an item, and/or data) from point A to point B. A system according to the present disclosure may optimize operation of a network of AVs by, for example, maximizing the amount of data offloaded by the AV, while minimizing the amount of data offloaded at the same location or through the same wireless access point.

Such a system may enable one or more AVs to increase wireless connectivity coverage, and may enable configuration of a network of AVs to minimize the data latency and increase network data throughput, while providing connectivity to end-user devices. A system according to the present disclosure enables an operator to maximize the amount of data connectivity provided to the activities in a geographic region (e.g., village, city, county, province, state, etc.), while maximizing the safety and security of operation of one or more AVs. Such a system enables an operator of a network of AVs to maximize the QoE provided by an AV or a fleet of AVs, and to distribute resource usage among all the AVs of a fleet.

There are large numbers of AV services and applications that may involve high-bandwidth and low-latency communications. AVs may operate in different working modes or states, and therefore may need access to relevant context information, to enable the operations/actions that the AVs will perform in those states. Each AV may require different degrees or levels of wireless connectivity in terms of, for example, the communication technologies used (e.g., DSRC, Wi-Fi, cellular, etc.), the amount of network bandwidth needed, and requirements regarding the amount of network latency that the services and/or applications of the AVs are able to tolerate. In addition to transporting people or goods, AVs may also be used to acquire and transport data. Therefore, some trips and wireless connectivity opportunities may need to be evaluated while keeping in mind not only the transportation of people and/or goods, but also service and application opportunities that are focused on the acquisition and transportation of data.

Many of the services and applications running on an AV are primarily interested in maximizing their communication network throughput or minimizing their packet latency, independent of the types of communication technologies (e.g., connectivity) or the amount of radio frequency (RF) spectrum available to the AV. In accordance with various aspects of the present disclosure, the control of access to the wireless connectivity resources of an AV may be selective and context-aware, and is not handled as a simply first come, first served arrangement. In accordance with the present disclosure, certain services and/or applications of an AV may be given higher priority access to wireless connectivity resources of the AV such as, for example, services and/or applications that deal with issues regarding safety/emergency, or services and/or applications that manage and/or perform updates to the AV software and hardware. In accordance with the present disclosure, each service or application resident on an AV may have a different scope. For example, in a first example scenario, a service and/or application may be performed entirely on a single AV, while in a second example scenario, the service and/or application may involve actions of a group of two or more AVs that are near one another and may involve the help of a fixed access point (AP). In a third example scenario, a service and/or application may involve actions of a system in the Cloud. In accordance with aspects of the present disclosure, the type of wireless connectivity (e.g., the communication technology such as DSRC, Wi-Fi, cellular, etc.) and the allocation of connectivity resources (e.g., the amount of bandwidth, RF spectrum) to the service or application may be tailored according to the service or application. In accordance with aspects of the present disclosure, some decisions regarding connectivity may be done in-advance, to take advantage of specific context and connectivity opportunities available at a particular time.

Aspects of the present disclosure define an intelligent, adaptive, and context-aware method and system for connectivity and technology selection in the AV space, which encompasses a number of features. For example, an AV in accordance with various aspects of the present disclosure may classify the services/applications running on the AV, may identify the communication requirements of those services/applications, and may map those communication requirements to a set of communication technologies or pieces of available RF spectrum. AVs according to aspects of the present disclosure may prioritize some applications over others by, for example, giving a higher priority to serving the communication needs of applications requiring high-capacity, high-throughput, low-latency communication, or to those applications that are location-aware.

An AV in accordance with various aspects of the present disclosure may receive triggers from critical applications (e.g., applications or services related to safety such as medical/fire/law enforcement, etc.) or network nodes that are within communication range of the AV, and may provide limited access to connectivity to those non-critical applications or specific network nodes. An AV according to the present disclosure may, for example, take into account information in what may be referred to herein as a "profile" of the AV. An "AV profile" may, for example, characterize actions that an AV may perform when operating in one or more specific states (e.g., charging stage, transporting state, parking state, etc.) based on a specific situation/category/context (e.g., operating as a data courier, collecting data from sensor(s), communicating via RF wireless communication (e.g., providing Wi-Fi (e.g., IEEE 802.11a/b/g/n/ac/ad) connectivity for nearby network nodes (e.g., AVs) or end-user devices), provide communication/transport in emergency/catastrophe situations, etc.). Providing communication, transportation, and/or data collection support in such situations may involve assigning priorities for use of wireless connectivity/access by different applications based on different profiles (and those profiles may be driven and/or triggered by different entities, e.g., self on AV, network, factory, context, etc.). Several triggers may be defined to change AV operation from one state to another, and thereby change the wireless connectivity features that should be made available. An AV in accordance with various aspects of the present disclosure may constantly monitor the quality of each service or application that is being provided by the AV (e.g., in terms of quality of service (QoS) or quality of end-user experience (QoE)), and may automatically adapt the amount of bandwidth/capacity, the type(s) of communication technologies, and/or the times slots allocated to provide wireless connectivity used to feed each service or application.

Figure 5:
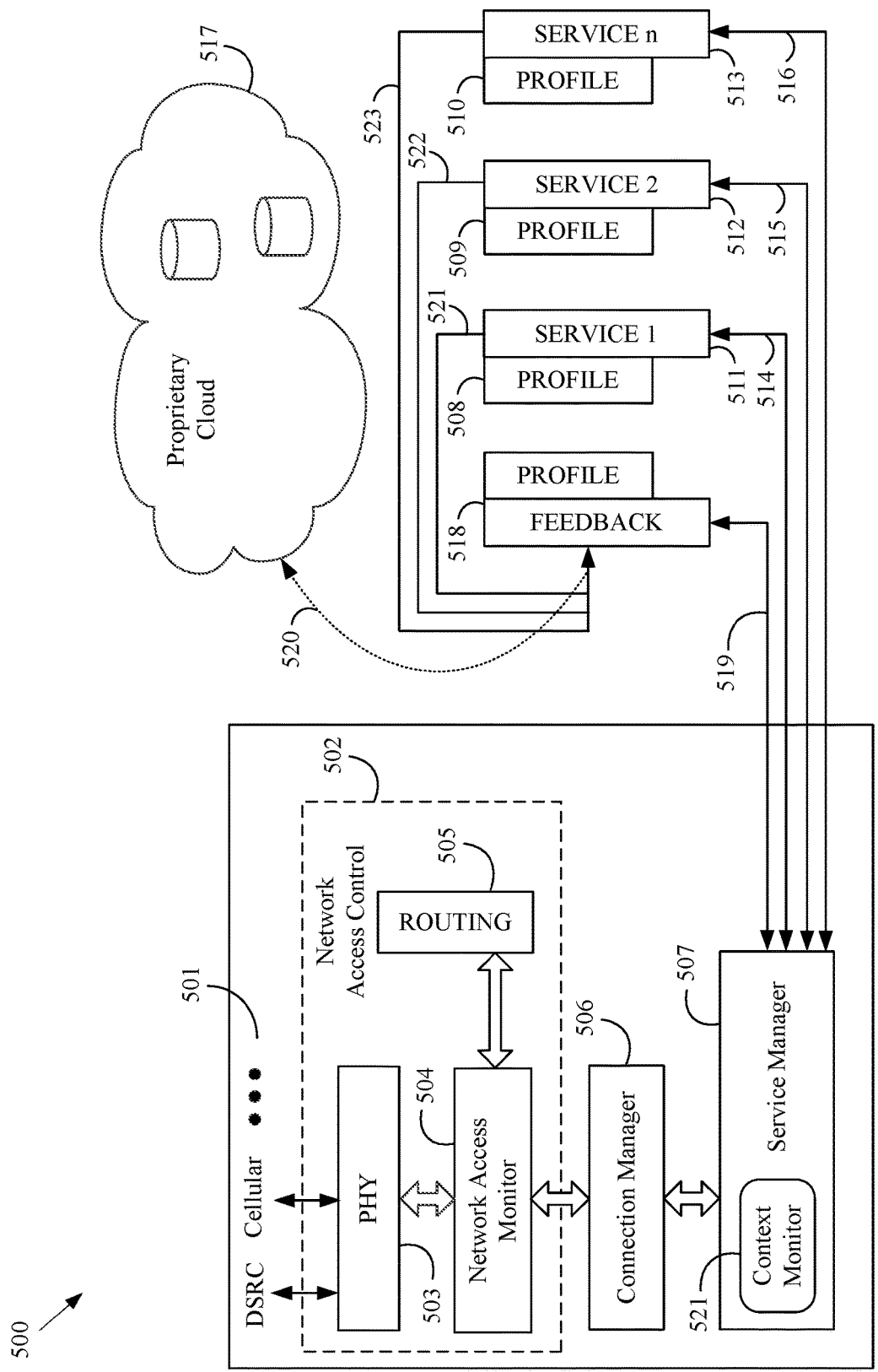
FIG. 5 is a block diagram that illustrates an example architecture of a system that may reside in an autonomous (AV) operating in a network of moving things, in accordance with various aspects of the present disclosure.

FIG. 5 is a block diagram that illustrates an example architecture of a system 500 that may reside in an AV operating in a network of moving things, in accordance with various aspects of the present disclosure. The example system 500 may, for example, share any or all characteristics with the other example methods, systems, networks and/or network components 100, 200, 300, 400, and 600, discussed herein (e.g., MAPs, FAPs, etc.).

At any point in time, the example AV system 500 may support the air interfaces of any of a number of different communication technologies 501, using physical layer interfaces (PHY) 503 (and/or MAC layer interfaces) that may include, for example, Direct Short Range Communication (DSRC) (e.g., IEEE 802.11p), wireless cellular service (e.g., Code Division Multiple Access (CDMA), Time Division Multiple Access (TDMA), Universal Mobile Telecommunications Service (UMTS), Global System for Mobile communication (GSM), "3G," "4G," Long Term Evolution (LTE), "5G"), Bluetooth, Wi-Fi (IEEE 802.11a/b/g/n/ac/ad), Ethernet, etc.). The available communication technologies may be used to fulfill different communication requirements of the services and/or application running on the AV system 500 including, for example, throughput/bandwidth requirements, delay/latency requirements, data security requirements, and communication range (i.e., physical distance) requirements. The example AV system 500 illustrated in FIG. 5 includes a number of different functional blocks including a network access control (NAC) block 502 that comprises a physical layer interface (PHY) block 503, a network access monitor block 504, and a routing block 505. The AV system 500 also comprises a connection manager block 506, and a service manager block 507 that communicates with services Service 1 511, Service 2 512, and Service n 513. Note that a block may also be referred to herein as a module.

The network access control (NAC) block 502 of FIG. 5 represents the functionality of the low-level, system layer that manages and monitors communication channel access for each communication technology. The PHY block 503 of the NAC block 502 may be responsible for translating each communication requirement from the network access monitor 504 to features of a specific wireless communication standard covering a certain wireless communication technology.

The network access monitor block 504 of FIG. 5 represents functionality that monitors and selects which configuration is to be applied to each available communication technology. Each communication technology may be configured in a specific way, depending on the device in use. The network access monitor block 504 may interact directly with the PHY block 503, based on requests issued by the connection manager block 506. A "successful" configuration is a configuration for which the PHY block 503 returns a "success" indication, upon the configuration being applied by the network access monitor block 506. The network access monitor block 504 may, for example, keep track of the current status (e.g., channel availability, channel load, signal strength, number of end-users currently connected, etc.) of each communication channel of each communication technology. The network access monitor block 504 may also be responsible for notifying the routing block 505 about new successful configurations, so that the routing block 505 may act upon the known new configurations, and may enable Internet Protocol (IP) routing if needed. For example, in accordance with aspects of the present disclosure, a network access monitor (e.g., network access monitor block 504) may report to a higher protocol layer that a new neighbor is offering Internet access via a certain communication technology (e.g., DSRC) using a particular "channel" (e.g., channel 180). The higher protocol layer may, at some future time, request a connection via the Internet access capability of the new neighbor. In such a situation, the network access monitor may request that the PHY (e.g., PHY block 503) provide a configuration of a device to enable use of the certain communication technology (e.g., DSRC) via the particular channel (e.g., channel 180). If a device capable of employing the certain communication technology (e.g., DSRC) is able to be configured to operate on the particular channel (e.g., channel 180), the PHY (e.g., PHY block 503) may then return an indication of "success" to the network access monitor (e.g., network access monitor 504), which then reports to the higher protocol layer that the request was applied successfully.

In accordance with various aspects of the present invention, the connection manager block 506 may act on requests from the service manager block 507, and may make use of communication technology availability and current status information reported by network access monitor block 504. The connection manager block 506 may signal back to the service manager block 507, the establishment of a requested connection to a specific service. The connection manager block 506 may handle the networking part of the system configuration for a specific wireless connection, allowing the system to use a certain communication technology/communication channel. The connection manager block 506 may also provide a way for the service manager block 507 to request of the connection manager block 506 that, for example, a certain fixed access point (FAP) be "blacklisted," or that availability of a specific communication technology be ignored, even if the network access monitor block 504 has reported that specific communication technology as available (e.g., valid).

The service manager block 507 of FIG. 5 may, for example, react to the registration of a new service profile 508, 509, 510 of a corresponding Service 1 511, Service 2 512, or Service n 513, by translating the new service profile 508, 509, 510 into the form of a request to the connection manager block 506. Such a request for a Service 511, 512, 513 may, for example, identify a specific communication technology that is to be used with the requested service including, for example, the use of DSRC emergency messages using WAVE Short Message Protocol (WSMP) (e.g., IEEE std 1609.3), and/or specific communication channel configuration characteristics. In addition, a new service may specify the configuration for a specific communication technology. Such configuration parameters/information/characteristics may include, by way of example and not limitation (in the case of DSRC), an operating channel (e.g., channel 180), a maximum transmission power (e.g., 23 dBm), a data rate (e.g., a relative data rate of 9 Mbps). Additional examples of configuration parameters/information/characteristics for DSRC may be found in, for example, IEEE std 1609.4. Configuration parameters/information/characteristics for other communication technologies such as, for example, Wi-Fi (e.g., IEEE 802.11a/b/g/n/ac/af) may also include a specification of radio frequency channel, as well of security methods (e.g., WEP, WPA, WPA2, etc.) There are many ways for specifying the type of communication connection a specific service (511, 512, 513) needs.

In accordance with aspects of the present disclosure, various types of communication connections may include, for example, a delay tolerant connection where, for example, the service 511, 512, 513 wanting to use the network is able to wait until a suitable communication is available (e.g., when a stable connection is available, or when network congestion is at a minimum) at some point in the future. This may be possible because the data to be transferred has already been generated and stored at the AV, and may be transferred later when availability of a suitable communication connection with acceptable communication conditions has been verified and signaled by the connection manager block 506. Example systems and method aspects for delay tolerant network may, for example, be found in U.S. patent application Ser. No. 15/353,966, filed Nov. 17, 2016, and titled "Systems and Methods for Delay Tolerant Networking in a Network of Moving Things, for Example Including a Network of Autonomous Vehicles," the entire contents of which is hereby incorporated herein by reference.

In accordance with aspects of the present disclosure, the various types of communication connections may also include, for example, a connection that provides immediate access. This may be employed where, for example, a specific service (e.g., Service 1 511, Service 2 512, Service n 513) wants a communication connection to a destination, no matter what type of communication technology will be used by the connection manager. This may also be referred to herein as a "don't care" connection, in that the nature of the data to be communicated is such that the service requesting the communication connection doesn't care about the characteristics (e.g., cost, capacity) of the connection. For example, a service that monitors the Cloud for new configuration updates or software updates might not be concerned about the type of communication technology used for performing such a monitoring action. Such a monitoring action by an AV might not be delay tolerant, in that the service may require an immediate answer.

In accordance with aspects of the present disclosure, the various types of communication connections may include, for example, a need for "strict immediate access" in which the Service 1 511, Service 2 512, and/or Service n 513 that requests that the communication connect satisfy a number of strict demands regarding a communication connection. Some examples of such demands may include, by way of example and not limitation, the use of a specific communication technology, or a communication technology that meets some or all of the requirements discussed herein. Such demands may then be passed to the connection manager block 506 that, among other responsibilities, may identify an available communication connection that fulfills all of the requirements of the requesting service. One example of a service that may have a need for "strict immediate access" may be an "emergency" service that requires a stable communication connection, with low latency/delay, but does not require a communication path having high throughput/bandwidth. Another example of a service that may have a need for "strict immediate access" is a service that has need for access to the Internet, having a goal of a certain limit (i.e., depending on the profile for the service) for a maximum delay/latency and a reasonable throughput, so that end-users have a good QoE.

There are other additional types of demands that a service may pass to the service manager block 507 within the profile for the service (e.g., service profiles 508, 509, 510) including, for example, service priority, communication protocol type (e.g., WSMP, IP, all), security (e.g., none, Wireless Equivalent Privacy (WEP), Wi-Fi Protected Access (WPA), WPA2, IPsec, etc.), target identifier (e.g., media access control (MAC) address), location related inputs (e.g., a specific range of distance, a geo-fence that defines regions in which to allow or disallow wireless communication, etc.), wireless communication technology (e.g., one or more of, or all of DSRC, wireless cellular service (e.g., CDMA, TDMA, UMTS, GSM, "3G," "4G," LTE, "5G"), Bluetooth, and/or Wi-Fi (IEEE 802.11a/b/g/n/ac/ad), and/or response time (e.g., an amount of time to be permitted with a connection (e.g., a request expiry time)).

A service manager of each AV, such as the service manager block 507 of FIG. 5, may share the global context of an AV at a particular point in time. An AV global context may include what may be referred to herein as an AV context mode and an AV context state. An AV context mode may include, for example, transportation mode (e.g., when the AV is transporting people and/or goods), charging mode (e.g., when the AV is stopped and is in the process of charging the batteries of the AV), parked mode (e.g., when the AV is stationary in a parking location, waiting on a new job or activity), moving mode (e.g., the AV just finished its most recent job/activity and does not yet have a new job/activity, so the AV will seek a parking location and/or the AV is approaching the starting point for new job/activity (e.g., picking up something and/or someone)), and offline/idle mode (e.g., not in any other mode). An AV context state may include, for example, a context state in which the AV acts as an Internet service provider (i.e., "Internet"), a context state in which the AV performs sensor data acquisition (i.e., "data sensing"), a context state in which the AV acts as a "middle node" (e.g., extending connectivity to others by routing data), and a context state in which the AV is handling an emergency (i.e., "emergency").

In accordance with aspects of the present disclosure, a service manager of each AV system, such as the example service manager block 507 of FIG. 5, may use information shared by each neighbor node to decide how to take advantage of each one of them at a certain moment in time. The context monitor block 521 of FIG. 5 is a sub-block of the service manager block 507, and may, in accordance with some aspects of the disclosure, handle some or all of the AV context input coming from the network and from a feedback service 518 of FIG. 5, thus allowing the AV to then control its context mode and context state, as discussed herein. The following is an example of how an AV in accordance with the present disclosure may handle the information coming from local neighbors (e.g., neighbor AVs, neighbor nodes in general, etc.).

In such a scenario, a first service manager (e.g., service manager block 507) of a first AV may be requested to provide Internet access, and may receive information from a context monitor of two neighbor AVs, where the first neighbor AV is parked as a "middle node," and the second neighbor AV is transporting people while providing Internet access. The context monitor (e.g., context monitor block 521) of the first neighbor AV may act by signaling to the first AV that the service manager (e.g., service manager 507) should ask the connection manager (e.g., connection manager block 506) of the first AV to select the first neighbor AV as its next hop, since the first neighbor AV has a greater probability of getting a good backhaul connection to the Internet. Besides local information, the feedback service (e.g., feedback service block 518) may, for example, also receive a request from the operator/owner of the first AV and the first and second neighbor AVs (e.g., a fleet owner), requesting that the first AV change its context mode to "charging mode." Upon reception of such request, the feedback service (e.g., feedback service block 518) of the first AV may notify the context monitor (e.g., context monitor block 521) of the first AV, acting accordingly.

As discussed herein, the term "service" may be used to refer to an entity that is willing to use the AV system in order to send data throughout the network that connects AVs. In accordance with various aspects of the present disclosure, each service (e.g., Service 1 511, Service 2 512, Service n 513 of FIG. 5) may have a corresponding service profile (e.g., profiles 508, 509, 510, respectively) that may comprise a number of metadata items/elements that identify/describe the service. One or more example metadata items/elements have already been discussed herein, for example, the "service type." The profile for a service may also, for example, include a metadata item/element that identifies the "protocol type" to be used during communication, which may limit the communication technology or the number of communication channels available. WSMP and IP are examples of protocols that have restrictions for some standards. For example, WSMP may only be transmitted in its pure form via a DSRC wireless link. Therefore, a service attempting to send a WSMP message when no DSRC link is available may find that the WSMP message is dropped or is encapsulated in IP frames. In the case of such encapsulation, the connection manager (e.g., connection manager block 506) may be forced to establish a tunnel for WSMP-IP transfer between the current network node (e.g., AV) and the target network node. In such a situation, the identity of the target node may also be one metadata item/element in the service profile, so the service manager may pass that information to the connection manager as part of the request. IP frames may be transmitted via DSRC with some restrictions, which may vary depending on the regulations of each country. For example, all current standards for DSRC (e.g., 5.9 GHz-IEEE-802.11, IEEE std 1609.x, and the European Telecommunication Standards Institute (ETSI)) prohibit the use of IP frames on the control channel. So, for a system where DSRC is only available on the control channel, it may be necessary to send IP frames over other technologies, such as cellular, being that DSRC is not available.

Another example metadata item/element that may be required to be present in the service profile is "service priority." A service manager may use the service priority to set/adjust the bandwidth available for a specific service, depending on the implementation. For example, a high-priority service may get full channel bandwidth, while a lower priority service may share channel bandwidth with another lower priority service. Additional information about what is referred to as "alternate channel access" may be found in, for example, IEEE std 1609.4. As discussed herein, an "emergency" service may be handled with the highest priority compared, for example, to a "data logging" service. For a service having a service priority of "emergency", the service manager may make sure that no other service is going to interfere with it, being that the "emergency" service has the highest priority. For example, any service using the system for low latency communication may be shut off so that the emergency service may use the system at its full performance. Even though service priority may be processed as a strong input to the service manager, a service with a relatively lower service priority may ultimately be prioritized higher than a service having a relatively higher service priority, for example if the service manager (e.g., service manager block 507) concludes there are currently no conditions that enable the relatively higher priority service to run. For example, a service that offers Wi-Fi, in-vehicle access to an Internet connection may be idle, if no end-users are currently detected as accessing that service. In this case, the relatively higher priority service may acquire a communication channel as soon as an end-user registers (e.g., finishes authentication) itself on the Wi-Fi side.

The feedback block 518 of FIG. 5 represents functionality that may be viewed as a "special" service (e.g., feedback block 518 may be considered to be "service 0") that gathers feedback 521, 522, 523 from local services 511, 512, 513, and may manage a local data source 519 (e.g., a sensor device such as GNSS/GPS) that feeds the service manager 507 with information that may be used for deciding, in close proximity to the connection manager block 506, which communication connection may be a better choice for a specific service of the AV. The feedback block 518 may, for example, have its own service profile, and may communicate via a communication link 520 with the Cloud 517, to gather remotely located historical information stored on a data base at the Cloud 517. Such information may then be fed to the service manager block 507 as input 519. An example of such a local data source being employed with remotely accessible historical information is the use of local GNSS/GPS information coming from a local service (e.g., a GNSS/GPS receiver of an AV) being used together with remotely located, historical information (e.g., at Cloud 517), from which a probability of a successful wireless connection of a network node (e.g., the AV) to a fixed AP (not shown) at or near a specific geographic location/area, may be derived. Using such information, the service manager block 507 may decide whether or not to request the connection manager 506 to "blacklist" the fixed AP.

It should be noted that the discussion herein is provided as an example of the use of a service profile, and is not intended to be limiting in any way, as many other, different examples fall within the scope of the present disclosure.

Figure 6:
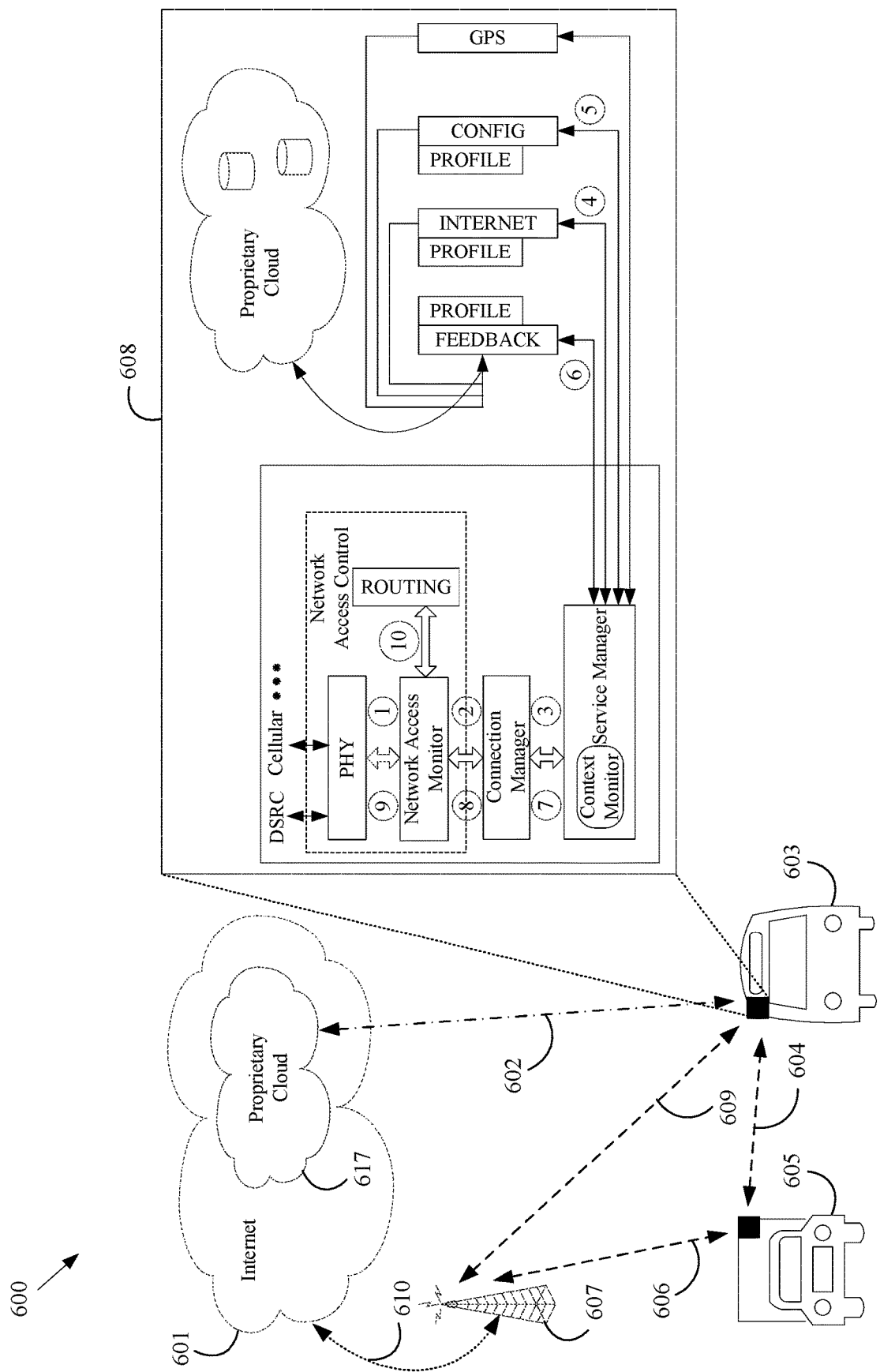
FIG. 6 is a block diagram illustrating how the functional blocks of an AV system interact with one another during an example flow of information involving an AV system of an autonomous vehicle, a neighbor autonomous vehicle, a fixed access point, and a Cloud accessible via the Internet, in accordance with various aspects of the present disclosure.

FIG. 6 is a block diagram illustrating how the functional blocks of an AV system interact with one another during an example flow of information involving an AV system 608 of an autonomous vehicle 603, a neighbor autonomous vehicle 605, a fixed access point 607, and a Cloud 617 accessible via the Internet 601, in accordance with various aspects of the present disclosure. The functional blocks of the AV system 608 of FIG. 6 may correspond to, for example, similarly named functional blocks of the AV system 500 of FIG. 5, described in detail herein. The example system or network 600 may, for example, share any or all characteristics with the other example methods, systems, networks and/or network components 100, 200, 300, 400, and 500, discussed herein.

The illustration of FIG. 6 shows a first network node, the AV system of the AV 603, communicatively coupled via a DSRC link 604 to a second network node, the AV system of AV 605, which is communicatively coupled via a DSRC link 606 to a third network node, fixed AP 607. The fixed AP 607, as shown in FIG. 6, is communicatively coupled to the Internet 601 via an Ethernet connection 610. As also shown in FIG. 6, the AV systems of the AVs 603, 605 may detect one another as neighbors using the DSRC links 604, 606, 609. The numbers within the ten numbered circles in the illustration of the AV system 608 of FIG. 6 represent the order of an example sequence of actions/steps performed by the functional blocks of the AV system 608, as described in further detail, below.

At action/step 1, the physical layer interface (PHY) block of the AV system 608 may provide information about any wireless networks that the PHY has detected to the network access monitor block, thereby making the network access monitor block aware of the neighbor AV 605, the fixed AP 607, and the characteristics/conditions of the corresponding wireless (e.g., DSRC) links 604, 609. Such characteristics/conditions may include, for example, information about message/packet latency/delay to the Internet through both of wireless links 604, 609, throughput/bandwidth available via the wireless links 604, 609 to both of the neighbor AV 605 and the fixed AP 607, and the maximum communication range determined by the communication technology. The PHY block may also report to the network access monitor block that a cellular network connection 602 is available, and that, for example, the cellular network connection 602 has a relatively higher latency and a relative lower throughput than the DSRC wireless links 604, 609.

Next, at action/step 2, the network access monitor block may report to the connection manager block of the AV system 608 that Internet access is available via DSRC wireless links 604, 609 via two different neighbor nodes (i.e., neighbor AV 605 and fixed AP 607), and that a cellular connection is available.

Then, at action/step 3, the connection manager may signal the service manager of the AV system 608, indicating that a connection to the Internet is possible, both through DSRC wireless links (e.g., wireless links 604, 609) and a cellular network (e.g., cellular network 602).

At action/step 4, a service block that is configured and able to provide Internet access to Wi-Fi end-users inside the AV 603 ("INTERNET") may request use of a suitable communication connection by passing the service profile of the "INTERNET" service, to the service manager block of the AV system 608. The service profile of the "INTERNET" service may include, for example, metadata items/elements representing values for the maximum acceptable communication link latency/delay and the minimum acceptable communication link throughput/bandwidth, and may include, for example, metadata items/elements indicating a service type of "strict immediate access" and a service priority of "high."

At action/step 5 of the example, another service block ("CONFIG") may, at or about the same time as action/step 4, attempt to communicate with a resource located in the Cloud 617, in order to check whether a new configuration update is available for the AV system 608. The "CONFIG" service block may send a request to the service manager block of the AV system 608, requesting a communication connection, and may pass the service profile of the "CONFIG" service block to the service manager block. The service profile sent by the "CONFIG" service block may, for example, include metadata items/elements indicating that the service type of the "CONFIG" service block is "don't care" immediate access, and that the service priority is "low."

Next, at action/step 6, the feedback service block ("FEEDBACK") of the AV system 608 may receive historical data from, for example, the Cloud 617. The received historical data may, for example, indicate that the quality of wireless communication between a network node (e.g., AV system 608 that resides in AV 603) and the fixed AP 607 of FIG. 6 is typically degraded in the specific geographic area at which the AV 603 (in which AV system 608 is installed) is currently located. In accordance with various aspects of the present disclosure, the feedback service block of AV 608 may, for example, confirm the indications of the historical data upon detecting loss/degradation of wireless communication with fixed AP 607 using, for example, location information received from a GNSS/GPS service ("GPS") block. The feedback service block may, for example, pass such information to the service manager block of AV system 608.

At action/step 7, the service manager block may request the connection manager block to ignore (e.g., "blacklist") the fixed AP 607, and may establish a connection for the highest priority service, the Internet provider service block "INTERNET", through wireless link 604 to the network node located in neighbor AV 605.

Next, at action/step 8, the connection manager block of AV system 608 may request the network access monitor block to perform a channel configuration, in order to match the communication link conditions of the AV system 608 to those of the AV system of AV 605.

At action/step 9, the network access manager block of AV system 608 may translate the request from the connection manager block to perform a channel configuration, into the application of channel configurations to the DSRC communication technology, by requesting the PHY block of the AV system 608 to establish a wireless connection between the network node (e.g., the AV system 608) of AV 603 and the network node 605 (e.g., the AV system of the AV 605).

At action/step 10, the network access monitor block of the AV system 608 may request the routing block to route the data traffic generated/coming from the "INTERNET" service block to the Internet via the neighboring AV 605, since the neighbor AV 605 because the AV 605 has been advertising to other AVs/network nodes that the AV 605 is providing access to the Internet. Along with a physical channel configuration (e.g., a configuration of a communication technology) that an AV (e.g., AV 605) is using, the AV may report the IP configuration that is to be used for routing purposes over the network. Additional details may be found, for example, in IEEE std 1609.3. Such information may either be part of a WAVE Service Advertisement (WSA) "routing part", or another, possibly "vendor-specific frame" that comprises IP information needed for other network entities to connect/route their data traffic through the neighboring AV network node that is advertising Internet access.

In accordance with various aspects of the present disclosure, all functional blocks of the above sequence of actions/steps may signal an acknowledgement back to the previous block in the sequence (i.e., "up the chain"), upon success or error in performing the indicated action/step, including signaling by the service manager block to each affected service block. Such signaling may be used to indicate whether the connection has or has not been successfully established, and whether communication according to a particular response time, has or has not been established.

In accordance with aspects of the present disclosure, once a communication connection request for the currently highest priority service (e.g., in this example, "INTERNET") has been completed, the service manager block may then select a pending communication connection request for a service having a service priority that is the next service priority lower than that of the service for which a communication connection was just established (i.e., the next-highest priority service). In the current example, the establishment of a communication connection for the configuration update service ("CONFIG") would be the next request processed after the request for connection of the highest priority service (i.e., "INTERNET"). In processing that connection request, the service manager of an AV system (e.g., AV system 608), when performing actions/steps 7, 8, 9, and 10 may request that lower blocks in the chain of functional blocks (e.g., the connection manager block, network access monitor block, routing block, and PHY block) connect and route the data traffic coming from the configuration update service block ("CONFIG") to a cellular network connection, and to not disturb the established (e.g., DSRC) communication connection of the higher priority service ("INTERNET"). Note that the example just presented is only one example of updating, which may be performed in any of a variety of manners. For example, additional examples of systems and method for performing software and/or configuration updating are provided in U.S. patent application Ser. No. 15/157,887, filed on May 18, 2016, and titled "Systems and Methods for Remote Software Update and Distribution in a Network of Moving Things;" U.S. patent application Ser. No. 15/138,370, filed on Apr. 26, 2016, and titled, "Systems and Methods for Remote Configuration Update and Distribution in a Network of Moving Things;" U.S. Provisional Patent Application Ser. No. 62/378,269, filed Aug. 23, 2016, and titled "Systems and Methods for Flexible Software Update in a Network of Moving Things;" and U.S. Provisional Patent Application Ser. No. 62/376,955, filed Aug. 19, 2016, and titled "Systems and Methods for Reliable Software Update in a Network of Moving Things;" the entire contents of each of which are hereby incorporated herein by reference.

In the future, and aligned with autonomous vehicles and the concepts of future mobility, AVs may have other purposes besides carrying people and/or goods from point A to point B. AVs will be part of the physical infrastructure and the living city in which they operate. Thus, the trips that AVs make, the data that AVs carry, the sensors and the connectivity services that AVs provide are preferably intelligently scheduled in order to leverage all the features of the AVs towards an optimized city infrastructure.

Since AVs are able to be used for multiple purposes, it is important to define their control and management taking into consideration the different modes in which AVs may operate, the characterization of those operation modes, and the context changes that trigger the AVs to change the operation mode.

The overall infrastructure of a village, town, city, or other geographic/governmental are or region and the respective citizens can benefit from a well-defined orchestration of fleets of AVs and may leverage the capabilities of the AVs. To accomplish this, it is necessary to define rules/policies/functions/processes to adapt the operating mode of an AV or of a set of AVs, in order to meet the optimization goals from the point of view a governmental agency for a geographic area or region and/or an operator of a fleet of AVs. For example, the rules/policies/functions/processes used to adapt the operating mode may be configured to minimize the amount of time that the AVs are looking for parking spots; to minimize the amount of time that the AVs are parked and not charging (e.g., for AVs operating from batteries), to decrease the number of parking places and/or charging stations; and to decrease the number of AVs stopped in traffic. The rules/policies/functions/processes used to adapt the operating mode may also be configured, for example, to minimize the time an AV is circulating about a geographic region empty (i.e., without passenger(s), goods, or data to transport); to minimize the amount of time needed to transport passenger(s) from point A to point B; to maximize the amount of offloaded data; to minimize the amount of time spent uploading sensed data to the a remote system (e.g., the Cloud); and to avoid accidents between AVs, between AVs and other vehicles, and between AVs and pedestrians.

These optimization processes may involve an adaptation of the operation mode of the AVs on, for example, a fleet-wide basis, including a high-level of coordination directly between the AVs themselves or assisted by third-party elements such as, for example, fixed APs at intersections on roadways, and/or coordination of AVs over a larger geographic area or operating region as provided from a remote, centralized system such as, for example, a cloud-based system.

Some aspects of the present disclosure define the systems and methods for operating a data-driven networking infrastructure optimized to meet the goals of the operator of a fleet of AVs. Other aspects of the present disclosure define the systems and methods that will be used to select the best mode of operation of an AV or a fleet of AVs to optimize a city infrastructure. Additional aspects of the present disclosure define the control, adaptation, and update methods that will influence the working mode of an AV, or of a fleet of AVs according to the context of the AVs. Various aspects of the present disclosure may support dynamically adapting features of communication and transportation infrastructures formed of AVs, to optimize the infrastructure of a city and quality of life for the residents and visitors, and enable collaborative learning strategies between AVs, APs, and a cloud-based system to select the AV actions that lead to a common fleet/city goal.

In accordance with various aspects of the present disclosure, an AV or a fleet of AVs may be deployed to provide a variety of different services and operate in a variety of different modes, to make the most of the capabilities of the APs to optimize goals of the fleet operator and the of those responsible for the infrastructure of a city. An AV may be equipped with interfaces supporting a wide variety of features including, by way of example and not limitation, wireless networking including, for example, Wi-Fi (e.g., IEEE std802.11a/b/g/n/ac/ad), cellular (e.g., 3G, 4G, LTE, CDMA, GSM), Direct Short Range Communication (DSRC) (e.g., IEEE 802.11p); and "urban sensing" that employs various sensors of urban conditions including for example, atmospheric conditions (e.g., temperature, humidity, sunlight) and/or environmental conditions (e.g., levels of various gases/pollutants, road/traffic conditions, noise levels); and/or computing resources. Thus, an operating mode of an AV is not restricted to transporting people, goods, and/or data from point A to point B. In accordance with various aspects of the present disclosure, managers of cities/towns/villages/precincts/states/countries may leverage the capabilities of an AV or a fleets of AVs by, for example, orchestrating the AVs towards a mode of operation that benefits the infrastructure of the city, while making the most of the available resources. Various aspects of the present disclosure describe an orchestration model for fleets of AVs that takes into consideration context information to determine a mode of operation of an AV or fleet of AVs in which the mode of operation is driven by the optimization goals of the managers of the city.

In order to orchestrate the operation of a fleet of AVs and to define the processes to optimize the operation of the fleet, it is helpful to first describe the basic operation of an AV. In accordance with various aspects of the present disclosure, the operation of each AV may be defined by one of a plurality of what are referred to herein as "Modes" and one of a plurality of what are referred to herein as "States." It is also important to define an AV context that triggers the transition from one particular Mode to another Mode, or the activation or deactivation of a particular State while in a particular Mode.

Figure 7A:
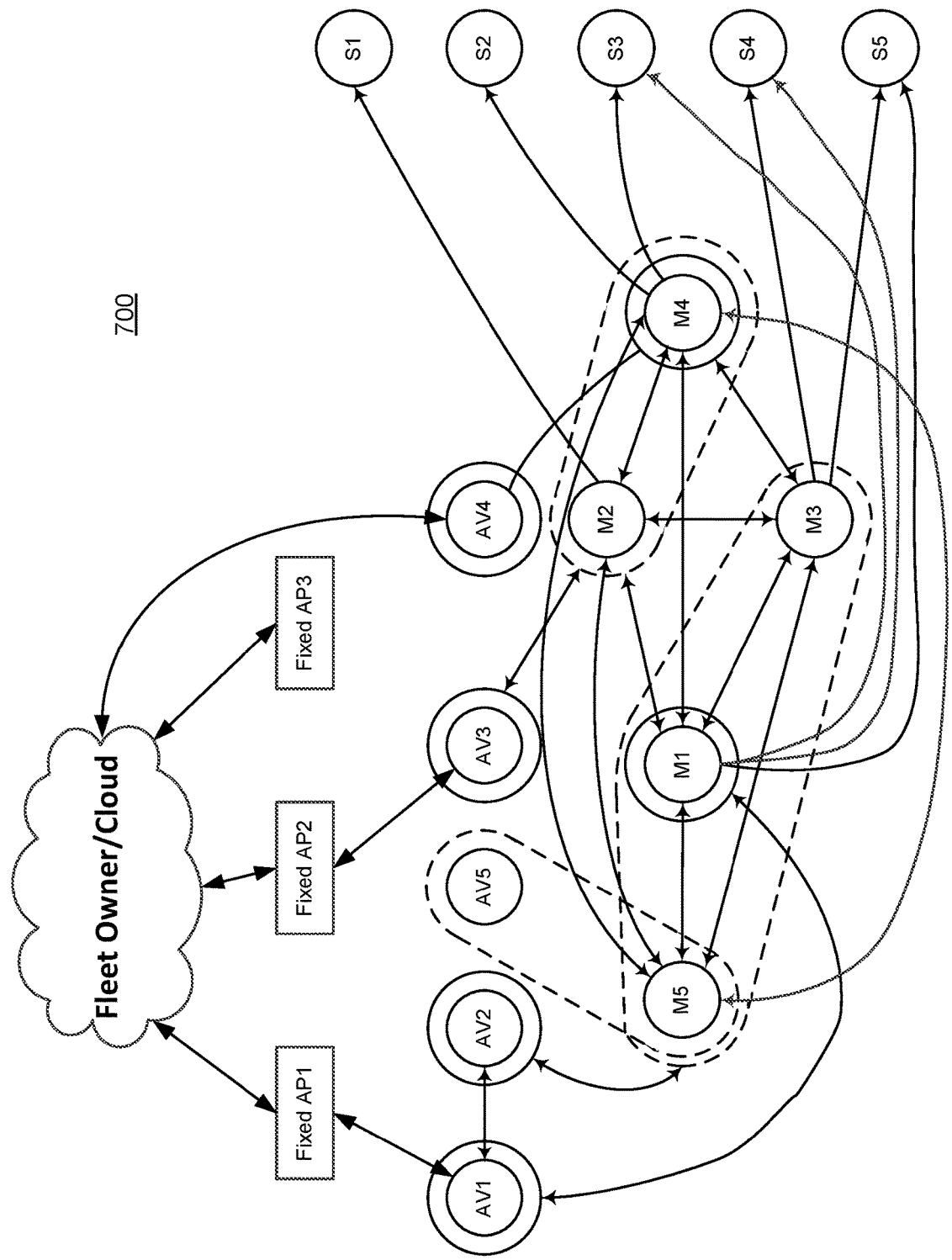
FIG. 7A shows a transition diagram illustrating a number of Modes and a number of States of an example process of operating an AV, in accordance with various aspects of the present disclosure.

FIG. 7A shows a transition diagram illustrating a number of Modes and a number of States of an example process of operating an AV, in accordance with various aspects of the present disclosure. As shown in FIG. 7A, each AV may operate in one of a plurality of Modes M1, M2, M3, M4, and M5 corresponding to the transportation behavior of the AV. The operation of an AV can be described as being in four main Modes M1, M2, M3, and M4, corresponding to Modes of operation referred to here "Transport Mode," "Charging Mode," "Parked Mode," and "Offline Mode," respectively. In accordance with some aspects of the present disclosure, Modes of operation may be primarily related with the transportation-related functions of an AV. FIG. 7B is a table illustrating example Mode and State transitions of the AVs of FIG. 7A, in accordance with various aspects of the present disclosure.

In accordance with aspects of the present disclosure, the term "Transport Mode" may be used to refer to a Mode of the AV in which the AV is in the process of transporting passengers, goods, and/or data from a first location to a second location. The Transport Mode may be managed taking into consideration the requirements of the passengers, goods, and/or data including, for example, time, cost, connectivity, exclusiveness, and ecosystem friendliness. For example, a passenger of an AV may not require the exclusive use of the AV. In that case, the AV may be shared with one or more other passengers along an AV route that may be a compromise among the interests of the passengers, goods, and/or data carried by the AV. In accordance with aspects of the present disclosure, passengers, goods, and/or data may be transported simultaneously by the AV, unless one of these payloads (e.g., each having its own client) requires exclusive use of the AV.

In accordance with various aspects of the present disclosure, in instances in which AV transport time is not an issue for the passengers, goods, and/or data being transported, different transport optimization strategies may be applied in an attempt to make the most of the infrastructure of the city. For example, an AV may be routed over less congested roads; or may be routed over roads that require more "urban sensing," as described above, without compromising a reasonable transport time. AVs may, for example, travel over particular routes at lower speeds for, by way of example and not limitation, sightseeing reasons, may load additional data, and/or may actively anticipate traffic congestion. While each of these types of Transport Mode operation may have a different validated business model to support it, aspects of the present disclosure enable a high level of flexibility in addressing the needs of the clients (e.g., passengers, shippers, city manager).

In accordance with aspects of the present disclosure, the term "Charging Mode" may be used herein to refer to the operation of an AV when batteries used for propulsion and/or data processing and communication are being replenished, either through an actual electrical connection to an external power source, or during activities such as the harvesting of energy of motion of the AV to brake or slow the vehicle to recharge the batteries used for AV operation. In accordance with certain aspects of the present disclosure, the "Charging Mode" may be in effect when the AV is stopped to replenish AV batteries, while in accordance with other aspects of the present disclosure, the "Charging Mode" may be in effect concurrently with other modes of the AV, and the AV may, for example, be in "Charging Mode" while in "Transport Mode." Operation of an AV in Charging Mode may take priority over the other operating modes described herein, due to its importance in maintaining normal operation of the AV. Before entering into Transport Mode, the AV may, for example, check the current context information for the AV and the details of any pending requests for transportation/travel, to determine with confidence, whether the AV has sufficient electric power resources to successfully complete the pending transport/travel request. In accordance with various aspects of the present disclosure, an AV may, for example, operate to minimize interruptions of transport/travel requested, for the purpose of charging, and may continually look for charging opportunities by, for example, identifying the location(s) of nearby charging station(s), to enable the AV to charge the electrical storage capacity of the AV whenever the AV does not have a pending transport/travel request.

In accordance with aspects of the present disclosure, the term "Parked Mode" may be used herein to refer to that period of operation of the AV that is entered whenever there are no requests for transportation/travel by the AV. The parking location may be selected according to the context information of the AV of interest and of the fleet of AVs to which the AV of interest belongs, and the services being provided by the AV. Entry of a particular AV into Parked mode may, for example, be triggered/assisted by one or more cloud-based services that take a higher-level perspective of the service(s) provided by the particular AV and/or a fleet of AVs into consideration such as, for example, the positioning of all the AVs of the fleet and the dynamics of each AV. For example, a system according to the present disclosure may choose to park AVs at locations with historical or projected higher demand for services (e.g., transportation of passengers/goods/data) based on context information from all vehicles of a fleet; and/or may choose to park AVs at locations where the time to reach the clients (e.g., passengers, goods, and/or data) can be minimized, taking into consideration the traffic conditions and the location of other AVs.

In accordance with aspects of the present disclosure, a mode of operation referred to herein as "Offline Mode" may refer to a period of time during which an AV is not part of a networking infrastructure formed by a fleet of AVs. In such a situation an AV may, for example, be completely shut down (e.g., powered off), in the process of undergoing maintenance, or in a condition of reduced functionality and/or power consumption (e.g., a "sleep" mode/sub-mode).

In accordance with various aspects of the present disclosure, an AV may operate simultaneously in more than one Mode. Several such examples may be seen in the illustration of FIG. 7A. Operation in Parked Mode and Charging Mode at the same time is one example of such operation in more than one Mode at the same time. AVs may, for example, be configured to give preference to parking spots that permit charging, and may select parking spots with faster charging stations, if there is a good compromise between the distance to such a faster charging station, and the time saved during charging. In some instances, an AV may be in Charging Mode, which may activate the Parked Mode. In accordance with some aspects of the present disclosure, an AV without pending transport requests may trigger the Parked Mode, and the AV may then take advantage of a charging capability of the parking spot by activating Charging Mode.

In accordance with some AV operating scenarios described herein, simultaneous operation in Transport Mode and Charging Mode may be possible. For example, Charging Mode may be triggered during braking, to recover AV kinetic energy. In addition, an AV equipped with solar panels may, for example, simultaneously operate in Transport Mode and Charging Mode, in Parked Mode and Charging Mode, and in Offline Mode and Charging Mode. An AV in accordance with aspects of the present disclosure may also be equipped to support wireless charging, where energy for charging AV power storage is conveyed using inductive, radio-frequency, or other wireless means.

An AV in accordance with various aspects of the present disclosure may also operate simultaneously in Transport Mode and Parked Mode, when the AV is loading and/or unloading data from/to other AVs or the infrastructure elements described herein, while the AV is parked. Depending upon the amount of data that AVs are to transport, the unloading/loading of data may involve parking one or more AVs in proximity to one another or in proximity to infrastructure elements (e.g., a fixed AP), to aid in faster data transfer.

In addition to the operating Modes described above, an AV operating in one of the Modes described above, with the exception of the Offline Mode, may operate in one or more of what are referred to herein as "States." The illustrative examples of FIGS. 7A and 7B show operating States S1 through S5.

An AV in accordance with various aspects of the present disclosure may be equipped with one or more sensors that enable the autonomous behavior of the AV (e.g., magnetic compass/magnetometer, accelerometer(s), GNSS/GPS receiver(s), laser range finder(s), an on-board diagnostics interface (OBD/OBD II), etc.). The data produced by those sensors may, for example, be analyzed on a larger scale to improve AVs performance (e.g., the creation/confirmation of 3D mapping information). Thus, the AV may offload large amounts of information to remote systems such as, for example, one or more cloud-based systems (e.g., the Cloud of FIGS. 1, 5, 6, and 7A). In addition to the sensors employed as part of AV operation, the AV may be equipped with a wide variety of sensors to measure "urban data," described in further detail above. An AV in accordance with various aspects of the present disclosure may, for example, be considered to be operating in a "Data Sensing State" when the AV is collecting data from AV sensors and/or urban sensors. In accordance with various aspects of the present disclosure, such AV and urban sensor data may be cached in the AV, and then offloaded to a cloud-based system at a later time.

An AV in accordance with various aspects of the present disclosure may, for example, transport data between fixed elements of the infrastructure of the city/town/village/county/state/country in which the AV operates, and the cloud (e.g., via fixed APs or cellular), or from/to other AVs. An AV in accordance with various aspects of the present disclosure may, for example, be considered to be operating in a "Data Courier State" during transportation and offloading of such data. The AV may attempt to maximize the amount of offloaded data, on a per location basis. The AV may be aware of the resources available and the respective limitations of each resource, and may balance resources (e.g., the use of fixed APs) along the city infrastructure. In accordance with aspects of the present disclosure, an AV may, for example, opportunistically collect data produced by urban sensors placed along the roadside (e.g., at fixed locations) and transport such data to a location (e.g., a fixed AP) at which the data may be offloaded to a cloud-based system. An AV may, for example, deliver information content to elements of the infrastructure of a city such as, for example, advertisements to bus stops, billboards, and mass transit (e.g., buses, taxis, and trains). The data produced within a first AV may, for example, be transported by another AV to a location (e.g., a fixed AP) at which the data may be offloaded to a cloud-based system, if the AV determines that such a transfer reduces an amount of time needed to complete the upload. AVs in accordance with aspects of the present disclosure may adapt their routes and speed of travel, including coming to a halt, according to the data transfer needs to which the AVs were assigned. In accordance with various aspects of the present disclosure, AVs may communicate with one another in order to determine whether the data that the AVs carry may be transferred between AV in order to reach the destination of the data in a shorter amount of time.

In accordance with various aspects of the present disclosure, an AV may, for example, act as a wireless access point supporting Wi-Fi compatible (e.g., IEEE 802.11a/b/g/n/ac/ad) or other radio frequency (RF) data communication interfaces that may be used to provide wireless Internet access inside and outside of the AV. An AV in accordance with various aspects of the present disclosure may, for example, be considered to be operating in a "Wi-Fi Hotspot State" when the AV is providing Wi-Fi wireless access to devices within wireless communication range of the AV.

AVs in accordance with various aspects of the present disclosure may, for example, act as nodes of a dynamic wireless mesh network, in order to increase wireless connectivity coverage area, expand connectivity services, and increase the wireless coverage and the size of the audience accessing wireless communication services. An AV in accordance with various aspects of the present disclosure may, for example, be considered to be operating in a "Connectivity State" when wirelessly connected to one or more other nodes (e.g., AVs such as AV 603) via a wireless network (e.g., Wi-Fi, DSRC).

In accordance with various aspects of the present disclosure, an AV may, for example, provide in-vehicle services such as "Infotainment," "Advertisement," "Telepresence," "Remote Work," and/or "Mobility as a Service (MaaS)", to name just a few examples. An AV in accordance with various aspects of the present disclosure may, for example, be considered to be operating in an "In-Vehicle Services State" when providing any of the above-named, or other, in-vehicle services.

AVs in accordance with aspects of the present disclosure may be triggered to be part of a resilient communication infrastructure that may be deployed to provide data communication and/or other services at accident scenes, and/or to bring supplies, to assist emergency service teams. Events such as a loss of power over a geographic region such as a village/town/city/county/etc. may also trigger actions by one or more AVs. An AV in accordance with various aspects of the present disclosure may, for example, be considered to be operating in a "Disaster/Catastrophe State" when triggered to provide such data communication or other services as described above.

In accordance with various aspects of the present one or more AVs (e.g., a fleet) may be deployed and optimized to serve a particular event with particular needs, both in terms of transportation needs but also in connectivity needs. For example, at a concert/conference/sports venue, services provided by one or more AVs may be chosen/adjusted to maximize a live event experience including, for example, venue context information, advertisement(s), and/or scheduling of the availability/readiness of AV(s). An AV in accordance with various aspects of the present disclosure may, for example, be considered to be operating in an "Events State" when operating to support the particular needs regarding transportation, connectivity, or other aspects of a particular event.

In accordance with various aspects of the present disclosure, transitions between operating Modes and the turning-on/turning-off of operating States may be influenced by specific AV context, active services, and/or the types of data being gathered, processed, and/or communicated by the AV. For example, an AV in accordance with aspects of this disclosure (e.g., AV 603 of FIG. 6) may provide controls regarding what types of data and what triggers characterize each Mode of AV operation or AV action.

Figure 8:
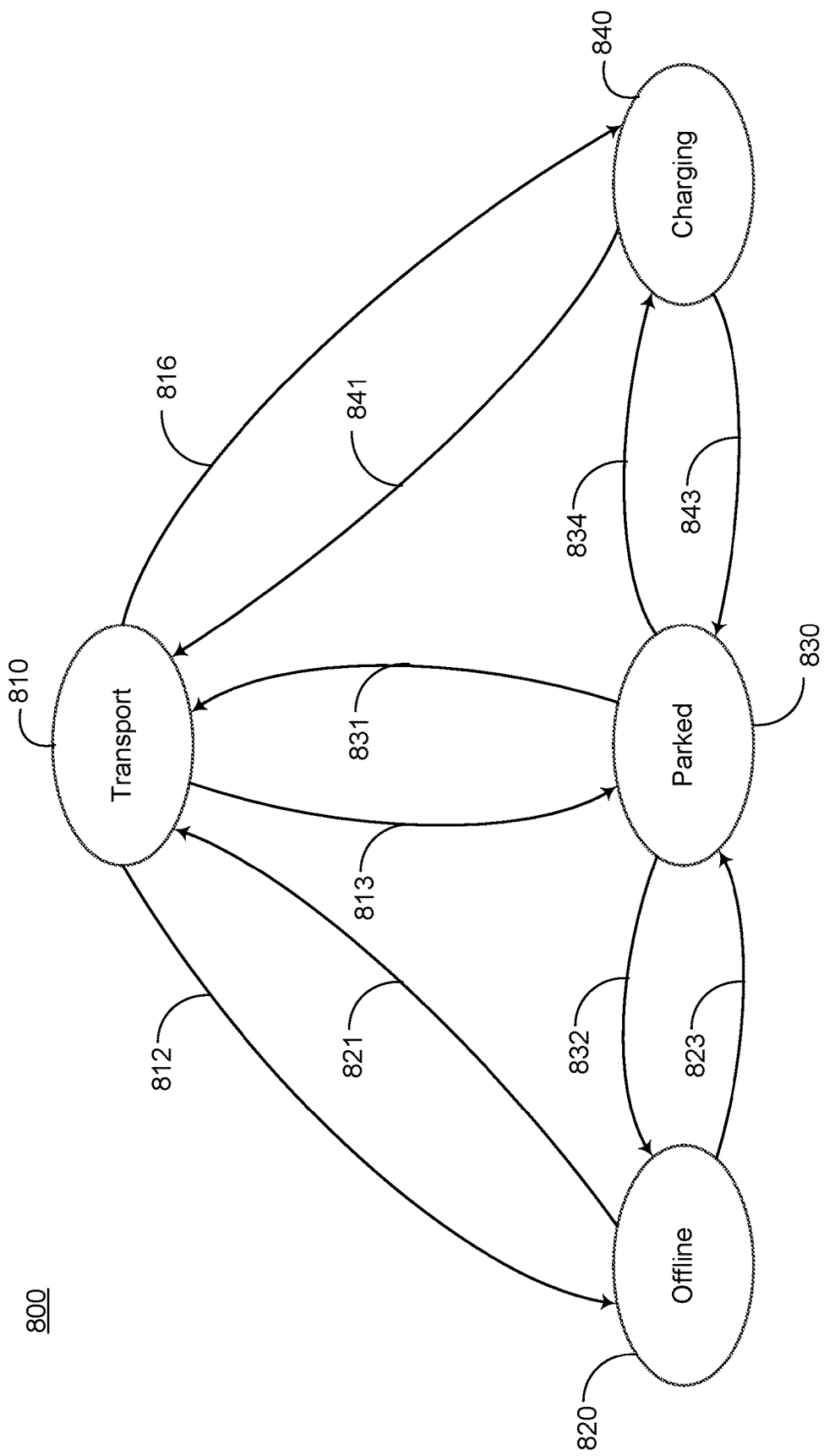
FIG. 8 is an example mode transition schema showing possible transitions among Transport Mode, Parked Mode, Charging Mode, and Offline Mode that may correspond to the similarly-named operating Modes discussed above with regard to FIGS. 7A-7B, in accordance with various aspects of the present disclosure.

FIG. 8 is an example mode transition schema 800 showing possible transitions among Transport Mode, Parked Mode, Charging Mode, and Offline Mode that may correspond to the similarly-named operating Modes discussed above with regard to FIGS. 7A-7B, in accordance with various aspects of the present disclosure. The following discussion, which provides examples of policies and rules that may be used to govern changes from one operating Mode to another, as well as example policies and rules that may be used to determine when to turn-on/turn-off a specific AV State when operating in a specific AV Mode, may make reference to the elements of FIGS. 1-6. The illustrative example Modes of FIG. 8 include representations of a Transport Mode 810, an Offline Mode 820, a Parked Mode 830, and a Charging Mode 840, and the various possible transitions from one of those four example operating Modes to another operating Mode, that are offered here for illustrative and not limiting purposes.

In accordance with aspects of the present disclosure, a transition from the Parked Mode 830 to the Transport Mode 810, shown in FIG. 8 as transition 831, may occur when, for example, an AV (e.g., AV 603) that is currently in the Parked Mode 830 receives a request to transport a client (e.g., passenger(s), good(s), and/or data). While operating in the Transport Mode 810, an AV may enable different operating States, taking into consideration the context information acquired by the AV. Examples of AV context information have been previously discussed above. For example, if an AV (e.g., AV 603) was requested to provide a passenger with transport service, the AV may activate one or more operating States (e.g., States such as S1 to S5 of FIGS. 7A-7B), according to a user profile for the passenger. The user profile for the passenger may indicate that the passenger is permitted to have access to a basic "Wi-Fi Hotspot State" (as previously discussed above), but has not subscribed to Infotainment services. The route over which the passenger is transported may, for example, be leveraged by the AV to acquire more information for a third party such as, for example, a town, city, state, or company, using the "urban sensors" of the AV itself, and may collect data from other sensors (e.g., roadside sensors) as well, thus operating activating the "Data Sensing State" and "Data Courier State" discussed above.

When operating in Transport Mode, a goal of operation of the AV may be to go from a starting point to a destination in a shortest amount of time. However, taking into account all features that an AV may have, a likely goal of an AV in Transport Mode may be to provide a best experience (e.g., quality of service (QoS)/quality of experience (QoE)) to the client (e.g., the passenger(s), data owner(s), municipalities (city/town/state/country), emergency service(s) (e.g., first responders)). Thus, during the AV's journey from the starting point to the destination, the priority of the operating State(s) may be to manage AV operation according to AV context information, to maximize the service experience for the client. As mentioned above, the possible requirements for transport (e.g., travel time, cost, connectivity, and/or exclusiveness (i.e., exclusivity of use)) may be very flexible, and optimization of operation of the Transport Mode may be dependent on degree(s) of freedom allowed by those requirements. For example, an AV may be transporting a passenger, and may simultaneously have States such as, for example, the "Data Sensing State" and "Data Courier State" (previously described above) activated, as well as the "Wi-Fi Hotspot State". When used at the same time, operating an AV with those States activated may involve support for a considerable amount of communication bandwidth, and whenever the available connectivity resources are scarce, the AV may prioritize and manage the States of operation that are activated. In the case of limited communication resources, an AV operating according to States such as the "Data Courier State" and/or the "Data Sensing State" described above may, for example, be disabled, so that the operation according to the "Wi-Fi Hotspot State" may use the available resources, and not impair/impact the quality of service experienced by the client, in this example, the passenger of the AV. In accordance with other aspects of the present disclosure, depending on the business model applied, the operation of the "Data Sensing State" may prevail over the remaining States, since it may be critical at certain times or places to collect certain information where the AV will travel.

In accordance with aspects of the present disclosure, a transition from the Transport Mode 810 to the Parked Mode 830, shown in FIG. 8 as transition 813, may occur at an AV when, after finishing the transportation of one or more clients (e.g., one or more passengers, goods, and/or data), if an AV (e.g., AV 603) determines that the AV has no more requests for transportation, and the AV changes to the Parked Mode. A simple Parked Mode strategy in accordance with aspects of this disclosure may be for the AV to park in the physically nearest parking spot available. However, more intelligence (e.g., based on available context information) may be applied at transition 813 so that the AV may automatically be parked at a "smart" parking location. When in Parked Mode, the AV may, for example, autonomously activate almost any State of FIGS. 7A-7B, with the possible exception of the example "In-Vehicle Services State." In accordance with various aspects of the present disclosure, an AV in Parked Mode may, for example, be triggered to activate the Connectivity State to act as a connectivity expansion node, while simultaneously operating according to a Wi-Fi Hotspot State in which the AV provides Wi-Fi (e.g., IEEE 802.11a/b/g/n/ac/ad) wireless Internet access to the devices of nearby end-users. In accordance with various aspects of the present disclosure, an AV may also be equipped with exterior visual displays, so that triggering of a corresponding AV operating State may cause advertisements to be shown to people in the vicinity of the AV. In accordance with aspects of the present disclosure, an AV may also be parked due to data sensing/courier needs, in which Data Sensing State and/or Data Courier State may be triggered/activated, for example, if a client (e.g., a village, town, city, or other third party) needs to collect information at certain geographic locations for an extended period of time and does not have fixed sensors available at the certain geographic location.

In accordance with various aspects of the present disclosure, AV operation may be optimized by, for example, selecting a location at which to park an AV based on current and/or historical transport requests and/or the geographic location(s) of remaining AVs of a fleet. Moreover, the selection of a parking location may take into consideration the location of charging stations, so that each AV may leverage the time that the AV is stopped to charge and improve the availability of the AV. In addition, the process of selecting a parking location may take into account the quality of service and cost of available wireless connectivity at parking locations, also taking into account the quantity of data that the AV itself generates and collects that is to be uploaded. Any process used to determine whether to transition from the Transport Mode to the Parked Mode may also take into account an amount of time that an AV has been travelling empty, and/or an amount of time that the AV has spent looking for a suitable parking place. Information about geographic location(s) and time(s) at which AVs find available parking/charging places may, for example, be uploaded by the AVs for analysis by one or more cloud-based systems, to be used in optimizing planning of parking/charging locations, to help reduce the number of required parking/charging places.

In accordance with aspects of the present disclosure, a transition from other Modes of operation described herein (e.g., Transport Mode, Parked Mode) to the Charging Mode, illustrated in the example of FIG. 8 as transitions 816 and 834 may take priority over any other service request, due to the importance of having an adequate available supply of electrical power for the operation of the AV. It should be noted that although the present disclosure uses an example of an AV that is propelled and in which other systems may also be based on electrical power stored in the AV, the use of electric propulsion is not necessarily a limitation of the present disclosure, and is used merely as an example, as other forms of energy (e.g., petrol, alcohol, natural gas, hydrogen, etc. that involve refueling rather than charging) may be used for propulsion. In accordance with various aspects of the present disclosure, an AV may be in Transport Mode 810 and transition to Charging Mode 840 in two example scenarios. In the first scenario, an AV (e.g., AV 603) may complete a transport request and may determine, (e.g., based on AV context information) that the AV needs to charge before accepting further transport requests. In response to determining that it needs to charge, the AV may make transition 813 from the Transport Mode 810 to the Parked Mode 830, and may then make the transition 834 from the Parked Mode 830 to the Charging Mode 840. In a second scenario, an AV may determine that an unexpected event has occurred that has caused the AV to reach what may be referred to herein as a "critical state of autonomy," while in the process of serving a transport request in Transport Mode 810, and may then make transition 816 to Charging Mode 840 to charge before proceeding with the transport request.

The Charging Mode 840 of an AV in accordance with aspects of the present disclosure may also be activated when in Parked Mode 830, if the geographic location at which the AV is parked is equipped to support charging of the AV. It should be noted that charging of the electrical energy storage of the AV may occur whenever sufficient sunlight is available, if the AV is equipped with solar panels. Thus, the "Charging Mode" and the "Parked Mode" may co-exist. In this way, an AV may make the most of the time spent while stopped when the AV has no pending transport requests. In this situation, after completion of charging while in Charging Mode 840, the AV may then return exclusively to the Parked Mode 830.

It should be noted that Charging Mode 840 may also be activated while in the Transport Mode 810 due to energy recovery during braking, energy produced by solar panels on the AV, and/or wireless charging systems that may be leveraged by a fleet of AVs to reduce the amount of time an AV must be stopped to charge its electrical energy storage. The States of AV operation that may be activated when in Charging Mode 840 are similar to the States that may be activated while in Parked Mode 830, and may help make the most of the stopped time and location of the AV while charging.

In accordance with various aspects of the present disclosure, AV operation may be optimized in an attempt to maintain a full or complete charge while always in Transport Mode. Although this may not be possible in the short term, a system in accordance with aspects of the present disclosure may be configured to optimize charging in order to decrease the number of AVs that deny a transport request due to energy concerns or to interrupt operation in Transport Mode in order to charge. To accomplish this, an AV system in accordance with aspects of the present disclosure may park at a charging station whenever possible, and may collectively share information (e.g., with other AVs and cloud-based systems) to allow an AV to plan, in advance, the best routes to travel, so that unexpected events are minimized (e.g., analyze historical records of AV trips for the occurrence of "unexpected events" and avoid travel over those routes), time spent in a search for a charging location is minimized (e.g., a route on which charging opportunities are maximized), and the planned routes do not lead to an unnecessary energy consumption (e.g., do not lead to the AV being stalled in traffic with passenger(s) on board that require air conditioning, entertainment systems, in-vehicle Wi-Fi, etc., to be operating). In accordance with various aspects of the present disclosure, a system of an AV or a cloud-based system may, upon receiving a transport request, calculate an estimate of an amount of energy/electrical storage capacity needed to complete the transport request. Using such an estimate, the AV system or cloud-based system may accept or decline the transport request or select a suitable AV based on, for example, the amount of current electrical storage capacity of one or more AVs; the current or historical level of congestion along the possible routes for the transport request; the expected time needed to complete the transport request; whether the transport request is for transport of passengers, goods, or data; and/or the likelihood of receiving a subsequent transport request at the destination of the first transport request. A system of an AV in accordance with various aspects of the present disclosure may operate in a manner so as to minimize the number of charging locations/stations needed within an area of service supported by an AV fleet.

In accordance with aspects of the present disclosure, a transition from other Modes of operation described herein to the Offline Mode 820 may be triggered by, for example, a need for maintenance; a failure (e.g., software, electrical hardware, mechanical hardware) of the AV; and/or due to a transition of the AV to a "sleep" state to save energy when, for example, the AV is in Parked Mode 830 for an extended period of time. An AV system and/or a cloud-based system in accordance with aspects of the present disclosure may be optimized to avoid a transition of an AV into the Offline Mode 820, and the occurrence of such a transition may trigger automatic analysis of, for example, the context information for the AV, to aid in an understanding of the reasons why the AV transitioned to Offline Mode 820, and improvements in fleet management operation and AV reliability, so that AVs may be in Transport Mode 810 as much as possible.

As may be understood from the discussion of AV Modes and States present above, the operation of one or more AVs in accordance with various aspects of the present disclosure is data-driven, and involves the operation of a system to acquire the information upon which Mode and State transition decisions will rely.

Figure 9:
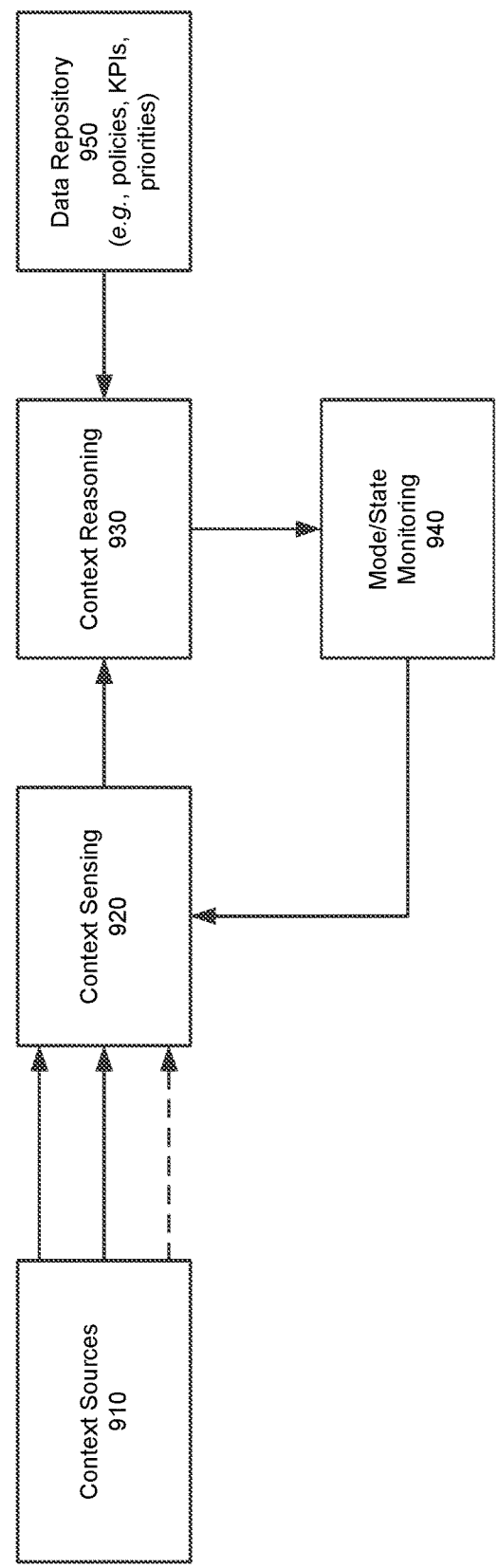
FIG. 9 is a high-level block diagram showing an example arrangement of functional blocks of an AV operation system, in accordance with various aspects of the present disclosure.

FIG. 9 is a high-level block diagram showing an example arrangement of functional blocks of an AV operation system, in accordance with various aspects of the present disclosure. The illustration of FIG. 9 includes a content sources block 910, a context sensing block 920, a context reasoning block 930, a Mode/State monitoring block 940, and a data repository 950 comprising, by way of example and not limitation, various data and parameters representative of policies, key performance indicators (KPIs), and priorities used by, for example, the context reasoning block 930. The following discussion addresses such basic building blocks of an example data-driven system in accordance with various aspects of the present disclosure, which aims to operationalize information gathered from a wide variety of information sources. Such information may, for example, trigger Mode and/or State transitions such as the examples illustrated in FIGS. 7A and 7B.

The context sources block 910 may collect different types of context information that may influence a Mode/State transition process as described herein such as, for example, the operation illustrated in and discussed above with regard to FIGS. 7A and 7B, to adapt AV operation to the current context of the AV. It should be noted that the context of an AV is not limited to the information available from the sensors or data/parameters of the AV, or sensors or information available in the vicinity (e.g., within directly wired or within wireless communication range of the AV (i.e., is not "AV scoped"). Instead, it is important for the AV and/or a cloud-based system supporting AV operation to consider information of or provided by other AVs of a fleet of AVs, and from a wider context (e.g., context information of the geographic area or region of a village, town, city, county, state, country in which an AV or fleet of AVs is operating), so that the AVs may operate in a coordinated fashion towards common optimization goals. In order to acquire such broad context information, the context sensing block 920 may interact with a large number of different sources of various types of information including, for example, in-vehicle sources, nearby AVs, fixed APs, and what are referred to herein as "high-level sources."

In accordance with aspects of the present disclosure, an in-vehicle source may include immediate context information to which the AV has access, and on which the AV relies for autonomous operation. Each AV according to this disclosure may have its own monitoring system, autonomous driving sensors, urban sensors for scanning the environment around the AV, historical information, and high-definition positioning information (e.g., GNSS/GPS geo-location information). All of this information may be used for AV operation in the immediate and short-term. For time-sensitive decisions, the AV may rely on its own sensors and information, because broader context information that may be used to influence decisions of the AV may not be acquired in a suitably timely fashion.

In accordance with aspects of the present disclosure, nearby AVs (e.g., AVs that are within wireless communication of one another; i.e., neighbor AVs) may exchange relevant information locally in a peer-to-peer fashion. For example, AVs that are in wireless communication with one another may share information about, by way of example and not limitations, vehicle accidents that have occurred within a certain distance of the sharing AV, traffic congestion along roadways currently traveled or near a sharing AV, roadblocks along roadways currently traveled or encountered by a sharing AV, and/or updated map information for the geographic area or region in which the nearby AVs are operating. Nearby AVs may also share less time-critical context information that was previously acquired by the AVs including, for example, the geographic location(s) of parking and charging spots.

In accordance with aspects of the present disclosure, AVs may request information from fixed access points (APs) (i.e., wireless access points positioned at fixed geographic locations) that maintain and manage (e.g., acquire, store, and deliver/forward) information previously provided to the fixed AP by other nearby AVs, which may add more context information that may, for example, be used by an AV to determine how the AV should behave at an upcoming intersection to avoid traffic congestion. In accordance with aspects of the present disclosure, fixed APs may also act as local managers of a fleet of AVs, maintaining the context information shared by nearby AVs and various types of historical information, in order to reduce the number of requests made to cloud-based systems from nearby AVs. The fixed APs supporting a network of AVs may, for example, apply temporary policies/rules to the operation of nearby AVs to overcome an unexpected event without involving intervention by cloud-based systems in such locally restricted situations, thereby improving the response time of the AVs in a coordinated fashion.

In addition, fixed APs according to aspects of the present disclosure may act as bidirectional context information caches. For example, fixed APs may maintain the latest context information for a fleet of AVs. Such context information may be provided by a cloud-based system that computes a broader state of the fleet, in order to reach optimization goals. Concurrently, the AVs of a fleet may share their latest context information directly to one or more fixed APs, which may maintain (e.g., acquire and store) such context information, and later share such context information with other AVs. The fixed APs may store and share such context information until, for example, the fixed APs determine that the context information is outdated.

In accordance with various aspects of the present disclosure, context information from what are referred to herein as "high-level sources" such as a cloud-based system may be delivered through "cloud services" that maintain and can process massive amounts of context information collected by the AVs of a fleet of AVs. Context information provided by a cloud-based system may be important, even critical, input for the decision process of an AV, and may directly influence the overall performance of the fleet of AVs. Such context information may be very dynamic, when all of the inputs that a cloud-based system may receive and take into account in formulating an optimization decision are considered. In accordance with aspects of the present disclosure, high-level context information provided by one or more cloud-base systems may comprehend resources of both the fleet of AVs and of the geographic area or region in which the AVs operate, so that AVs may act according to their own goals, the goals of the fleet, and the goals of the managers of the geographic area or region in which the AVs operate, to make the best of the available resources.

The Mode/State monitoring block 940 of FIG. 9 generates feedback information that also acts as context information for the AV when operating in a certain Mode/State. Such feedback information is used as input for the local optimization processes of the AV when operating in each specific Mode/State, in order to reach the various goals of the AV and the goals of the fleet as a whole.

The data repository 950 acts as storage for digital information representative of data and parameters including, for example, key performance indicators (KPIs), priorities, and policies and high-level goals, so that the AVs may operate in a manner consistent with such information. For example, one KPI of an AV may be the amount of time that transpires or the distance traveled when an AV that is empty (i.e., without a (e.g., passenger(s), good(s), data)). However, an AV may also have as a "priority" that the AV is to gather urban sensor data from a certain geographic area or region, but the AV may be subject to a "policy" that the AV is to travel without any detours when the AV is operating in Transport Mode. Goals of operation of one or more AVs of a fleet may be assigned levels or degrees of importance such as, for example, primary, secondary, tertiary, etc., to enable the AV system and cloud-based systems of the present disclosure to guide system behavior in a manner consistent with the operator of the fleet and/or third parties such as the managers of a government entity (e.g., a municipality such as a village, town, city) or larger geographic area (e.g., state, province, country) have chosen. Such use of KPIs and requirements for adherence to policies, priorities, and goals for AV operation may be represented in digital information stored in the data repository 950, and the AVs and/or cloud-based systems may take any or all of these constraints into account when making decisions and Mode/State transitions during the operation of the one or more AVs.

In accordance with various aspects of the present disclosure, such operating constraints (e.g., policies, priorities, KPIs, goals) may be predefined and/or may be dynamically adapted by a cloud-based system, if the primary goals of the fleet are updated and/or are to be balanced in order to reach the optimization goals of the fleet. This flexibility enables the prioritization of some States over others, or allows AVs activate specific States when in particular geographic areas or regions.

The context reasoning block 930 may be a computationally demanding portion of the AV operation system 900 of FIG. 9, given the variety and amount of information that may be considered to influence the operation of an AV or fleet of AVs. The context reasoning block 930 may involve the use of a variety of different techniques to process all of the context information received. In accordance with aspects of the present disclosure, the context reasoning block 930 may be constantly operating, not only to provide support for autonomous driving operation, but also to provide constant awareness of the very dynamic environments in which an AV may operate to support proper operation in each specific Mode/State.

The context reasoning block 930 of an AV system in accordance with aspects of the present disclosure may provide context information filtering, so that the decision processes used are not made more complex than necessary. The context reasoning block 930 may apply a variety of information filters, according to the current Mode/State of the AV. For example, while an AV is in Transport Mode and in the Data Sensing State, an AV (e.g., AV 603) in accordance with aspects of the present disclosure may choose not to process/take into account any information and/or reasoning about the availability of parking or charging spots that the AV may receive from nearby AVs of cloud-based system. In accordance with aspects of the present disclosure, an AV may take the most recent information about charging spots into consideration when the AV is in Charging Mode.

In accordance with various aspects of the present disclosure, the context reasoning block 930 may apply one or more heuristics to enable a rapid decision process based on priorities and policies such as those previously discussed above. This may be particularly important in situations where the amount of time permitted to reach a decision is short. The context reasoning process may take into account only the most important information in the particular situation/context being addressed such as, for example, quickly developing vehicle traffic situations that may end in an accident in which the AV may be involved if rapid evaluation and avoidance strategies are not developed.

The context reasoning block 930 may, for example, apply more complex reasoning solutions in the area of multi-objective optimization techniques to make decisions regarding selection of a best Mode/State for an AV. Such multi-objective optimization techniques may take in consideration different optimization goals of the fleet and/or the managers (e.g., city/county/state government) of the geographic area or region where the AV is located. Machine Learning techniques employed at the AV or fleet level may contribute to the decision process for selecting an optimum Mode/State for each context. These techniques, and the success of the decisions, may be leveraged by a collaborative learning and knowledge exchange among AVs of a fleet, based on information about the past decisions of the AV system in certain scenarios.

In accordance with aspects of the present disclosure, an AV may request assistance from one or more cloud-based systems for guidance, when the AV system is faced with incomplete information and is unable to arrive at a feasible solution. In such situations, the one or more cloud-based systems may have a broader perspective on the available resources, information, and needs (e.g., priorities, policies, etc.) to arrive at an optimal solution, and may directly inform the requesting AV of the best operating Mode/State or the best action to perform.

It is important to note that, in accordance with various aspects of the present disclosure, the various entities of an AV system and one or more cloud-based system as described herein may employ different key building blocks or intelligence. For example, fixed APs and the cloud-based systems may include building blocks similar to those described above with regard to the AV operation system 900 illustrated in FIG. 9. A fundamental difference between the AV operation system 900 and the fixed APs or a cloud-based system may be that operation of the fixed APs and the cloud-based system may involve the aggregation of context information of several APs, and that the priorities used in context reasoning may be primarily fleet/geographic area/region-oriented and may not be defined for as low a level as priorities defined for the AVs. Similar optimization techniques may be employed by fixed APs and cloud-based systems, although dealing with the variety and amount of context information of several AVs and/or multiple optimization goals may be exponentially more complex.

In accordance with aspects of the present disclosure, the differences between context reasoning for fixed APs and for cloud-based systems may primarily be the level of knowledge and optimization involved. In accordance with aspects of the present disclosure, each fixed AP may deal with a limited number of AVs, where each AP may operate in a certain, possibly limited geographical area, and may rely on a certain fixed AP to coordinate the operation of the AV and to synchronize relevant context information across different AVs. One or more cloud-based systems may be responsible for management of a fleet of AVs at the highest level. In accordance with various aspects of the present disclosure, the Cloud may be responsible for the highest management level, which implies a complete overview and knowledge of the network.

Figure 10:
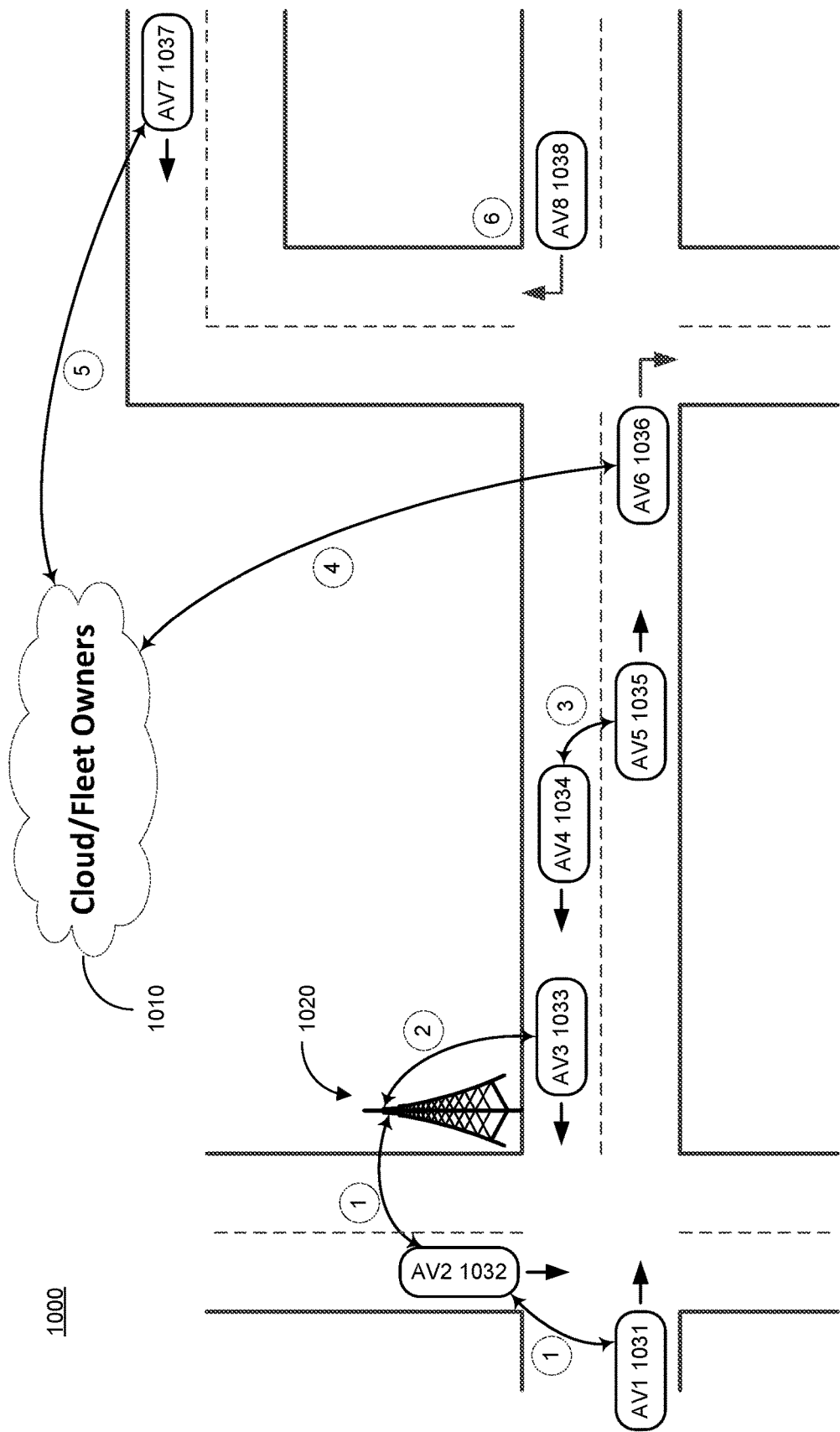
FIG. 10 illustrates a number of scenarios that involve the interaction and coordination of a variety of entities supporting AV operation, in accordance with various aspects of the present disclosure.

FIG. 10 illustrates a number of scenarios that involve the interaction and coordination of a variety of entities supporting AV operation, in accordance with various aspects of the present disclosure. The following discussion addresses the various scenarios illustrated in FIG. 10, including the various levels of interoperability that may be involved in managing optimization of the infrastructure of a village, town, and/or city with regard to operation of a fleet of AVs, to change from one Mode or State to another Mode or State, or to provide context information use in making different decisions, as described herein with regard to FIG. 10. The elements shown in FIG. 10 may correspond to the elements illustrated in, and having the features and functionality described above with respect to FIGS. 1-9. The illustration of FIG. 10 shows an example arrangement of roadways on which a fleet of AVs AV1 1031 to AV8 1038 are located, and shows Cloud/Fleet Owners 1010 that represent one or more cloud-based systems/operators of the fleet of AVs AV1 1031 to AV8 1038. The following discusses each of the illustrated scenarios of FIG. 10.

The first scenario of FIG. 10 involves the interaction between two AVs, AV1 1031 and AV2 1032, and a fixed AP at an intersection, identified in FIG. 10 with the numeral 1 enclosed in a circle. In accordance with various aspects of the present disclosure, the AVs AV1 1031 and AV2 1032 may leverage the fixed AP 1020 infrastructure and the broader context information available to the fixed AP 1020, to optimize the local decisions of the AVs AV1 1031 and AV2 1032. Moreover, each of the AVs of FIG. 10, including AV1 1031 and AV2 1032, may also directly interact with other nearby AVs, even without the intervention of a Fixed AP.

In the situation of the first scenario, AV1 1031 may communicate directly with AV2 1032, if AV1 1031 is within wireless communication range of AV2 1032. Such vehicle-to-vehicle (V2V) wireless communication may use, for example, very-low-latency communication technologies (e.g., DSRC). In the illustration of the first scenario of FIG. 10, an AV3 1033 is shown as approaching the same intersection as AV1 1031 and AV2 1032, but AV3 1033 is not in direct wireless communication range of AV1 1031 or AV2 1032. In this example, AV1 1031 may rapidly evaluate available context information and decide what behavior of AV1 1031 is most appropriate in the situation of the first scenario to, among other things, avoid a collision of AV1 1031 with AV2 1032. The appropriate behavior chosen by AV1 1031 may be to simply adjust the velocity of AV1 1031, so that neither of AV1 1031 and AV2 1032 needs to perform a hard braking maneuver that may, for example, be more risky and more energy demanding. Although in this example, AV1 1031 may make a unilateral decision, both AV1 1031 and AV2 1032 may perform a similar process of evaluating an optimal behavior, including communicating with one another to provide context information to the other AV, to aid in arriving at an optimal decision and appropriate behavior.

In a scenario similar to that of the first scenario, where AV1 1031 and AV2 1032 are within wireless communication range and aware of each other but not aware of AV3 1033, the fixed AP 1020 may act to advertise (e.g., broadcast) for use by all AVs within wireless communication range of fixed AP 1020, the presence and context information of the AVs AV1 1031, AV2 1032, and AV3 1033 received by fixed AP 1020. Then, AVs within wireless communication range of fixed AP 1020 may receive such context information for all AVs wirelessly linked to the fixed AP 1020, and each may locally determine their own behavior with confidence, based on the received context information, without affecting the other AVs. For example, the fixed AP 1020 may, in situations involving more complex and dangerous circumstances, decide what AV behavior is most appropriate based on the context information shared by the AVs within wireless communication range of the fixed AP 1020, in order to adapt/adjust the behavior of each of the AVs AV1 1031, AV2 1032, and AV3 1033, so that those AVs may cross the intersection of FIG. 10 smoothly.

The second scenario of FIG. 10 involves the interaction between infrastructure elements such as fixed AP 1020 and AVs such as AV3 1033. In accordance with various aspects of the present disclosure, fixed APs (e.g., fixed AP 1020) may do more than simply act as coordinators and communication interfaces between AVs. Instead, as illustrated in the interaction between fixed AP 1020 and AV3 1003 (denoted by the circled numeral 2), infrastructure elements such as fixed APs may also play an important role as local managers of context information and knowledge that may be used to reduce the number/volume of interactions between AV and cloud-based systems, and to help make local decisions that are focused on the optimization goals discussed above. In this example scenario, AV3 1033 may share context information for AV3 1033 with the fixed AP 1020 that may then, based on the operation Mode/State of AV3 1033, contextualize the context information from AV3 1033 with additional relevant information. For example, the fixed AP 1020 may detect that the AV3 1033 will soon require the use of a charging spot, and may then recommend a best charging location to the AV3 1033, according to the local knowledge of the city resources known to fixed AP 1020.

A third scenario illustrated in FIG. 10 involves the interaction between AVs. AVs in accordance with aspects of the present disclosure may collaborate in order to reach the optimization goals of the fleet operator and/or manager(s) of the geographic area or region (e.g., village, town, city, etc.)

in which the AVs operate. In this way, the AV system may make the most of the available resources (e.g., one or more AVs of a fleet, other AVs, village/town/city infrastructure). The third scenario of FIG. 10 (indicated by a circle containing the numeral 3) illustrates a situation in which two AVs, AV4 1034 and AV5 1035, may optimize the operation of transporting sensing data (e.g., urban sensor data). As shown in FIG. 10, AV4 1034, when in the communication range of AV5 1035, may exchange context information with AV5 1035, and may determine that AV5 1035 is able to transport data presently stored on AV4 1034 to the one or more cloud-based systems faster and at less cost than other delivery options (e.g., by traveling to a nearby fixed AP, or by using a cellular data network). In this manner, the AV4 1034 may more quickly become available to serve additional service requests (e.g., for transport of passengers, goods, and/or other data), or may transition to Charging Mode, if need be. This situation may occur, for example, if a stored energy resource (e.g., electrical storage used for propulsion/operation) of a first AV that is transporting data, has dropped to a level which the first AV determines is too low to complete the transport request as scheduled, and in response, the first AV may collaborate with a second AV by transferring the data being transported to the second AV, so that the transport service provided by the fleet of AVs is successful. Again, it should be noted that although examples of AV operation provided herein may refer to the use of stored electrical energy for propulsion and/or operation of AVs, the use of stored electrical energy for propulsion and/or operation of an AV does not represent a limitation of the present disclosure, as other sources of energy for propulsion and/or operation of an AV (e.g., petrol, natural gas, hydrogen, alcohol, etc.) may be employed without departing from the spirit and scope of this disclosure.

In another example of interaction of AVs on roadways, the AVs AV4 1034 and AV5 1035 may come within wireless communication range of one another, and each of AV4 1034 and AV5 1035 may, upon detecting the presence of the other AV, choose to synchronize (e.g., share) their own context information with the other AV. In response, the AVs (e.g., AV4 1034, AV5 1035) may determine, for example, that the two AVs are both performing surveys of urban sensors while traveling, and that a certain geographic area (e.g., the presently traveled or a particular part of a village, town, city, province, state, country) has already been surveyed (e.g., systematically, randomly, or concurrently with other travel), in order to collect urban sensor information including, for example, road conditions, environmental conditions (e.g., pollutants, temperature/humidity, sunlight), about the geographic region) and/or to collect data from other infrastructure elements (e.g., fixed APs, sensors, other APs). In response to the sharing of context information, the AVs AV4 1034 and AV5 1035 may then, using the shared context information, adapt or adjust their own data sensing operation (s) towards other geographic areas, thus reducing the amount of time needed to collect the intended information.

A fourth scenario illustrated in the example of FIG. 10 involves the use of global feedback received by AVs such as, for example, AVs at roadway intersections, from one or more cloud-based systems. In a situation involving an AV in the vicinity of a roadway intersection not served by one or more fixed APs (identified in FIG. 10 by the circle with the numeral 4), a particular AV (e.g., AV6 1036) may make decisions locally, within the system(s) of the particular AV, based on context information stored on the particular AV. However, in accordance with various aspects of the present disclosure, an AV in such a situation may also be assisted by one or more cloud-based systems, such as system(s) of the Cloud/Fleet Owners 1010, which may have access to context information and/or travel route decisions shared with the system(s) of Cloud/Fleet Owners 1010 by other AVs (e.g., AVs in a particular geographic area or region). Thus, the system(s) of the Cloud/Fleet Owners 1010 shown in the example of FIG. 10 may generate predictions of movement of other AVs (e.g., AVs such as AV5 1035, AV7 1037, and AV8 1038) and may leverage such predictions as an opportunity to manage the infrastructure (e.g., roadways, traffic signals, speed limits, roadway tolls, other AVs) within the geographic area or region (e.g., village, town, city, etc.). In this particular scenario, the behavior of a particular AV at an intersection may, for example, be determined in advance and may be made available to other AVs (e.g., sharing of context information via direct wireless communication between AVs, as above, or via a cloud-based system), so that the other AVs may adapt or adjust their own behavior accordingly. It should be noted that, in situations involving intersections, the likelihood of being within wireless communication range and the amount of time available for communication between AVs is higher, which may therefore be used with greater frequency and confidence for context information exchange and/or AV synchronization.

A fifth scenario illustrated in FIG. 10 involves the use of advertisements and/or predictions from a cloud-based system. During the normal or most common operation of AVs such as the AVs described herein with regard to FIGS. 1-10, one or more cloud-based systems (e.g., the Cloud/Fleet Owners 1010 of FIG. 10) may be responsible for the processing of context information that the one or more cloud-based system receives about the resources of an AV fleet (e.g., AVs AV1 1031 through AV8 1038) and resources of the geographic area or region in which such AVs operate, and may provide feedback to one or more AVs (e.g., AV7 1037) based on that information (as a scenario indicated by the circle with numeral 5). In accordance with various aspects of the present disclosure, context information acquired by AV7 1037 may, for example, influence not only the operating Mode/State of the AV7 1037 that acquired such context information, but also may influence any other AVs in communication with the AV7 1037 and/or with any cloud-based system in communication with the AV7 1037. For example, an AV (e.g., AV6 1036) that may detect that there is an available parking spot at a certain geographic location (e.g., at some location along a certain roadway, or in a particular parking facility the location of which is identified) may communicate that information to a cloud-based system (e.g., the Cloud 1010), and/or may directly advertise that information to (e.g., wirelessly share that information directly with) one or more AVs (e.g., AV7 1037) that may, for example, be transitioning from the Transport Mode to the Parked Mode.

The present scenario may, for example, be seen in the behavior of a cloud-based system as described herein reacting to the transitioning of AVs between different operating Modes/States. However, a cloud-based system (e.g., the Cloud 1010) in accordance with aspects of the present disclosure may also anticipate the needs of AVs, by using the broader information resources and access to historical information (e.g., context information gathered from AVs and infrastructure elements such as fixed APs, traffic control equipment such as stoplight sensors, electronic tolling systems, and other sensors) of the cloud-based system. For example, during periods of low transport request volume, a cloud-based system (e.g., Cloud 1010) may make a decision to announce or advertise to one or more AVs (e.g., AV7

1037), information identifying geographic locations or areas/regions at or within which a transport request is most likely to be received, so that AVs receiving such a notification or advertisement may choose to park in strategic locations such as, for example, parking spots/locations at or near the geographic locations or areas/regions from which requests for transportation service (i.e., transport requests) are expected to be received. In this way, the anticipatory actions of using advertising/notification of such need enables AVs to locate themselves so that the AVs may respond more quickly to later transport requests in the identified geographic locations or areas/regions. In accordance with various aspects of the present disclosure, such a cloud-based system may be selective with regard to the issuance of notifications and/or advertisements, so that the AVs may be individually positioned at different geographic locations about the area or region from which transport requests are predicted/anticipated, and thereby reduce the overall (e.g., fleet-wide) AV response to future transport requests. For example, in accordance with aspects of the present disclosure, the location and scheduling of events (e.g., concert dates/times and venue locations, sporting event dates/locations, labor strike locations) may be taken into account when managing a fleet of AVs, and in particular, taking into consideration expected peak time(s) of transport requests, so that the demand for AVs may be anticipated and be positioned in advance of transport request demands and ready to more quickly serve clients (e.g., passengers).

A sixth scenario included in the examples of FIG. 10 illustrates self-adaptation by AVs. An AV in accordance with various aspects of the present disclosure is capable of operating without the need for cloud-based systems to decide/determine the operation Mode/State of the AV. Local context information of an AV in accordance with the present disclosure is sufficient for the AV to make the decisions involved in selecting an appropriate operation Mode and State. For example, in regard to the sixth scenario (indicated by the circle containing the numeral 6) of FIG. 10, AV8 1038 may determine that AV8 1038 has information indicating that the roadway (e.g., street) onto which it is entering requires the scanning of one or more urban sensors, previously described herein. In response to determining that scanning of one or more urban sensors is called for, the AV8 1038 may activate the Data Sensing State and may, for example, begin capturing images of the area surrounding the AV8 1038 as it travels, to enable the AV8 1038 to count the number of people on sidewalks. After leaving that street, the AV8 1038 may then enter Transport Mode for the transportation of the captured image data to a system in the cloud (e.g., Cloud 1010), and may then begin moving toward the nearest fixed AP whose location is known to the AV8 1038. All actions of this sequence of actions of the AV8 1038 may take place without intervention or management by a system in the Cloud (e.g., the Cloud 1010). On its trip to the known fixed AP, the AV8 1038 may detect that the AV8 1038 is not able to reach the fixed AP due to the current level of energy (e.g., the electrical energy in storage of the AV8 1038) contained in the systems of the AV8 1038. The AV8 1038 may then modify its original route toward the known location of the fixed AP, to enable the AV8 1038 to replenish the level of energy (e.g., charge electrical energy storage) so that the AV8 1038 may then offload the captured image data that the AV8 1038 is carrying. During this process, the AV8 1038 may be continually learning context information of the AV8 1038, to enable the AV8 1038 to adapt its own behavior and improve its own efficiency in future activities. For example, during the above example trip of the AV8 1038 to a charging station, the AV8 1038 may identify the location(s) of one or more fixed APs of which the AV8 1038 was not aware, and may use the location information for the one or more newly identified fixed APs to select a fixed AP for data offload in the future. It should be noted that fixed AP, charging location, and other information about those and other infrastructure elements discovered during activities of the AV8 1038 may be saved locally, by the AV8 1038, and may be used in a similar fashion at some time in the future. In accordance with various aspects of the present disclosure, such infrastructure element information discovered by AV8 1038 may also be shared with other APs either directly or via the Cloud 1010.

Figure 11A:
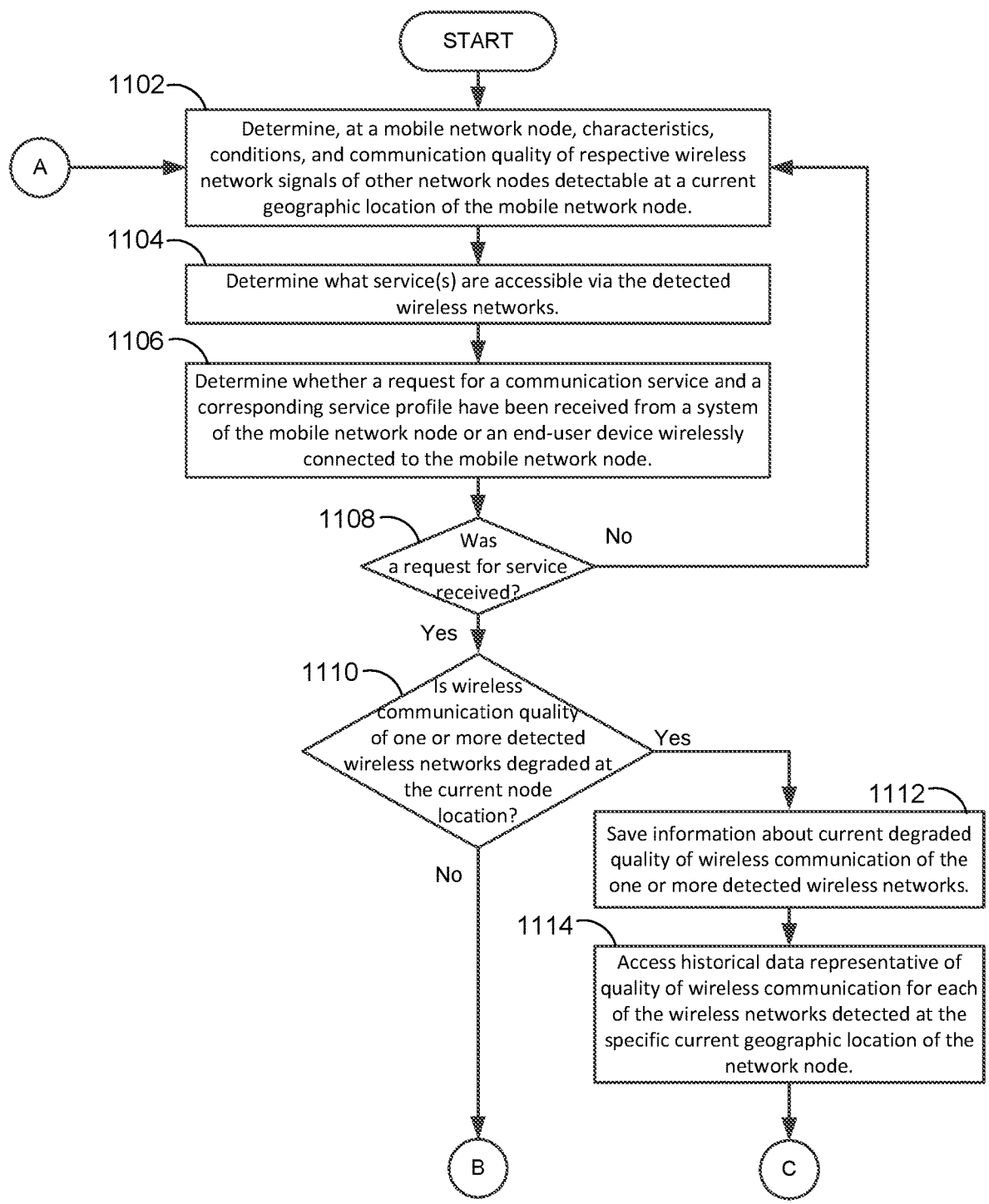
FIGS. 11A-11C show a flowchart illustrating an example method of operating a wireless node supporting various services in a network of moving things, in accordance with various aspects of the present disclosure.
Figure 11B:
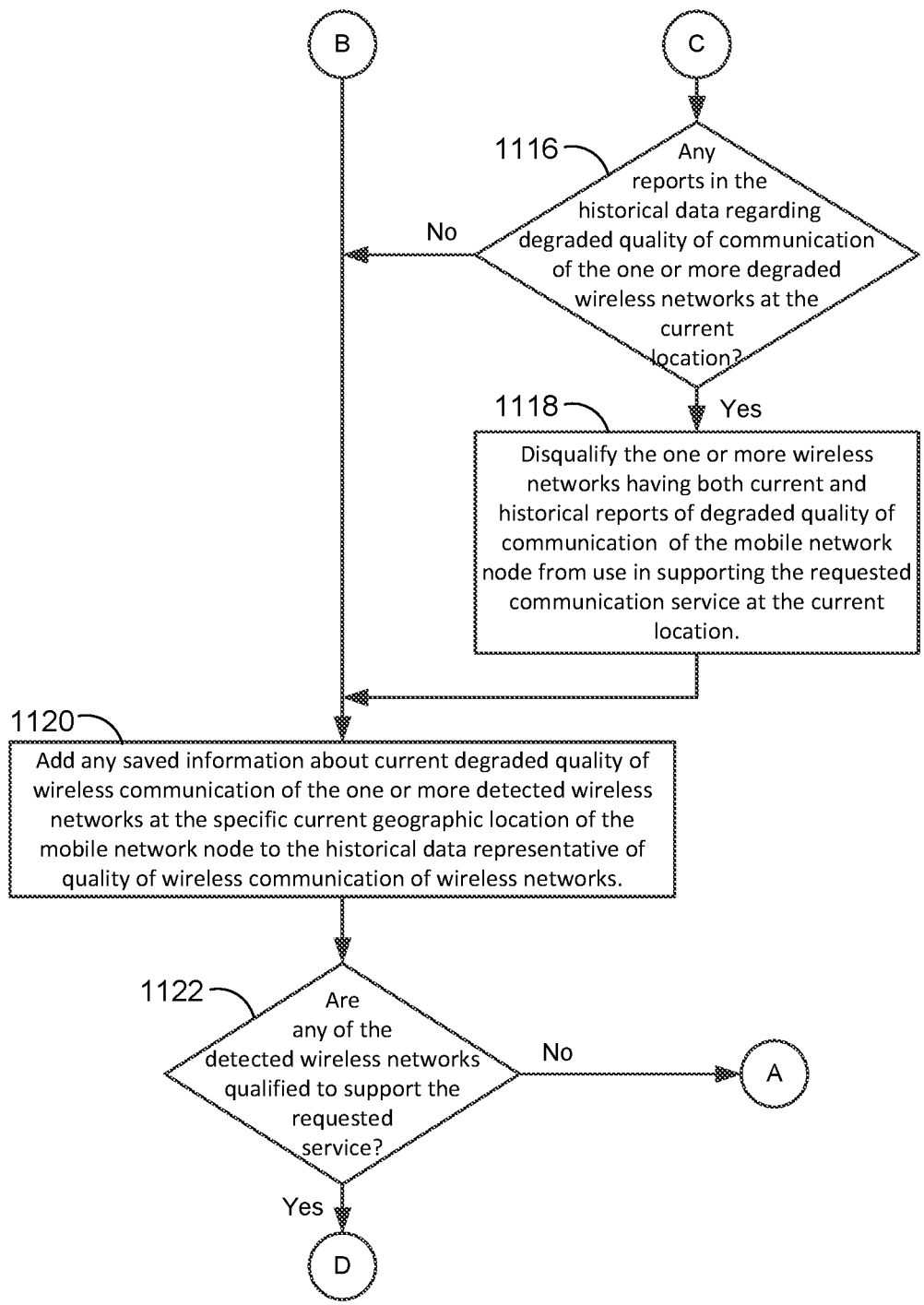
Figure 11C:
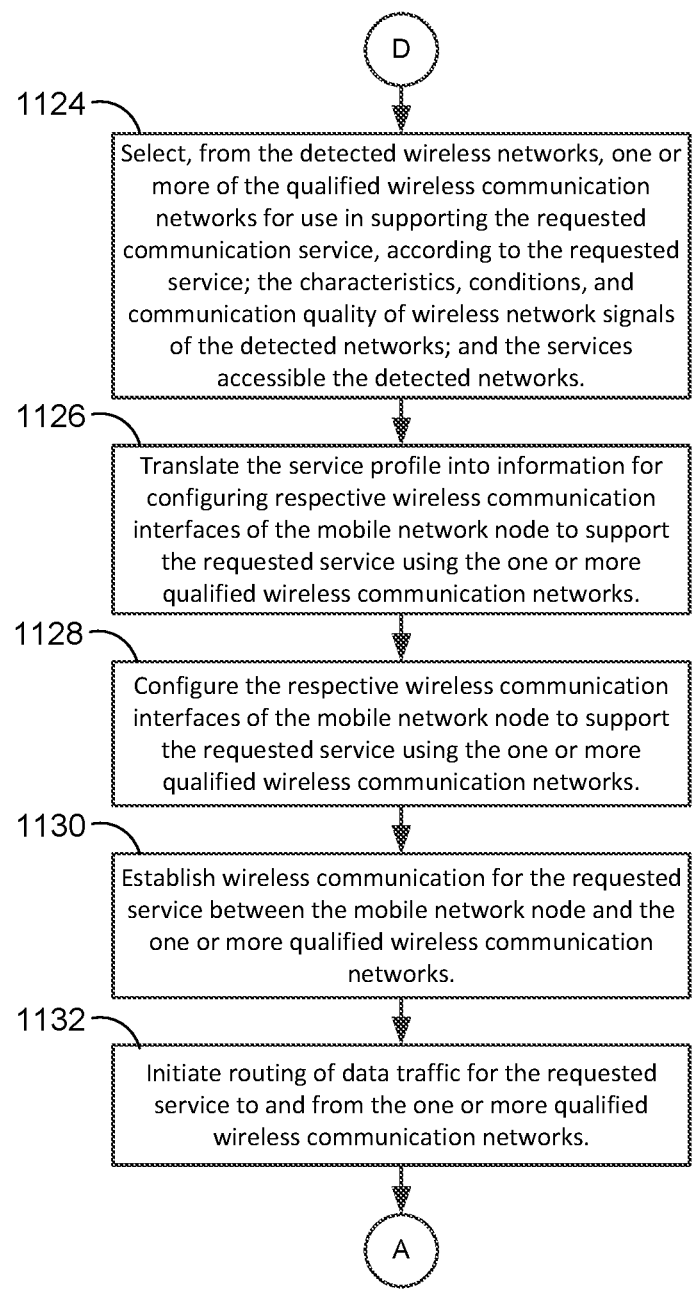

FIGS. 11A-11C show a flowchart 1100 illustrating an example method of operating a wireless node supporting various services in a network of moving things, in accordance with various aspects of the present disclosure. In accordance with various aspects of the present disclosure, the wireless node that performs the method may, for example, be a mobile node that is able to move about an area of service of a wireless network; may correspond to, for example, any of the mobile nodes illustrated in or described herein with regard to FIGS. 1-10, and may be at a physical location (e.g., identified by coordinates such latitude and longitude) that may be automatically and wirelessly shared with other network nodes. For example, the node may be, as illustration and not limiting in any way, an automobile, a taxi, a van, a truck, a train, or an autonomous vehicle. In accordance with other aspects of the present disclosure, the node may be at a fixed physical location, the physical location of which may also be automatically and wirelessly shared with other nodes of the network. The following discussion of the example method illustrated by FIGS. 11A-11C make, for purposes of illustration, may reference to elements of the examples of FIGS. 5 and 6. It should be noted that, although the example method illustrated in FIGS. 11A-11C shows a particular collection of actions in a particular order, the illustrated actions may be performed in one or more different orders, and/or actions may be modified, added, or eliminated without departing from the spirit and scope of the present disclosure. The method of FIGS. 11A-11C begins at block 1102, following power-up or reset of the node performing the method. It should be noted that, although the following example discusses a mobile network node, aspects of this example apply equally or similarly to a node that is at a fixed physical location.

At block 1102, the mobile network node performing the method may determine characteristics, conditions, and/or communication quality of respective wireless network signals of other network nodes detectable at a current geographic location (e.g., latitude/longitude) of the mobile network node. Such characteristics, conditions, and communication quality may include, for example, a wireless physical (e.g., radio frequency (RF)) air interface protocol (e.g., CDMA, TDMA, UMTS, GSM, "3G," "4G," LTE, "5G"), Bluetooth, and/or Wi-Fi (e.g., IEEE 802.11a/b/g/n/ac/ad/af)) being used in wireless communication among nodes of the network; the geographic location and velocity of the mobile network node; and various measurements (e.g., frequencies/frequency band(s) in use, received signal strength (RSSI) of detected RF signals, observed signal-to-noise ratios (SNR), interruption of a communication link or likelihood of loss of connectivity) of the wireless signals and communication environment in the vicinity of the mobile network node.

Next, at block 1104, the method may cause the mobile node to determine what service(s) are accessible via the detected wireless networks. For example, the mobile network node may determine whether access to the Internet is available via the wireless networks/links supported by neighboring nodes (e.g., mobile or fixed nodes such as MAPs (systems of AVs) and FAPs) of the network of moving things. In accordance with aspects of the present disclosure, such neighboring nodes may wirelessly advertise (e.g., via messaging on the wireless networks) the services for which the neighboring nodes provide support or through which indicated services are accessible.

Next, at block 1106, the mobile node performing the method may determine whether a request for a service (e.g., a service that involves wireless communication by the mobile network node) has been received from, for example, a system of the mobile network node (e.g., a system of an autonomous vehicle 603, 605) or from an end-user device wirelessly connected to the mobile network node (e.g., a smartphone, personal computer, or other wireless-enabled end-user computing or communication device). In accordance with various aspects of the present disclosure, the request for communication service may be accompanied by a corresponding service profile. The service profile may comprise information such as that described herein (e.g., regarding FIGS. 5 and 6) that indicates communication link characteristics needed for a proper or desired quality of operation of the service such as, for example, one or more specific communication technologies that may be used with the requested service; a specific communication channel configuration; the configuration for a specific communication technology; a maximum transmission power; a data rate, a maximum delay/latency of the serving communication link; a reliability and/or tolerance to link interruption; and a minimum or optimal throughput or bandwidth involved in supporting the service. These examples of communication link characteristics are for illustrative purposed, and should not be taken as limiting what characteristics may be employed.

At block 1108, the method may determine whether a request for a service has been received by the mobile network node. If no service request has been received, the method may return to block 1102, to proceed as described above. However, if a request for a service has been received, the mobile network node performing the method may continue at block 1110, described below.

At block 1110, the method of FIGS. 11A-11C may determine whether one or more qualities of wireless communication of the one or more of the detected wireless networks are presently degraded at the current geographic/physical location (e.g., latitude/longitude/altitude) of the mobile network node, causing wireless data communication by the mobile network node attempting to use such a network to be impaired and/or unsatisfactory to, for example, the system of the mobile network node or an end-user. For example, one or more of the wireless networks detectable by the mobile network node at a current physical location (e.g., latitude, longitude) may be experiencing, by way of example and not limitation, a wireless signal at a low signal strength (e.g., RSSI), may have a degraded signal-to-noise ratio (SNR), and/or a relatively high or unacceptable bit-error-rate, packet error rate, throughput, packet delay, or probability/likelihood of link interruption. If none of the wireless networks detected by the mobile network node are found to be degraded, the method of FIGS. 11A-11C may continue at block 1120 of FIG. 11B, described below. If, however, the method determines that wireless networks detected by the mobile network node are experiencing degraded quality of wireless communication, the method may continue at block 1112, described below.

At block 1112, the mobile network node performing the method may temporarily save information about the current degraded quality of wireless communication of the one or more detected wireless networks for this geographic location (e.g., latitude, longitude). Such current information may later be added to a collection of historical wireless communication network performance/quality information for wireless networks serving a geographic region in which the mobile network node operates, such as at block 1120 of FIG. 11B, described below. The collection of historical wireless network performance/quality information may be maintained in a shared, central location accessible to the nodes of a network according to the present disclosure, or portions of the collection of historical wireless network performance/quality information for less than or all of the geographic region may be maintained in storage on the mobile network node, and/or on other nodes of the network of moving things as described herein.

Next, at block 1114, the method of FIGS. 11A-11C may access information of a collection of historical wireless network performance/quality information such as that described above, to retrieve information for each of the wireless signals of networks detected at the specific current geographic location of the mobile network node. The method then proceeds to block 1116 of FIG. 11B.

At block 1116 of FIG. 11B, the method may determine whether there are any past reports in the collection of historical wireless network performance/quality information of degraded quality of wireless communication of one or more of the currently detected wireless signals of networks that are exhibiting degraded wireless network performance at the current geographic location (e.g., latitude/longitude/altitude) of the mobile network node. If the collection of historical wireless network performance information does not show evidence of prior impairments/degradation of any of the wireless networks detected at the current geographic location, the method may proceed to block 1120, described below. If, however, the collection of historical wireless network performance/quality information does contain evidence of prior impairments/degradation of one or more of the wireless networks detected at the current geographic location, then the method may continue at block 1118, where the method may disqualify the use one or more wireless signals of networks having both current and historical reports of degraded quality of wireless communication of the mobile network node from use in communicating data supporting the requested service at the current geographic/physical location. Using this approach, a mobile network node according to aspects of the present may avoid choosing to support a requested service using a wireless network/link that currently is exhibiting degraded/impaired wireless communication performance/quality, and that also has a documented history of degraded/impaired wireless communication performance/quality at the current geographic/physical location of the mobile network node. The method may then proceed to block 1120, addressed below.

At block 1120, the method may cause the mobile network node to now add any temporarily saved information about current degraded performance/quality of wireless communication of the one or more detected signals of wireless networks at the specific current geographic/physical location of the mobile network node to the collection of historical wireless network performance/quality information described above. In this way, current observations are added to the collection after a decision about disqualification of currently detected and impaired/degraded wireless signals of networks is made.

Next, at block 1122, the method may determine whether any of the detected wireless signals of networks remain that are considered qualified to support the requested service. If all of the wireless signals of networks detected by the mobile network node at the current geographic location are disqualified, at block 1118, and none of the detected wireless signals of networks are considered to be qualified to support the requested service, the method of FIGS. 11A-11C may continue at block 1102, described above. If, however, one or more of the wireless signals of networks detected by the mobile network node at the current geographic location are considered to be qualified to support the requested service, then the method may proceed to block 1124 of FIG. 11C.

At block 1124 of FIG. 11C, the method may select, from the detected wireless signals of networks, one or more of the qualified wireless signals of communication networks that may be used in supporting the requested service, according to the service profile of the requested service; the characteristics, conditions, and communication quality of wireless network signals of the detected networks; and the services accessible via the detected networks. For example, the service profile of an "Internet" service of the mobile network node (e.g., the profile of the "Internet" service of FIG. 6) may indicate particular values of maximum acceptable communication link latency/delay, a maximum probability or likelihood of link interrupt or loss, and a minimum acceptable communication link throughput/bandwidth that are desired during operation of the "Internet" service. Other characteristics may also be used, as discussed elsewhere herein. The detected wireless networks that were determined to be qualified for use in supporting the "Internet" service may have been networks that use same or different wireless communication protocols including, for example, a cellular network connection and a DSRC-based communication link through a neighboring network node. Both of the cellular network connection and the DSRC-based communication link may meet the particular values of maximum acceptable communication link latency/delay and minimum acceptable communication link throughput/bandwidth desired. The mobile network node may choose to employ the higher cost option of using the cellular network connection, because context information shared by the neighboring network node may show that the DSRC-based communication link fails to meet an "Internet" service profile requirement regarding interruption tolerance. The availability, reliability, and/or likelihood of interruption of a DSRC-based communication link in accordance with aspects of the present disclosure may be dependent upon a density of network nodes. A service profile for the "Internet" service may indicate a desired/required density of network nodes; availability, reliability, and/or likelihood of link interruption in order to provide an acceptable likelihood of maintaining a continuous data connection between the "Internet" service of the mobile network node and an Internet-based resource of interest to an end-user using the mobile wireless access point (e.g., MAP) provided by the mobile network node.

Next, at block 1126, the mobile network node performing the method may translate the service profile into the form of a request that identifies a specific wireless communication technology that is to be used with the requested service and information for configuring the wireless communication interface of the mobile network node to enable communication using the specific wireless communication technology for the requested service. The translation may use service profile information to determine appropriate configuration parameters for a wireless communication interface of the mobile network node that is capable of communicating end-user data between the mobile network node and the Internet using the chosen qualified cellular communication network.

At block 1128, the method may use the configuration information produced by the translation of the service profile to configure one or more of circuitry, logic, software and/or firmware of a wireless communication interface of the mobile network node to be used to communicate using the specific wireless communication technology for the requested service. Such a wireless communication interface of a node according to the present disclosure may support configurations that support wireless communication using two or more wireless communication protocols, which may be concurrent wireless communication, and may be separate from support by the node for wireless local area networks (e.g., Wi-Fi).

Next, at block 1130, the mobile network node performing the method may establish wireless communication for the requested service between the mobile network node and the wireless network node supporting the specific wireless communication technology for the requested service, where the node may be a mobile node, or a node at a fixed physical location, and which may include the nodes of a cellular network serving the area in which the network of moving things operates.

At block 1132, the method may then initiate routing of data traffic for the requested service to and from the wireless communication network supporting the specific wireless communication technology. The routing may comprise, for example, any arrangements involved in the transfer of information packets wirelessly received from an end-user device by a Wi-Fi access point supported by the system of the mobile network node to the wireless communication interface supporting the specific wireless communication technology. The routing may also comprise the transfer of information packets received by the wireless communication interface supporting the specific wireless communication technology to the Wi-Fi access point serving the end-user device. Once routing of information for the requested service at the mobile node has been initiated, the method may return to block 1102 of FIG. 11A, described above.

Aspects of the present disclosure may be seen in a method of operating a node of a plurality of nodes of a network of moving things, where each of the plurality of nodes may be configurable to wirelessly communicate using two or more different wireless communication protocols. Such a method may comprise detecting, at a current physical location of the node, one or more radio frequency (RF) signals of respective other nodes of the plurality of nodes of the network, and for each of the one or more detected RF signals, estimating a respective quality of wireless communication between the node at the current physical location and the respective other node. The method may also comprise identifying one or more services accessible to the node through the other nodes by analyzing messages wirelessly communicated by the other nodes, and receiving, from a system of the node, a request for a particular service. In addition, the method may comprise disqualifying from wireless communication with the node for the particular service, respective nodes of the other nodes whose estimated quality of wireless communication with the node is below a threshold of quality, based on a collection of historical information representative of quality of wireless communication at the current physical location of the node. The method may also comprise selecting a particular node through which the particular service is accessible from any remaining nodes of the other nodes that have not been disqualified, and configuring the node to provide wireless access to the particular service to an end-user device through the particular node.

In accordance with various aspects of the present disclosure, the node may be a mobile node that provides wireless access in an autonomous vehicle. The method may further comprise adding the estimated respective quality of wireless communication of the detected one or more RF signals at the current physical location of the node to the collection of historical information representative of quality of wireless communication. The request for a particular service may be received from a system of the node that provides a wireless access point to an end-user device, and the messages wirelessly communicated by the other nodes may comprise one or more messages broadcast by respective nodes of the other nodes. The one or more messages broadcast by respective nodes of the other nodes may comprise a respective physical location of the broadcasting node, and the one or more messages broadcast by respective nodes of the other nodes may comprise information that identifies one or more services accessible from or through the broadcasting node.

Additional aspects of the present disclosure may be observed in a non-transitory computer-readable medium having stored thereon, one or more code sections. Each code section may comprise a plurality of instructions executable by one or more processors, and the instructions may cause the one or more processors to perform the actions of a method of operating a node of a plurality of nodes of a network of moving things. Each of the plurality of nodes may be configurable to wirelessly communicate using two or more different wireless communication protocols. The actions of such a method may comprise the actions of the method described above.

Further aspects of the present disclosure may be observed in a system for a node of a plurality of nodes of a network of moving things. Such a system may comprise one or more processors operably coupled to at least one storage for instructions executable by the one or more processors and to at least one wireless communication interface configured to wirelessly communicate using two or more different wireless communication protocols. The one or more processors may be operable to, at least, perform the actions of a method such as the method described above.

A system in accordance with various aspects of the present invention may leverage the potential of fleets of AVs enabling optimizations that address a variety of goals of managers of geographic areas or regions such as, for example, villages, towns, cities, provinces, states, and countries, and consequently improve the quality of life of the citizens of those geographic areas or regions. Effective orchestration of the AVs of a fleet using a system as described herein may be used to leverage private and government resources including, for example, reducing the number of vehicle spots allocated for parking and charging of AVs, and improving the usage rate of existing parking and charging spots. Leveraging AV features in the ways described herein enables the use of AVs as continual scanners of urban sensors and urban conditions, and as transport not only for people and goods, but also for the acquisition of data which may be translated into key insights about the state and dynamics of geographic areas and regions such as villages, towns, cities, provinces, states, and countries. Aspects of the present disclosure enable expanded wireless connectivity using AVs features and wireless mesh-networking capabilities, which can then be used to provide a variety of services focused on the citizens in the geographic area(s) or region(s) being served. In addition, aspects of the example system described in the present disclosure enable the above mentioned benefits to be supported simultaneously by the AVs of a fleet of AVs, maximizing the power, flexibility, and resources of the fleet of AVs.

The AVs and infrastructure elements described herein provide a fast, scalable, and cost-efficient system that supports scanning of urban operational, environmental, and security environments and sensors. Such a system enables an operator to optimize the infrastructure of the served geographic area or region in terms of transport capacity, parking, and charging locations. Autonomous adaptation to planned or unexpected events that normally require considerable re-organization of the private and government resources for a geographic area or region is enabled by deployment of an AV system as described herein, which may automatically adapt/adjust to disaster scenarios by, among other things, taking advantage of the dissemination of information and operational synchronization that occurs between the AVs of a fleet of AVs in accordance with various aspects off the present disclosure.

A system in accordance with aspects of the present disclosure may rely on optimization algorithms that apply multiple constraints at different levels including, for example, at the AV-level, at the fixed AP level, and at the cloud level. Aspects of the present disclosure provide for the definition of policies/rules of operation of a fleet of AVs, according to the interests of the fleet operators and those of the management of the geographic areas or regions in which the fleet operates; and for the definition of heuristics that ease the decision process(es) of AVs. In addition, a system according to various aspects of the present disclosure supports the definition of the lifetime of various types of context information, because a lag or delay may occur between a time of collection of such context information and a time of processing of such context information locally and/or in one or more cloud-based systems that, if not taken into consideration, may cause the output of such processing to be inaccurate, inappropriate, and potentially dangerous when considered in view of a current state of the AVs of a fleet and the management of the AVs and infrastructure of the geographic area or region served by the AVs.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a first node in a network, comprising:
   receiving, from a system of the first node, a request for a particular service;

selecting a second node from qualified nodes in the network, through which the particular service is accessible; and configuring the first node to provide wireless access to the particular service to an end-user device through the second node, wherein:
the qualified nodes are those nodes of the network whose estimated quality of wireless communication with the first node meets a quality criterion, and the quality criterion is based at least on a collection of historical information representative of quality of wireless communication at a current physical location of the first node.

2. The method of claim 1, comprising detecting, at the current physical location of the first node, one or more radio frequency (RF) signals of respective other nodes of the network.

3. The method of claim 2, comprising, for each of the one or more detected RF signals, qualifying nodes by estimating a respective quality of wireless communication between the first node at the current physical location and the respective other node.

4. The method of claim 2, comprising adding the estimated respective quality of wireless communication of the detected one or more RF signals at the current physical location of the first node to the collection of historical information representative of quality of wireless communication.

5. The method of claim 1, comprising identifying services accessible to the first node through the second node by analyzing messages wirelessly communicated by the second node.

6. The method of claim 1, wherein the first node is a mobile node that provides wireless access in an autonomous vehicle.

7. The method of claim 1, wherein the request for the particular service is received from a system of the first node that provides a wireless access point to an end-user device.

8. The method of claim 1, wherein messages wirelessly received from the second node comprises one or more messages broadcast by other nodes of the network.

9. The method of claim 8, wherein the one or more messages comprise a respective physical location of the broadcasting node.

10. The method of claim 8, wherein the one or more messages comprise information that identifies one or more services accessible from or through the broadcasting node.

11. A system for a first node in a network, comprising:
one or more processors operably coupled to at least one storage for storing instructions executable by the one or more processors and to at least one wireless communication interface configured to wirelessly communicate using two or more different wireless communication protocols, the one or more processors being operable to, at least:
determine those nodes of the network whose estimated quality of wireless communication with the first node meets a quality criterion, wherein the quality criterion is based at least on a collection of historical information representative of quality of wireless communication at a current physical location of the first node;
receive, from a system of the first node, a request for a particular service;
select, from the determined nodes, a second node through which the particular service is accessible; and
configure the first node to provide wireless access to the particular service to an end-user device through the second node.

12. The system of claim 11, wherein the one or more processors are operable to detect, at the current physical location of the first node, one or more radio frequency (RF) signals of respective other nodes of the network.

13. The system of claim 12, wherein the one or more processors are operable to, for each of the one or more detected RF signals, determine the nodes by estimating a respective quality of wireless communication between the first node at the current physical location and the respective other node.

14. The system of claim 12, wherein the one or more processors are operable to add the estimated respective quality of wireless communication of the detected one or more RF signals at the current physical location of the first node to the collection of historical information representative of quality of wireless communication.

15. The system of claim 11, wherein the one or more processors are operable to identify services accessible to the first node through the second node by analyzing messages wirelessly communicated by the second node.

16. The system of claim 11, wherein the first node is a mobile node that provides wireless access in an autonomous vehicle.

17. The system of claim 11, wherein the request for the particular service is received from a system of the first node that provides a wireless access point to an end-user device.

18. The system of claim 11, wherein messages wirelessly received from the second node comprise one or more messages broadcast by other nodes of the network.

19. The system of claim 18, wherein the one or more messages comprise a respective physical location of the broadcasting node.

20. The system of claim 18, wherein the one or more messages comprise information that identifies one or more services accessible from or through the broadcasting node.

* * * * *